United States Patent
Erickson et al.

(10) Patent No.: US 11,986,917 B2
(45) Date of Patent: May 21, 2024

(54) INDEXING APPARATUS AND METHOD OF INDEXING

(71) Applicant: The Boeing Company, Chicago, IL (US)

(72) Inventors: Jordan S. Erickson, Federal Way, WA (US); Michael K. Louie, Renton, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/523,032

(22) Filed: Nov. 10, 2021

(65) Prior Publication Data

US 2022/0152769 A1 May 19, 2022

Related U.S. Application Data

(60) Provisional application No. 63/115,090, filed on Nov. 18, 2020.

(51) Int. Cl.

| | |
|---|---|
| *B23Q 16/02* | (2006.01) |
| *B23P 21/00* | (2006.01) |
| *B23Q 7/14* | (2006.01) |
| *B29C 70/38* | (2006.01) |
| *B64F 5/10* | (2017.01) |
| *G05B 19/418* | (2006.01) |

(52) U.S. Cl.
CPC ............... *B23Q 16/02* (2013.01); *B64F 5/10* (2017.01); *B23P 21/004* (2013.01); *B23P 2700/01* (2013.01); *B23Q 7/1442* (2013.01); *B29C 70/382* (2013.01); *B65G 2203/0283* (2013.01); *G05B 19/4183* (2013.01); *G05B 19/41895* (2013.01)

(58) Field of Classification Search
CPC .......... B23Q 16/02; B23Q 17/22; B64F 5/10; G05B 19/41895
See application file for complete search history.

(56) References Cited

U.S. PATENT DOCUMENTS

| | | | | |
|---|---|---|---|---|
| 5,397,415 A | * | 3/1995 | Manabe | ............... B29C 70/545 156/247 |
| 5,711,647 A | | 1/1998 | Slocum | |

(Continued)

FOREIGN PATENT DOCUMENTS

| | | | | |
|---|---|---|---|---|
| DE | 102018010342 A1 | * | 3/2020 | ............. B62D 65/18 |
| EP | 3 653 369 | | 5/2020 | |

(Continued)

OTHER PUBLICATIONS

WO-2020200781-A1 machine translation (Year: 2020).*

(Continued)

*Primary Examiner* — Michael W Hotchkiss
(74) *Attorney, Agent, or Firm* — Walters & Wasylyna LLC

(57) ABSTRACT

An indexing apparatus includes a fixture tool, movable relative to an operation cell, and an indexing feature, fixed relative to the fixture tool. The indexing apparatus also includes a sensor, configured to detect the indexing feature. The indexing apparatus further includes a controller, in communication with the sensor. The controller is configured to locate the fixture tool relative to the operation cell from an indexing-feature location of the indexing feature, identified by the sensor.

24 Claims, 24 Drawing Sheets

(56) References Cited

U.S. PATENT DOCUMENTS

| | | | | |
|---|---|---|---|---|
| 6,003,812 | A * | 12/1999 | Micale | B25J 9/1687 |
| | | | | 244/119 |
| 6,012,883 | A * | 1/2000 | Engwall | B23Q 3/086 |
| | | | | 131/299 |
| 6,129,031 | A * | 10/2000 | Sarh | D05B 25/00 |
| | | | | 901/41 |
| 6,592,324 | B2 * | 7/2003 | Downs | B25J 15/0253 |
| | | | | 414/730 |
| 6,692,681 | B1 * | 2/2004 | Lunde | B29C 70/549 |
| | | | | 264/510 |
| 6,860,957 | B2 * | 3/2005 | Sana | B29C 70/545 |
| | | | | 156/289 |
| 7,407,556 | B2 * | 8/2008 | Oldani | B29C 53/66 |
| | | | | 156/367 |
| 7,587,802 | B2 | 9/2009 | Tsuchiya et al. | |
| 8,157,212 | B2 * | 4/2012 | Biornstad | B29C 53/587 |
| | | | | 244/119 |
| 8,808,490 | B2 * | 8/2014 | Hagman | B29C 70/388 |
| | | | | 156/577 |
| 8,916,010 | B2 * | 12/2014 | Brennan | B29C 70/545 |
| | | | | 156/275.5 |
| 8,986,482 | B2 * | 3/2015 | McCowin | B29C 70/388 |
| | | | | 156/425 |
| 9,409,356 | B2 * | 8/2016 | Karb | B29C 67/24 |
| 9,623,611 | B2 * | 4/2017 | Oldani | B29C 70/38 |
| 9,817,402 | B1 * | 11/2017 | Ayyagari | G05D 1/0212 |
| 11,027,504 | B2 * | 6/2021 | Boge | B29C 70/34 |
| 2003/0136767 | A1 * | 7/2003 | Faitel | B23K 26/02 |
| | | | | 219/121.64 |
| 2004/0093731 | A1 * | 5/2004 | Sarh | B64F 5/10 |
| | | | | 29/897.3 |
| 2008/0246175 | A1 * | 10/2008 | Biornstad | B64C 1/12 |
| | | | | 264/109 |
| 2009/0033013 | A1 | 2/2009 | Cleary et al. | |
| 2010/0233373 | A1 * | 9/2010 | Swanberg | B05B 16/40 |
| | | | | 118/314 |
| 2011/0054694 | A1 * | 3/2011 | Munk | B64F 5/10 |
| | | | | 700/275 |
| 2012/0011693 | A1 * | 1/2012 | Amirehteshami | B23P 21/002 |
| | | | | 29/33 R |
| 2013/0014889 | A1 * | 1/2013 | Miller | B29C 70/30 |
| | | | | 156/281 |
| 2013/0325159 | A1 * | 12/2013 | Kilibarda | G05B 19/41895 |
| | | | | 701/25 |
| 2014/0090252 | A1 * | 4/2014 | Sisco | B23P 21/004 |
| | | | | 29/33 R |
| 2015/0314889 | A1 * | 11/2015 | Day | B23P 21/004 |
| | | | | 408/69 |
| 2016/0288331 | A1 * | 10/2016 | Sivich | B25J 9/1687 |
| 2018/0036968 | A1 * | 2/2018 | Boge | B29C 70/384 |
| 2019/0101901 | A1 * | 4/2019 | Zimmermann | G05B 19/41815 |
| 2019/0106283 | A1 * | 4/2019 | Yamaoka | B65G 47/907 |
| 2019/0127000 | A1 * | 5/2019 | Eberl | G01N 21/84 |
| 2019/0317486 | A1 * | 10/2019 | Ghanem | B25J 9/1697 |
| 2020/0192341 | A1 * | 6/2020 | Weaver | B25J 9/1676 |
| 2020/0310399 | A1 * | 10/2020 | Qi | G01C 21/16 |
| 2021/0094135 | A1 * | 4/2021 | Ooba | B23Q 15/013 |
| 2021/0107102 | A1 * | 4/2021 | Yamaguchi | B23P 21/004 |
| 2021/0205994 | A1 * | 7/2021 | Dai | G05B 19/41815 |
| 2021/0354256 | A1 * | 11/2021 | Negre | B23P 21/004 |

FOREIGN PATENT DOCUMENTS

| | | | | |
|---|---|---|---|---|
| EP | | 3 733 387 | 11/2020 | |
| WO | WO-2020143880 | A1 * | 7/2020 | B62D 53/005 |
| WO | WO-2020200781 | A1 * | 10/2020 | |

OTHER PUBLICATIONS

WO2020143880A1 Machine Translation (Year: 2020).*
DE102018010342A1 Machine Translation (Year: 2020).*
European Patent Office, Extended European Search Report, App. No. 21207357.1 (dated Apr. 5, 2022).
Netherlands Patent Office, Search Report and Written Opinion, App. No. NL2027425 (dated Jun. 14, 2021).

* cited by examiner

INDEXING APPARATUS AND METHOD OF INDEXING

PRIORITY

This application claims priority from U.S. Ser. No. 63/115,090 filed on Nov. 18, 2020.

FIELD

The present disclosure generally relates to manufacturing and, more particularly, to an indexing apparatus and method of indexing during a manufacturing operation.

BACKGROUND

Many structures, parts, and components are manufactured using large automated machines that have a fixed base and that operate along a predetermined toolpath under computer control. Such manufacturing techniques require accurate indexing of a workpiece relative to the machine. One method of indexing the workpiece is to probe the workpiece at different locations to align, or "zero", a work tool of the machine with the immediate location of the workpiece based on the probed locations. Another method of indexing the workpiece is to secure the workpiece at a specific, repeatable location using a fixture. However, both methods can be time consuming and expensive processes, which require extensive set-up each time the workpiece is moved to a new work location or a new workpiece is moved to the work location. This problem is exacerbated for large structures, such as aircraft spars, wing sections, fuselage sections, and the like, which may require an extremely large number of probe locations or extremely large fixtures. Furthermore, neither of these methods are conducive for continuous manufacturing in which there is a need to quickly and accurately move the workpiece from one work location to another work location. Accordingly, those skilled in the art continue with research and development efforts in the field of indexing during manufacturing and, as such, apparatuses and methods intended to address the above-identified concerns would find utility.

SUMMARY

The following is a non-exhaustive list of examples, which may or may not be claimed, of the subject matter according to the present disclosure.

In an example, a disclosed indexing apparatus includes a fixture tool, movable relative to an operation cell, and an indexing feature, fixed relative to the fixture tool. The indexing apparatus also includes a sensor, configured to detect the indexing feature. The indexing apparatus further includes a controller, in communication with the sensor. The controller is configured to locate the fixture tool relative to the operation cell from an indexing-feature location of the indexing feature, identified by the sensor.

In an example, a disclosed manufacturing system includes an automated machine, located in an operation cell and configured to perform at least one manufacturing operation. The manufacturing system also include a fixture tool, configured to support a workpiece and movable relative to the operation cell, and an indexing feature, fixed relative to the fixture tool. The manufacturing system further includes a sensor, configured to detect the indexing feature. The manufacturing system also includes a controller, in communication with the sensor and the automated machine. The controller is configured to locate the fixture tool relative to the operation cell from an indexing-feature location of the indexing feature, identified by the sensor. The controller is also configured to index the automated machine relative to a fixture-tool location of the fixture tool.

In an example, a disclosed method of manufacturing includes steps of: (1) moving a fixture tool relative to an operation cell; (2) detecting an indexing feature with a sensor; (3) locating the fixture tool relative to the operation cell from an indexing-feature location, identified by the sensor; and (4) indexing an automated machine relative to a fixture-tool location of the fixture tool.

Other examples of the disclosed apparatus, system, and method will become apparent from the following detailed description, the accompanying drawings and the appended claims.

DETAILED DESCRIPTION

Figure 1:
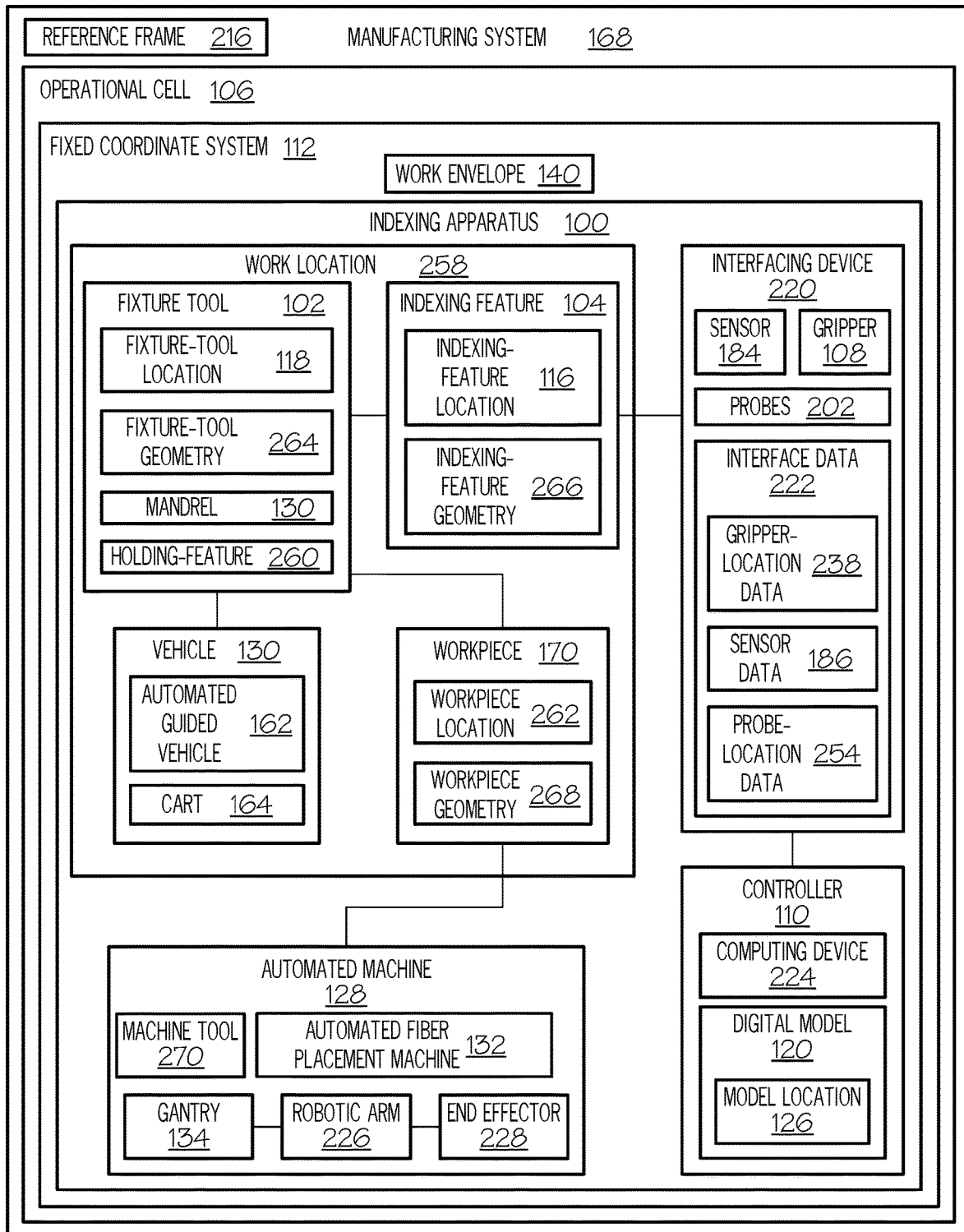
FIG. 1 is a schematic block diagram of an example of an indexing apparatus.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one embodiment and/or implementation of the subject matter according to the present disclosure. Thus, the phrases "an example," "another example," "an example," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Referring generally to FIGS. 1-33, by way of examples, the present disclosure describes an indexing apparatus 100 used to locate and index a workpiece 170 during a manufacturing operation, a manufacturing system 168 that utilizes the indexing apparatus 100, and methods 1000, 2000, 3000 of manufacturing that utilize the indexing apparatus 100 to locate and index the workpiece 170.

FIG. 1 schematically illustrates an example of the indexing apparatus 100. Generally, the indexing apparatus 100 provides a means for accurately and repeatably determining a location of the workpiece 170 relative to a reference frame 216 defined by a fixed coordinate system 112. FIG. 1 also schematically illustrates an example of the manufacturing system 168 that includes the indexing apparatus 100. The manufacturing system 168 includes, or forms at least a portion of, an operation cell 106. An automated machine 128 is located within the operation cell 106 and is configured to perform at least one manufacturing operation on the workpiece 170. The operation cell 106 is defined, or is described, by the fixed coordinate system 112 and includes a work envelope 140. The work envelope 140 forms a three-dimensional volume within the operation cell 106, described by the fixed coordinate system 112, in which the automated machine 128 operates.

Referring to FIG. 1, the indexing apparatus 100 includes a fixture tool 102. The fixture tool 102 is configured to securely hold the workpiece 170. The fixture tool 102 includes various suitable holding-features 260 that enable the workpiece 170 to be secured on or to otherwise be held to the fixture tool 102. The fixture tool 102 is movable relative to the operation cell 106, for example, relative to the automated machine 128 located within the operation cell 106. For example, the fixture tool 102, along with the workpiece 170 that is secured to the fixture tool 102, is moved to a work location 258 within the work envelope 140 of the operation cell 106.

As used herein, the term "work location 258" generally refers to a spatial situation of the fixture tool 102 and, thus, the workpiece 170, when the fixture tool 102 is moved within the operation cell 106 for performance of at least one manufacturing operation on the workpiece 170 by the automated machine 128. The present disclosure recognizes and takes into account that when the fixture tool 102 is moved within the operation cell 106, the work location 258 may not be precisely known. Accordingly, the indexing apparatus 100 is configured to determine a location of the fixture tool 102 (also referred to herein as a fixture-tool location 118) and, thus, a location of the workpiece 170 (also referred to herein as a workpiece location 262) relative to the reference frame 216, when the fixture tool 102 is at the work location 258.

The indexing apparatus 100 includes an indexing feature 104. The indexing feature 104 is fixed relative to the fixture tool 102. In other words, a location of the indexing feature 104 relative to the fixture tool 102 is constant regardless of the location (or change in location) of the fixture tool 102 relative to the reference frame 216. In an example, the indexing feature 104 is coupled to the fixture tool 102. In another example, the indexing feature 104 is located on the fixture tool 102. In yet another example, the indexing feature 104 forms a part of (e.g., is integral to) the fixture tool 102.

Throughout the present disclosure, the term "location" refers to the linear situation of an object along one or more orthogonal axes in three-dimensional space, such as along the fixed coordinate system 112. Additionally, in some instances, the term "location" also refers to the angular situation (e.g., orientation) of the object about one or more orthogonal axes in three-dimensional space, such as about the fixed coordinate system 112. Generally, the "location" of an object refers to an X-location of at least a portion of one or more external surfaces of the object (e.g., the X-coordinates of a plurality of points representing at least a portion of the external surface), a Y-location of at least a portion of one or more external surfaces of the object (e.g., the Y-coordinates of the plurality of points representing at least a portion of the external surface), and a Z-location of at least a portion of one or more external surfaces of the object (e.g., the Z-coordinates of the plurality of points representing at least a portion of the external surface).

Referring still to FIG. 1, the indexing apparatus 100 includes an interfacing device 220. The interfacing device 220 is configured to interface with the indexing feature 104 and to locate the indexing feature 104 relative to the reference frame 216, such as within the operation cell 106. The interfacing device 220 is configured to generate interface data 222 that is representative of a location of the indexing feature 104 (also referred to herein as an indexing-feature location 116) relative to the reference frame 216. As will be described in greater detail herein, the interfacing device 220 may interface with and locate the indexing feature 104 using at least one of a gripper 108, a sensor 184, and a plurality of probes 202.

The indexing apparatus 100 also includes a controller 110. The controller 110 is in communication (e.g., electrical and/or data communication) with the interfacing device 220. The controller 110 is configured to process the interface data 222, generated by the interfacing device 220, and to determine the indexing-feature location 116, based on the interface data 222. The controller 110 is also configured to determine an immediate (e.g., a real-time, actual) location of the fixture tool 102 and, thus, the workpiece 170 relative to the reference frame 216, based on the indexing-feature location 116. The automated machine 128 is indexed relative to the fixture tool 102, based on the determined location of the fixture tool 102 (the fixture-tool location 118).

In the disclosed examples, a geometry of the workpiece 170, a geometry of the fixture tool 102, and a geometry of the indexing feature 104 are known. As used herein, the "geometry" of an object refers to the size, shape, and form of the object as well as any surface contours of the object. The geometry of the object may include an interior geometry of the object and/or an exterior geometry of the object. For example, the geometry of the workpiece 170 describes the size, shape, and form of the workpiece 170 as well as any surface contours of the workpiece 170.

Additionally, the workpiece 170 is fixed to or is otherwise secured to the fixture tool 102 at a known location relative to the fixture tool 102. In other words, a location of the workpiece 170 (the workpiece location 262) relative to the fixture tool 102 is known and remains constant regardless of the location (or change in location) of the fixture tool 102 relative to the reference frame 216, such as when the fixture tool 102 moves into or out of the operation cell 106. Similarly, the location of the workpiece 170 is also fixed and remains constant relative to the indexing feature 104.

Therefore, the indexing-feature location 116 can be used to determine the fixture-tool location 118. In turn, the fixture-tool location 118 can be used to assume the workpiece location 262 within tolerance. In other words, the fixture-tool location 118 represents the immediate location of the fixture tool 102 and the workpiece 170 relative to the reference frame 216. As such, throughout the present disclosure, unless otherwise specified, the term "fixture-tool location 118" is representative of and incorporates the location of the workpiece 170 (the workpiece location 262).

In an example, prior to initiation of a locating and indexing operation, the controller 110 is configured to identify the fixture tool 102, the indexing feature 104, and the workpiece 170 upon which the manufacturing operation is to be performed. In an example, a type of fixture tool, a type of indexing feature, and/or a type of workpiece may be loaded into the program before execution of locating and indexing instructions. In another example, the program may actively identify and select the type of fixture tool, the type of indexing feature, and/or the type of workpiece from a database of options based on one or more predetermined selection criteria.

The geometry of the fixture tool 102, the geometry of the indexing feature 104, and the geometry of the workpiece 170 are therefore known based on the type of fixture tool 102, the type of indexing feature 104, and/or the type of workpiece 170 identified by the controller 110. For example, the program loads a digital model 120 representing the fixture tool 102, the indexing feature 104, and the workpiece 170. The geometry of the fixture tool 102 (also referred to herein as fixture-tool geometry 264), the geometry of the indexing feature 104 (also referred to herein as indexing-feature geometry 266), and the geometry of the workpiece 170 (also referred to herein as workpiece geometry 268) are represented by or are extracted from the digital model 120 (FIG. 1).

In an example, the digital model 120 includes digital representations of the fixture tool 102, the indexing feature 104, and the workpiece 170. In another example, the digital model 120 includes a digital representation of a combination of the fixture tool 102 with the indexing feature 104 and the workpiece 170 secured to the fixture tool 102. Thus, the digital model 120 represents the location of the indexing feature 104 and/or the workpiece 170 relative to the fixture tool 102.

Referring still to FIG. 1, during the locating and indexing operation, the controller 110 is configured to match the indexing-feature geometry 266 to the indexing-feature location 116 represented by the interface data 222. For example, the controller 110 registers the geometric representation of the indexing feature 104 of the digital model 120 to the indexing-feature location 116. The controller 110 then determines a location of the digital model 120 relative to the reference frame 216 (referred to herein as a model location 126), thereby locating the digital model 120 in the reference frame 216. Registration of the digital model 120 with the indexing-feature location 116 may be performed using any one of a variety of data computing techniques that best aligns a set of data points (e.g., representing the digital model 120) with a set of reference data points (e.g., representing the indexing-feature location 116), such as point cloud transformation. The controller 110 then determines the location of the fixture tool 102 and the location of the workpiece 170 (the fixture-tool location 118) relative to the reference frame 216 based on the model location 126. For example, the fixture-tool location 118 is assumed to be the model location 126 within tolerance.

The automated machine 128 is then indexed relative to the fixture tool 102, based on the fixture-tool location 118 relative to the reference frame 216. The automated machine 128 operates along a well-defined, programmed (e.g., numerically controlled) cycle of motions, or tool path, relative to the reference frame 216 in at least one dimension of the fixed coordinate system 112.

In an example, the automated machine 128 includes a robotic arm 226, having multiple degrees of freedom, and an end effector 228 that is coupled to a working end of the robotic arm 226. The end effector 228 includes, or takes the form of, at least one work tool that is configured to perform at least one manufacturing operation on the workpiece 170. The robotic arm 226 is configured to move the end effector 228 along a predetermined toolpath under computer control relative to the fixture tool 102 and the workpiece 170, based on the fixture-tool location 118.

Generally, the locating and indexing operations described herein can be performed in conjunction with, or as an initial step in association with any, one of various types of additive or subtractive manufacturing operations. As such, the automated machine 128 may perform any one of various types of manufacturing operations on the workpiece 170, including, but not limited to, a drilling operation, a milling operation, a fastening operation, pre-cure and/or post-cure composite assembly operations (e.g., a material layup operation, a laminating operation, etc.) and the like. Generally, the end effector 228 includes a suitable tool that is configured to perform the associated manufacturing operation.

Because the geometry of the workpiece 170 is known and because the location of the workpiece 170 is known, or is assumed within tolerance, relative to the fixture tool 102, indexing the automated machine 128 relative to the fixture tool 102, based on the fixture-tool location 118, consequently indexes the automated machine 128 relative to the workpiece 170. Once the automated machine 128 is indexed relative to the fixture-tool location 118, the automated machine 128 operates along the programmed tool path to perform at least one manufacturing operation on the workpiece 170 in a known manner. The geometry of the workpiece 170 and the known location of the workpiece 170 relative to the fixture tool 102 are incorporated in and are accounted for by the programmed tool path of the automated machine 128.

The present disclosure recognizes and takes into account that the geometry of the workpiece 170 may change as a result of the manufacturing (e.g., assembly or machining) operation performed on the workpiece 170. However, the location of the workpiece 170 relative to the fixture tool 102 and the indexing feature 104 does not change due to actions outside of the manufacturing operations. Therefore, any flexing, shifting, or the like of the workpiece 170 are within tolerance during the manufacturing operation and do not have an out of tolerance effect on the location of the workpiece 170. In other words, at each stop along a complete manufacturing process, the only change to the workpiece 170 is in geometry due to the various manufacturing operations.

Changes in the geometry of the workpiece 170 resulting from any of the manufacturing operations are also known, or are assumed within tolerance, based on theoretical addition or subtraction from a previous manufacturing operation. For example, the workpiece geometry 268 (e.g., represented by the digital model 120) is updated based on the additive or subtractive manufacturing operation performed on the workpiece 170.

When the fixture tool 102 and the workpiece 170 are moved to a subsequent work location 258, such as to a second operation cell 172 for performance of a subsequent manufacturing operation on the workpiece 170 by a second automated machine 174 (FIGS. 10, 20, and 28), the indexing feature 104 is located, the fixture-tool location 118 is determined, and the second automated machine 174 is indexed relative to the fixture-tool location 118 as described herein. The known (e.g., changed) geometry of the workpiece 170 and the known location of the workpiece 170 relative to the fixture tool 102 are incorporated in and are accounted for by the programmed tool path of the second automated machine 174. Therefore, such changes to the workpiece geometry 268 are taken into account in subsequent locating and indexing operations, which in turn, enables repeatable indexing based on the location of the fixture tool 102.

Accordingly, the examples of the indexing apparatus 100, the manufacturing system 168, and the methods 1000, 2000, 3000 disclosed herein enable the workpiece 170 to be quickly and accurately located, without the need for an expensive and time-consuming set up operation or locating operation. The automated machine 128 can, in turn, be quickly and precisely indexed relative to the fixture tool 102 and, thus, the workpiece 170, based on the determined location of the fixture tool 102.

FIGS. 1-29, schematically illustrate various example implementations of the interfacing device 220 and the indexing feature 104 of the disclosed indexing apparatus 100. As illustrated in FIGS. 1-10, in an example, the interfacing device 220 includes at least one gripper 108 that provides a contact interface with the indexing feature 104. As illustrated in FIGS. 11-21, in an example, the interfacing device 220 includes at least one sensor 184 that provides a noncontact interface with the indexing feature 104. As illustrated in FIGS. 22-29, in an example, the interfacing device 220 includes a plurality of probes 202 that provides a contact interface with the indexing feature 104.

Figure 2:
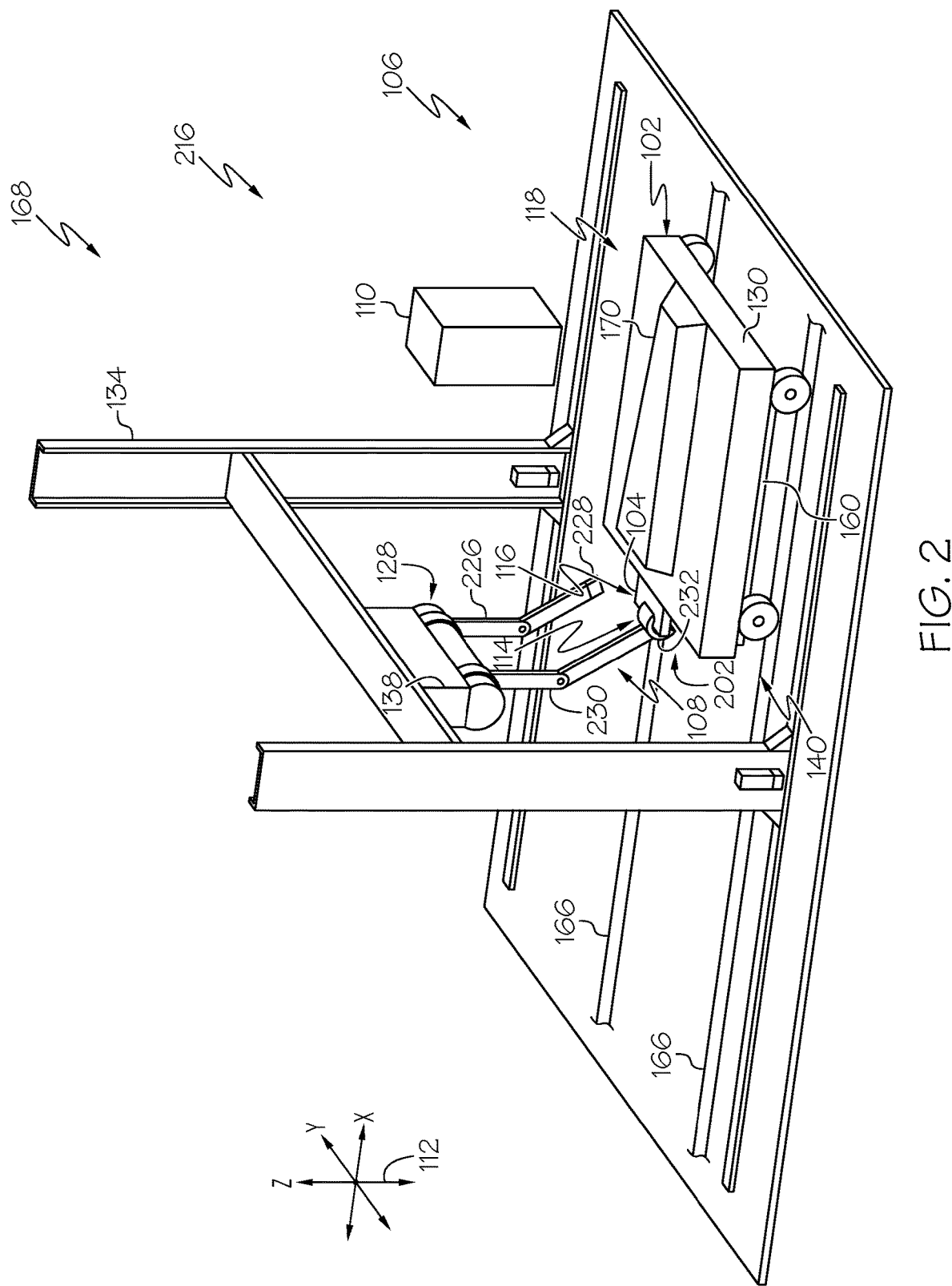
FIG. 2 is a schematic, perspective view of an example of a manufacturing system using the indexing apparatus.
Figure 3:
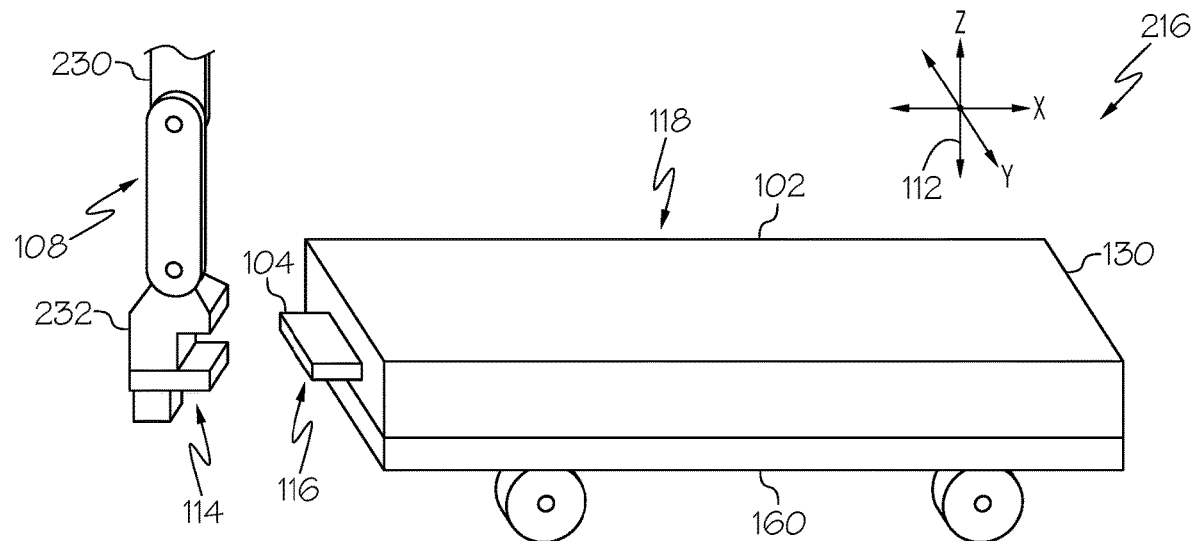
FIG. 3 is a schematic, perspective view of an example of an interfacing device, an indexing feature, and a fixture tool of the indexing apparatus.
Figure 4:
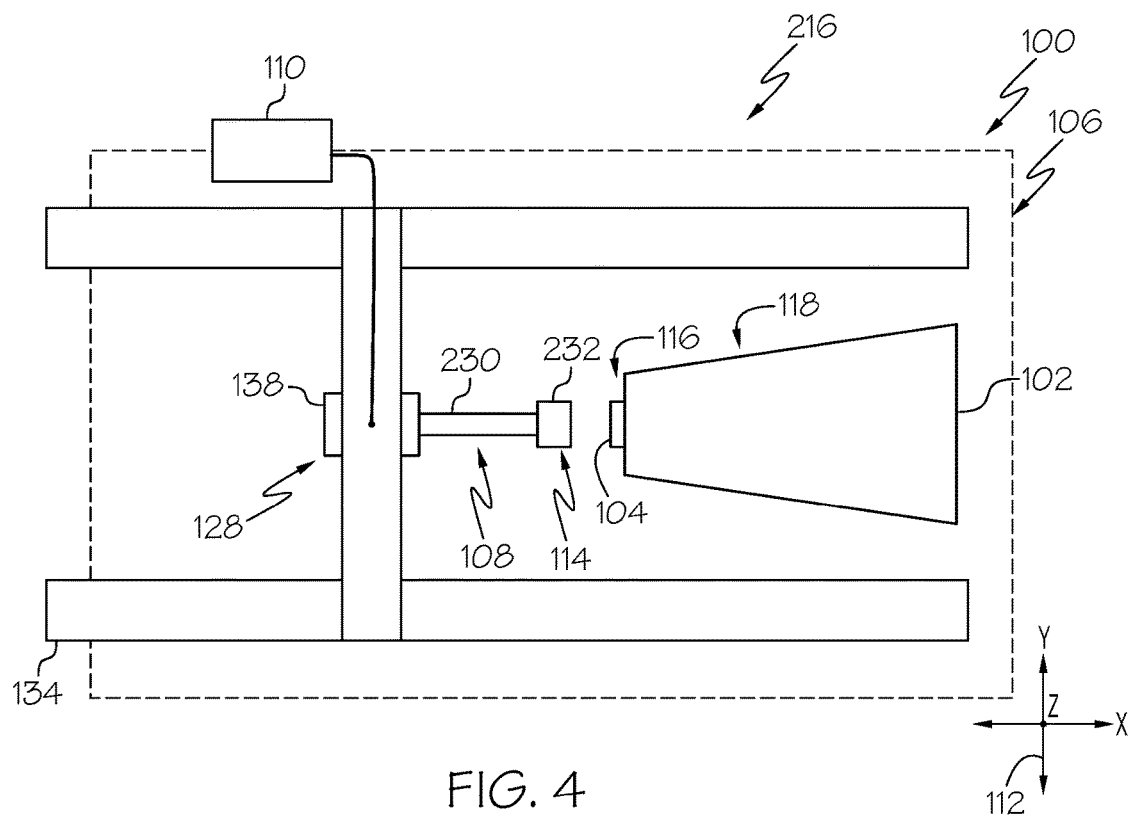
FIG. 4 is a schematic, top plan view of an example of the indexing apparatus.

Referring generally to FIG. 1 and particularly to FIGS. 2-4, in an example, the indexing apparatus 100 includes the fixture tool 102. The fixture tool 102 is movable relative to the operation cell 106. The indexing apparatus 100 also includes the indexing feature 104. The indexing feature 104 is fixed relative to the fixture tool 102. For example, the indexing feature 104 is coupled to the fixture tool 102. In an example, the indexing feature 104 extends from the fixture tool 102.

In the examples illustrated in FIGS. 2-5, the indexing feature 104 is coupled to and extends from a front end of the fixture tool 102. In other examples, the indexing feature 104 is coupled to, or is located on, another portion (e.g., a side, a rear, a bottom, etc.) of the fixture tool 102.

In an example, the indexing apparatus 100 includes the gripper 108. The gripper 108 is movable relative to the operation cell 106 and the fixture tool 102. The gripper 108 is configured to engage (e.g., to make physical contact with) the indexing feature 104. The indexing feature 104 is appropriately located relative to the fixture tool 102 so that at least a portion of the indexing feature 104 is physically accessible by the gripper 108. Conversely, the gripper 108 is appropriately located relative to the fixture tool 102 so that at least a portion of the gripper 108 is physically accessible by the indexing feature 104. With the gripper 108 engaged to the indexing feature 104, a location of the gripper 108 (also referred to herein as a gripper location 114) (FIG. 1) is representative of, or corresponds to, the indexing-feature location 116 (FIG. 1). In other words, the gripper 108 locates the indexing feature 104 in the reference frame 216.

Referring to FIGS. 2-6, in an example, the gripper 108 includes an articulation mechanism 230 and a grip head 232 that is coupled to a working end of the articulation mechanism 230. The articulation mechanism 230 has multiple degrees of freedom and is configured to move the grip head 232 in three-dimensional space, such as linearly along at least one axis of the fixed coordinate system 112 and/or rotationally about at least one axis of the fixed coordinate system 112.

The grip head 232 is configured to engage the indexing feature 104. For example, the grip head 232 is configured to grasp or otherwise firmly hold at least a portion of the indexing feature 104. With the grip head 232 engaged to the indexing feature 104, the gripper location 114 is a location of the grip head 232 and is representative of, or corresponds to, the indexing-feature location 116.

The articulation mechanism 230 includes at least one suitable drive motor (not shown) to drive motion of the articulation mechanism 230, such as an electromechanical motor, a pneumatic motor, a hydraulic motor, and the like. The articulation mechanism 230 is also configured to provide location data (e.g., the interface data 222) that represents the gripper location 114, for example, relative to the reference frame 216 in at least one dimension of the fixed coordinate system 112. For example, the articulation mechanism 230 also includes at least one encoder (not shown) and/or at least one sensor (not shown) that converts motion of the articulation mechanism 230 into an electrical signal that represents the gripper location 114. The articulation mechanism 230 also includes other suitable electronic, mechanical, pneumatic, and hydraulic components (not shown). The articulation mechanism 230 operates under computer control, such as by the controller 110.

Referring to FIGS. 2 and 4, in an example, the articulation mechanism 230 is coupled to, or forms a portion of, the automated machine 128. In FIG. 4, the robotic arm 226 and the end effector 228 (FIG. 2) of the automated machine 128 (e.g., for performing the at least one manufacturing operation) are removed for clarity of illustration. In this example, the automated machine 128 is configured to move the gripper 108 relative to the operation cell 106 and the fixture tool 102 in at least one dimension of the fixed coordinate system 112. In other words, at least a portion of the range of motion, or one or more degrees of freedom, of the articulation mechanism 230 is provided by the automated machine 128.

Figure 5:
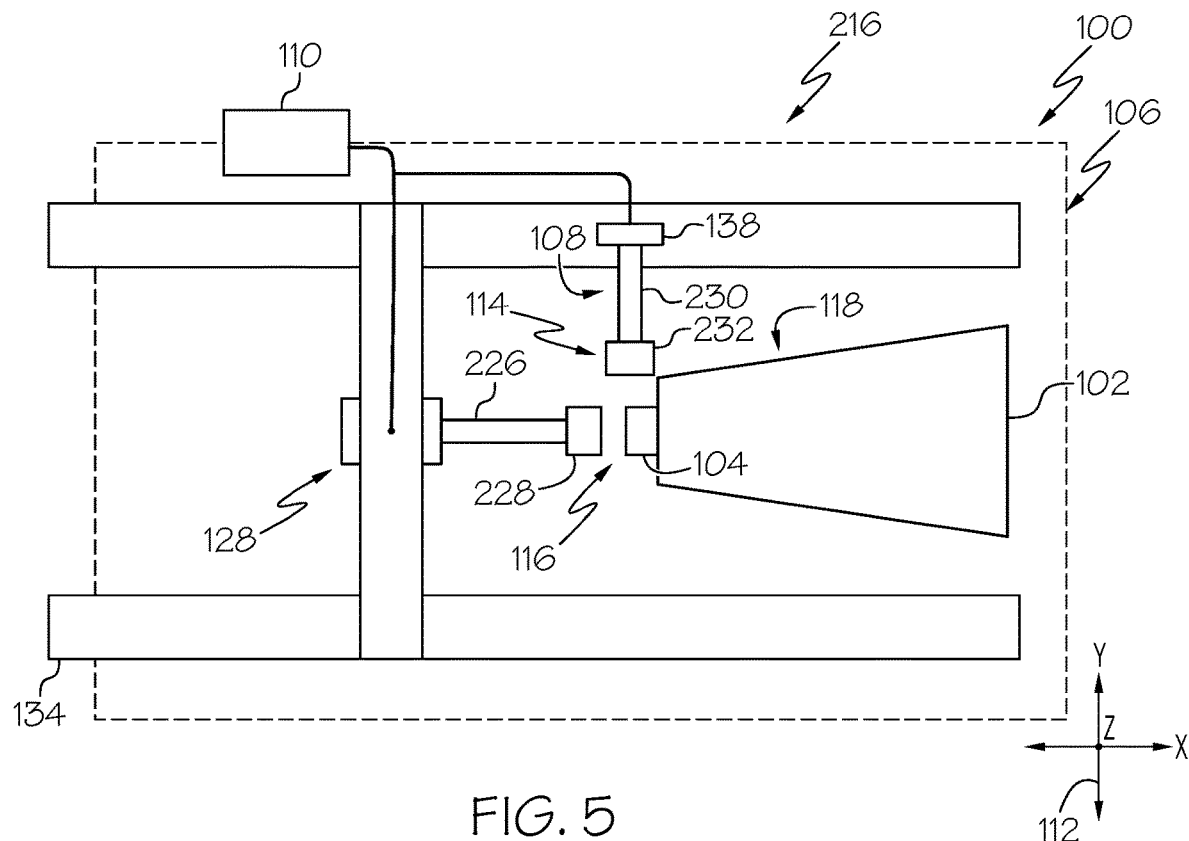
FIG. 5 is a schematic, top plan view of an example of the indexing apparatus.

Referring to FIG. 5, in an example, the articulation mechanism 230 is separate from and is independent of the automated machine 128. In this example, a full range of motion, or every degree of freedom, of the gripper 108 is provided by (e.g., is inherent to) the articulation mechanism 230.

Figure 6:
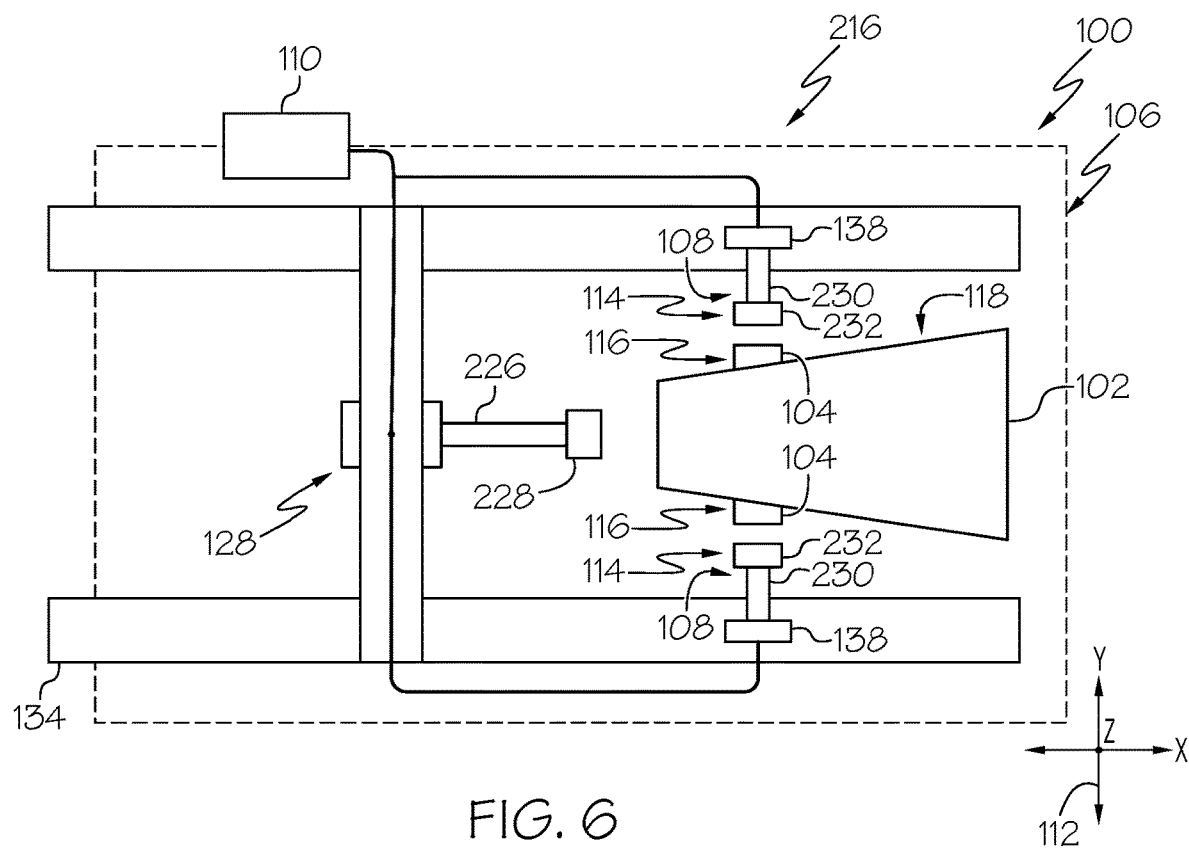
FIG. 6 is a schematic, top plan view of an example of the indexing apparatus.

Referring to FIG. 6, in another example of the indexing apparatus 100, the interfacing device 220 (FIG. 1) includes more than one gripper 108 (referred to herein as a plurality of grippers 108). In this example, the indexing apparatus 100 includes more than one indexing feature 104 (referred to herein as a plurality of indexing features 104). Each one of the indexing features 104 is fixed relative to the fixture tool 102. Each one of the grippers 108 is configured to engage and to locate a corresponding one of the indexing features 104.

Referring to FIGS. 1-6, the indexing apparatus 100 also includes the controller 110. The controller 110 is in communication with the gripper 108. The controller 110 is configured to locate the fixture tool 102 relative to the operation cell 106 (e.g., relative to the reference frame 216) from the gripper location 114 of the gripper 108, with the gripper 108 engaged to the indexing feature 104.

In an example, the controller 110 is configured to determine the gripper location 114 of the gripper 108, for example, relative to the reference frame 216 in at least one dimension of the fixed coordinate system 112. The controller 110 is also configured to determine the indexing-feature location 116 of the indexing feature 104, for example, relative to the reference frame 216 in the at least one dimension of the fixed coordinate system 112, from the gripper location 114 of the gripper 108. The controller 110 is further configured to determine the fixture-tool location 118 of the fixture tool 102, for example, relative to the reference frame 216 in the at least one dimension of the fixed coordinate system 112, from the indexing-feature location 116 of the indexing feature 104.

In an example, the controller 110 is configured to register the digital model 120 (FIG. 1), representing the fixture tool 102 and the indexing feature 104, to the indexing-feature location 116 of the indexing feature 104. The controller 110 is also configured to convert the model location 126 of the digital model 120, registered to the indexing-feature location 116, to the fixture-tool location 118 of the fixture tool 102.

Figure 7:
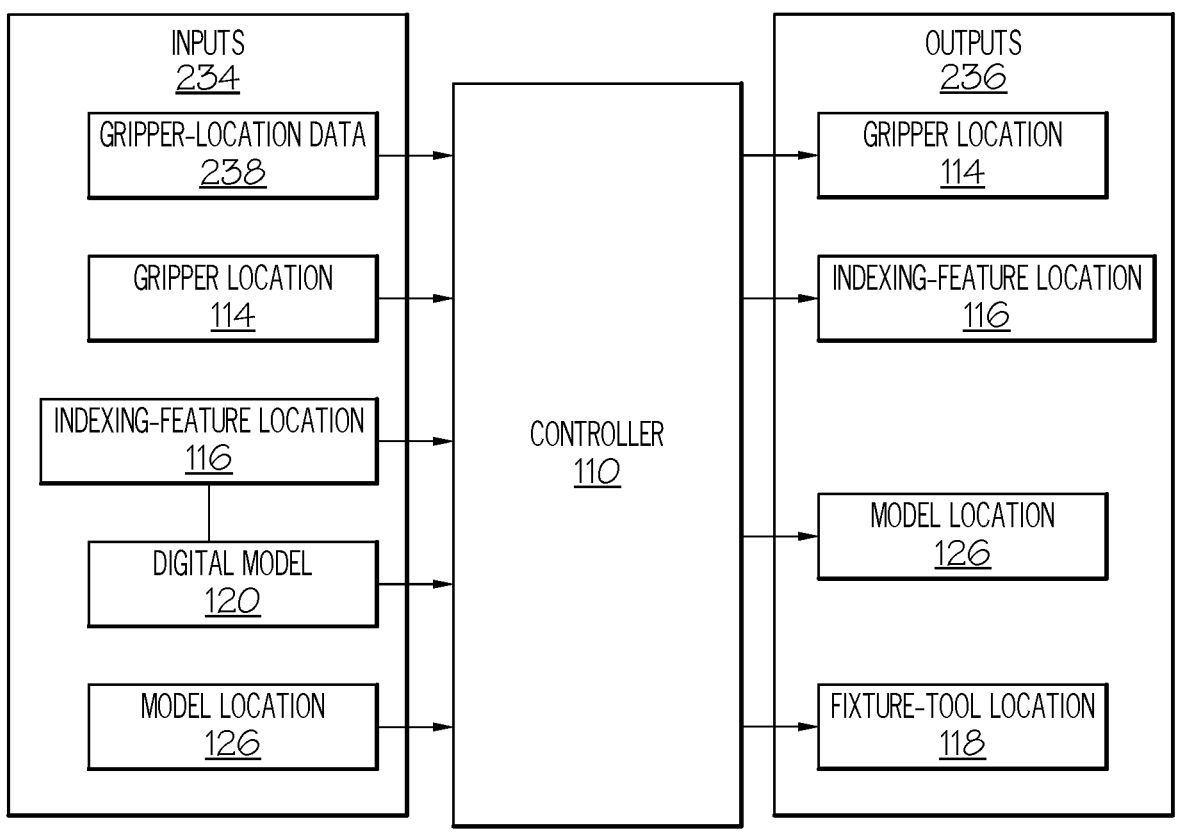
FIG. 7 is a schematic block diagram of an example of a processing operation used to determine a location of a fixture tool of the indexing apparatus.

FIG. 7 schematically illustrates an example of inputs 234 provided to the controller 110 and outputs 236 generated by the controller 110 during the locating and indexing operation. In an example, gripper-location data 238 is provided to the controller 110 by the gripper 108. The gripper-location data 238 is an example of the interface data 222 (FIG. 1). In an example, the gripper-location data 238 is generated by encoders, sensors, other relative positioning devices, or a combination thereof and is representative of the actual, physical location of the gripper 108 (the gripper location 114) (FIG. 3), relative to the reference frame 216. The controller 110 processes the gripper-location data 238 and determines the gripper location 114 based on the gripper-location data 238. The controller 110 then processes the gripper location 114 and determines the indexing-feature location 116 based on the gripper location 114.

Referring to FIGS. 2-6, in an example, with the gripper 108 (e.g., the grip head 232) engaged to the indexing feature 104, there is at least one point of contact between the gripper 108 and the indexing feature 104. This point of contact has an XYZ-coordinate that is common to both the gripper 108 and the indexing feature 104. The gripper-location data 238 (FIG. 16) represents an XYZ-coordinate of the point of contact of the gripper 108 and the gripper location 114 is described by the XYZ-coordinate of the point of contact of the gripper 108. The controller 110 converts the XYZ-coordinate of the point of contact of the gripper 108 to an XYZ-coordinate of a corresponding point of contact of the indexing feature 104. The controller 110 then determines the indexing-feature location 116 as described by the XYZ-coordinate of point of contact of the indexing feature 104.

In an example, the gripper 108 (e.g., the grip head 232) and the indexing feature 104 include a plurality of points of contact. Thus, the gripper location 114 is described by the XYZ-coordinates of the plurality of points of contact of the gripper 108 and the indexing-feature location 116 is described by the XYZ-coordinates of the corresponding plurality of points of contact of the indexing feature 104.

It should be noted that increasing the number of points of contact between the gripper 108 and the indexing feature 104 provides a greater number of XYZ-coordinate data points for processing, which, in turn, increases the accuracy of the indexing-feature location 116 and the fixture-tool location 118 during data point alignment of the indexing operation. In an example, the gripper 108 (e.g., the grip head 232) and the indexing feature 104 include at least three points of contact.

Figure 8A:
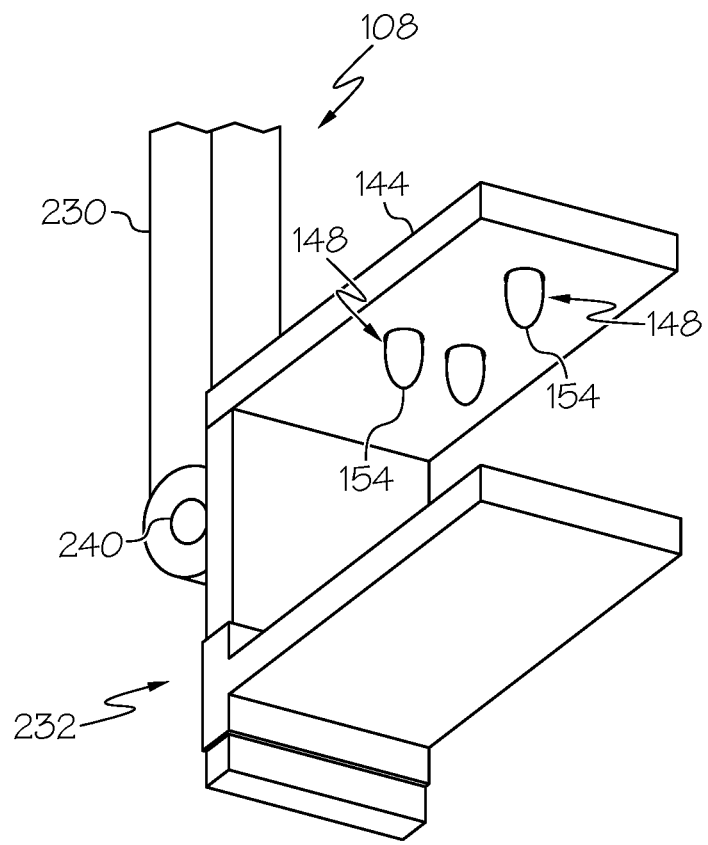
FIG. 8A is a schematic, perspective view of an example of a gripper of the interfacing device of the indexing apparatus.
Figure 8B:
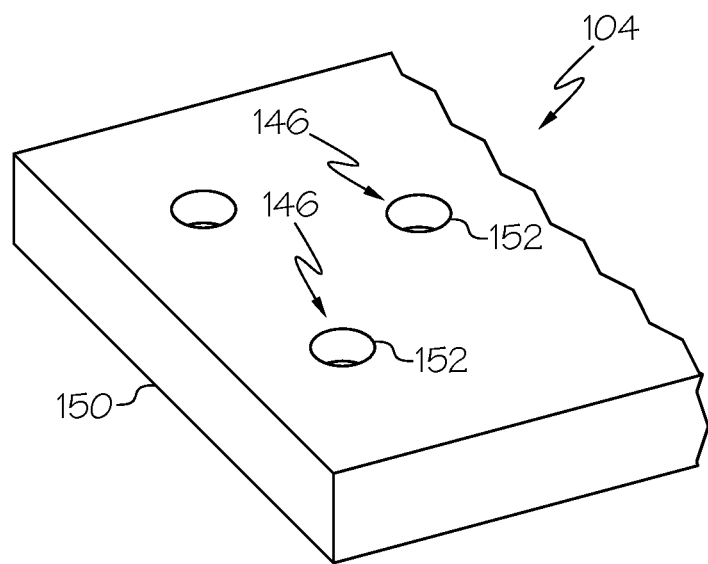
FIG. 8B is a schematic, perspective view of an example of the indexing feature of the indexing apparatus.
Figure 9A:
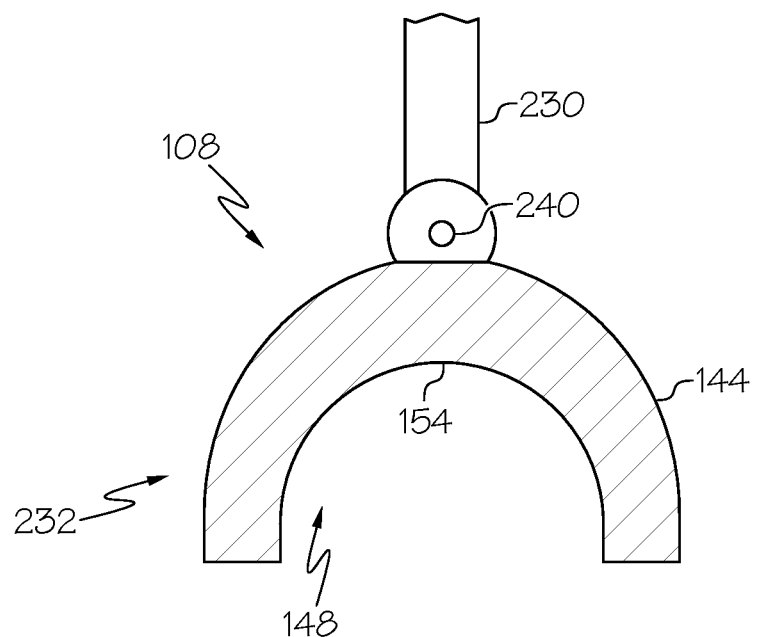
FIG. 9A is a schematic, perspective view of an example of the gripper of the interfacing device of the indexing apparatus.
Figure 9B:
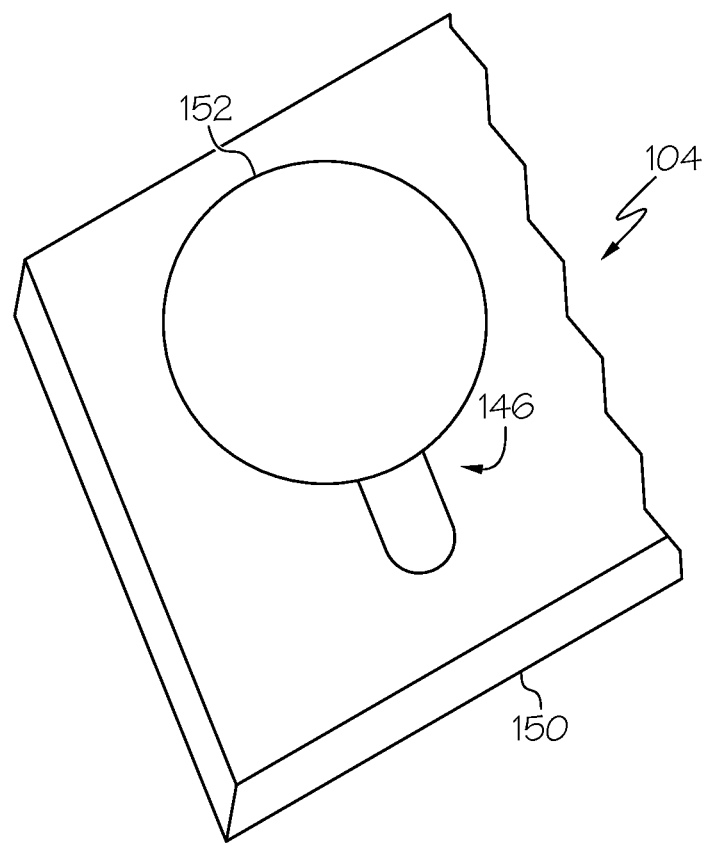
FIG. 9B is a schematic, perspective view of an example of the indexing feature of the indexing apparatus.

Referring briefly to FIGS. 8A, 8B, 9A, and 9B, in an example, the gripper 108 (e.g., the grip head 232) includes at least one contact-index 148 (FIGS. 8A and 9A) and the indexing feature 104 includes at least one interface-index 146 (FIGS. 8B and 9B). With the gripper 108 (e.g., the grip head 232) engaged to the indexing feature 104, the contact-index 148 engages the interface-index 146 so that there is at least one point of contact between the contact-index 148 and the interface-index 146. This point of contact has an XYZ-coordinate that is common to both the contact-index 148 and the interface-index 146. The gripper-location data 238 represents an XYZ-coordinate of the point of contact of the contact-index 148 and the gripper location 114 is described by the XYZ-coordinate of the point of contact of the contact-index 148.

The controller 110 converts the XYZ-coordinate of the point of contact of the contact-index 148 to an XYZ-coordinate of a corresponding point of contact of the interface-index 146. The controller 110 determines the indexing-feature location 116 as described by the XYZ-coordinate of point of contact of the interface-index 146.

Generally, the gripper 108 (e.g., the grip head 232) includes a plurality of contact-indexes 148 and the indexing feature 104 includes a plurality of interface-indexes 146, which, in turn, provides a plurality of points of contact. Accordingly, the gripper-location data 238 (FIG. 7) represents the XYZ-coordinates of the plurality of points of contact of the contact-indexes 148 of the gripper 108. The gripper location 114 is described by the XYZ-coordinates of the points of contact of the contact-indexes 148 of the gripper 108. The indexing-feature location 116 is described by the XYZ-coordinates of the corresponding plurality of points of contact of the interface-indexes 146.

In an example, the gripper 108 (e.g., the grip head 232) includes at least three contact-indexes 148 and the indexing feature 104 include at least three interface-indexes 146, which result in at least three points of contact. In other examples, the gripper 108 (e.g., the grip head 232) may include a lesser number or a greater number of contact-indexes 148 and the indexing feature 104 may include a lesser number or a greater number of interface-indexes 146.

It should be noted that increasing the number of contact-indexes 148 and interface-indexes 146 increases the number of points of contact between the gripper 108 and the indexing feature 104, which in turn provides a greater number of XYZ-coordinate data points for processing, which, in turn, increases the accuracy of the indexing-feature location 116 and the fixture-tool location 118 during data point alignment of the indexing operation.

Referring again to FIG. 7, the controller 110 is configured to register the digital model 120, representing the fixture tool 102 and the indexing feature 104, to the indexing-feature location 116 and determines the model location 126. In an example, the controller 110 is configured to overlay and align the digital model 120 with the XYZ-coordinates describing the indexing-feature location 116 within the reference frame 216. The digital model 120 includes data points representing the points of contact of the indexing feature 104. For example, the digital model 120 includes data points that represent the interface-indexes 146 of the indexing feature 104. In an example, the controller 110 performs a best fit operation (e.g., executes a best fit algorithm) to align data points representing the points of contact of the indexing feature 104, such as the data points representing the interface-indexes 146, with data points representing the XYZ-coordinates describing the indexing-feature location 116. In an example, the best fit operation includes a rigid body, point cloud transformation operation.

With the digital model 120 registered and aligned with the indexing-feature location 116, the controller 110 is configured to convert the model location 126 to the fixture-tool location 118 of the fixture tool 102, for example, relative to the reference frame 216. For example, the fixture-tool location 118 is assumed to be the same as the model location 126 within tolerance. Thus, the fixture-tool location 118 represents the immediate (e.g., current, real-time) location of the fixture tool 102 and, thus, the workpiece 170 relative to the operation cell 106 and the automated machine 128.

With the fixture-tool location 118 known, the automated machine 128 is indexed, or is "zeroed", relative to the fixture-tool location 118 and follows the predetermined tool path to perform the manufacturing operation on the workpiece 170. Indexing the automated machine 128 relative to the fixture tool 102, based on the fixture-tool location 118, consequently indexes the automated machine 128 relative to the workpiece 170. The geometry of the workpiece 170 and the known location of the workpiece 170 relative to the fixture tool 102 are incorporated in and are accounted for by the programmed tool path of the automated machine 128.

Referring to FIGS. 1 and 2, in an example, the indexing apparatus 100 includes the automated machine 128. The automated machine 128 is located in the operation cell 106 and is in communication with the controller 110. The controller 110 is configured to index the automated machine 128 relative to the fixture-tool location 118 of the fixture tool 102.

Referring to FIGS. 2 and 4-6, in an example, the automated machine 128 includes a gantry 134. The gantry 134 is configured to provide at least a portion of the range of motion of, or one or more degrees of freedom to, the automated machine 128. In an example, the robotic arm 226 is coupled to the gantry 134. In an example, the gantry 134 is an overhead gantry that is movable within the operation cell 106 to move the robotic arm 226 in at least one dimension of the fixed coordinate system 112. In this example, the fixture tool 102 and, thus, the workpiece 170 are moved to the work location 258 within the operation cell 106 and the gantry 134 and/or the robotic arm 226 moves relative to the fixture tool 102 so that the end effector 228 follows along the predetermined tool path.

In another example (not shown), the robotic arm 226 is a stand-alone robot that has a fixed base within the operation cell 106. In this example, the fixture tool 102 and, thus, the workpiece 170 are moved to the work location 258 within the operation cell 106 and the robotic arm 226 moves relative to the fixture tool 102 so that the end effector 228 follows along the predetermined tool path.

While the illustrated examples of the indexing apparatus 100 show only one automated machine 128 (e.g., one robotic arm 226 with one end effector 228) for performing the manufacturing operation on the workpiece 170 in the operation cell 106, in other examples, the indexing apparatus 100 may have any number of additional automated machines 128 (e.g., additional robotic arms 226 and/or additional end effectors 228).

Referring to FIGS. 1 and 2, in an example, the manufacturing operation includes a pre-cure composite assembly operation or other additive manufacturing operation performed on a pre-cure composite material, such as a composite layup operation and/or a composite lamination operation. In this example, the workpiece 170 includes a pre-cure composite laminate (e.g., layup of a pre-impregnated composite material). The fixture tool 102 includes, or takes the form of, a mandrel 130. The mandrel 130 is configured to support the composite laminate (the workpiece 170). The automated machine 128 is configured to perform a pre-cure manufacturing operation on the composite laminate (the workpiece 170). For example, the automated machine 128 includes, or takes the form of, an automated fiber placement machine 132 (FIG. 1).

In one or more other examples, the manufacturing operation includes other additive manufacturing operation, such as an assembly operation, or subtractive manufacturing operation, such as a machining operation. In such examples, the workpiece 170 is one of a post-cure composite structure, a metallic structure, a plastic structure, or other non-composite structure. The fixture tool 102 includes at least one holding-feature 260 (FIG. 1) that is configured to secure the workpiece 170 to the fixture tool 102, during movement to the operation cell 106 and during the manufacturing operation. The automated machine 128 is configured to perform at least one of an additive manufacturing operation and a subtractive manufacturing operation on the workpiece 170. In an example, the automated machine 128 is configured to perform a post-cure manufacturing operation on the post-cure composite structure. For example, the automated machine 128 includes, or takes the form of, any appropriate machine tool 270 (FIG. 1).

In one or more examples, any one of the various manufacturing operations described herein is part of a continuous flow manufacturing process. For example, the fixture tool 102 and the workpiece 170 are pulsed to one of a plurality of operation cells forming a continuous flow manufacturing system. At any given one of the plurality of operation cells, the manufacturing operation forms a portion of the continuous flow manufacturing process. In an example, the manufacturing operation includes placing one or more plies of a pre-cure composite material to partially form the composite laminate. In an example, the manufacturing operation includes assembly or installation of a secondary structure to the post-cure composite structure or the non-composite structure. In an example, the manufacturing operation includes machining one or more features in the post-cure composite structure or the non-composite structure.

In an example, the fixture tool 102 is moved into the work location 258 and the immediate location of the fixture tool 102 and the workpiece 170 (e.g., the fixture-tool location 118) is determined using the gripper 108 and the indexing feature 104, as described above. Based on the fixture-tool location 118 (e.g., the location of the fixture tool 102 and the location of the workpiece 170 relative to the fixture tool 102), the automated fiber placement machine 132 lays down and/or consolidates at least a portion of at least one layer of a stack of composite sheets.

Referring to FIGS. 2 and 4-6, in an example, the indexing apparatus 100 includes a drive assembly 138 that is coupled to the gripper 108. The drive assembly 138 is configured to move the gripper 108 relative to the reference frame 216, such as in at least one dimension of the fixed coordinate system 112. In an example, the drive assembly 138 is coupled to, or forms a portion of, the articulation mechanism 230 of the gripper 108, such as in examples where the gripper 108 is separate from the automated machine 128, as illustrated in FIGS. 5 and 6. In another example, the drive assembly 138 is couple to, or is formed by, the automated machine 128, such as in examples where the gripper 108 is coupled to the automated machine 128, as illustrated in FIGS. 2 and 4.

Referring to FIG. 1, in an example, the gripper 108 is configured to move the fixture tool 102 inside of the work envelope 140 of the operation cell 106. In an example, the fixture tool 102 and the workpiece 170 are moved to an initial, pre-work location, for example, a location that is proximate to (e.g., at or near) the work location 258 (e.g., outside of the operation cell 106). The gripper 108, operating under computer control, moves into engagement with the indexing feature 104. While engaged to the indexing feature 104, the gripper 108 moves the fixture tool 102 and the workpiece 170 to the work location 258 (e.g., inside the operation cell 106). In this manner, the fixture tool 102 and the workpiece 170 are moved to the work location 258 while the fixture-tool location 118 is being determined, as described above. This combined operation further improves the cycle time of the manufacturing operation by enabling the moving operation of the fixture tool 102 and the workpiece 170 and the locating operation of the fixture tool 102 and the workpiece 170 to be performed substantially concurrently.

In another example, the indexing apparatus 100 includes an independent moving mechanism (not shown) that is separate from the gripper 108 and that is configured to move the fixture tool 102 to the work location 258. In this example, the fixture tool 102 and the workpiece 170 are moved to the pre-work location and the independent moving mechanism, operating under computer control, moves the fixture tool 102 and the workpiece 170 to the work location 258.

FIGS. 8A, 8B, 9A and 9B schematically illustrate examples of the gripper 108 and the indexing feature 104. In an example, the gripper 108 (e.g., the grip head 232) includes a jaw assembly 144 (FIGS. 8A and 9A). The jaw assembly 144 is configured to grip, grasp, clamp, or otherwise securely hold at least a portion of the indexing feature 104 (FIGS. 8B and 9B). In an example, the indexing feature 104 includes a plate 150 that is coupled to and extends from the fixture tool 102 (not shown in FIG. 8B). The contact-index 148 (FIGS. 8A and 9A) and the interface-index 146 (FIGS. 8B and 9B) are configured to contact and mate with each other when the gripper 108 (e.g., the jaw assembly 144) properly engages the indexing feature 104 (e.g., the plate 150).

Referring to FIGS. 8A and 8B, in an example, the jaw assembly 144 is includes a first jaw and a second jaw. The first jaw and the second jaw are movable relative to each another to selectively engage (e.g., grip) the plate 150. In an example, the jaw assembly 144 includes a first (e.g., upper) jaw that is stationary and a second (e.g., lower) jaw that is movable relative to the first jaw. In an example, each jaw of the jaw assembly 144 has an approximately planar engaging surface that is configured to make secure contact with a corresponding one of opposing planar engaging surfaces of the plate 150. Other configurations of the jaw assembly 144 and the plate 150 are also contemplated.

In an example, the contact-index 148 (FIG. 8A) is coupled to, or is disposed on, the jaw assembly 144 and the interface-index 146 (FIG. 8B) is coupled to, or is disposed on, the plate 150. The contact-index 148 is suitably located and is configured to engage the interface-index 146 when the jaw assembly 144 grips the plate 150. In an example, the contact-index 148 is located on and projects from the engaging surface of one of the jaws (e.g., the upper jaw) of the jaw assembly 144 and the interface-index 146 is located on and projects from one of the engaging surfaces of the plate 150.

In an example, the contact-index 148 includes, or takes the form of, at least one contacting-structure 154. The interface-index 146 includes, or takes the form of, at least one interfacing-structure 152. In an example, the interfacing-structure 152 and the contacting-structure 154 have complementary geometric shapes and dimensions so that corresponding surfaces of the contacting-structure 154 (e.g., forming the contact-index 148) and interfacing-structure 152 (e.g., forming the interface-index 146) are in contact when the grip head 232 properly engages the indexing feature 104. Each one of the contacting-structure 154 and the interfacing-structure 152 includes, or takes the form of, any one of various structural configurations or arrangements.

In an example, the contacting-structures 154 and the interfacing-structures 152 include, or take the form of, a plurality of cooperating and complementary point structures. In the illustrated example, the contacting-structure 154 includes, or takes the form of, a protrusion formed on (e.g., projecting from) a surface of the grip head 232 and the interfacing-structure 152 includes, or takes the form, of an aperture formed in (e.g., depending from) a surface of the plate 150. In this example, the interfacing-structure 152 is configured to receive and mate with at least a portion of the contacting-structure 154. In another example, this arrangement may be reversed. For example, the contacting-structure 154 includes, or takes the form of, the aperture and the interfacing-structure 152 includes, or takes the form of, the protrusion. As examples, the protrusion may be, or may take the form of, a pin, a spring-loaded ball bearing, or other protruding body and the aperture may be, or may take the form of, a hole, a detent, a recess, or other opening.

Referring to FIGS. 9A and 9B, in another example, the interfacing-structure 152 of the interface-index 146 includes, or takes the form of, a tooling ball that projects from the plate 150. The contacting-structure 154 of the contact-index 148 includes, or takes the form of, a cooperating tooling hole that is formed by the jaw assembly 144 and that is configured to receive and mate with the tooling ball when the grip head 232 properly engages the plate 150. In another example, this arrangement may be reversed. For example, the contacting-structure 154 includes, or takes the form of, the tooling ball and the interfacing-structure 152 includes, or takes the form of, the tooling hole.

Other structural configurations and/or arrangements of the contact-index 148 (e.g., the contacting-structure 154) and the interface-index 146 (e.g., the interfacing-structure 152) are also contemplated, such as a cooperating and complementary cup and cone configuration and the like.

Generally, any suitable configuration or arrangement of the contact-index 148 and the interface-index 146 may be used such that there are at least three points of contact between the gripper 108 and the indexing feature 104 that can be used to generate at least three data points representing at least three XYZ-coordinates of the indexing feature 104. In most cases, three data points is sufficient to generate a complete three-dimensional location of the fixture tool 102, during the locating and indexing operation described above.

In an example, the XZY-coordinate locations of at least two of the contact-indexes 148 (e.g., at least two of the contacting-structures 154) are different in at least two dimensions of the fixed coordinate system 112. Similarly, the XZY-coordinate locations of at least two of the interface-indexes 146 (e.g., at least two of the interfacing-structures 152) are different in at least two dimensions of the fixed coordinate system 112.

In an example implementation of the locating and indexing operation described above, the fixture tool 102 and, thus, the workpiece 170 are moved into the work location 258 for engagement of the indexing feature 104 by the gripper 108. With the fixture tool 102 in the work location 258, the location of the indexing feature 104 relative to the reference frame 216 is approximately known or is estimated within an acceptable tolerance to enable the gripper 108 to move to a pre-engaged location relative to the indexing feature 104, under computer control. The controller 110 then executes a search operation in which the gripper 108 incrementally moves along a predefined search path to find the interface-index 146 and to align and mate the contact-index 148 and the interface-index 146. With the contact-index 148 and the interface-index 146 suitably aligned and mated with each other, the contact-index 148 and the interface-index 146 share the point of contact and the locating and indexing operation is performed as described above.

Referring to FIGS. 8A and 9A, in an example, the gripper 108 includes at least one engagement-sensor 240. The engagement-sensor 240 is configured to determine when the gripper 108 is properly aligned with and engaged to the indexing feature 104, such as when the contact-index 148 and the interface-index 146 are suitably aligned and mated with each other. The engagement-sensor 240 includes, or takes the form of, any one of various types of suitable sensors, such as a depth gauge, a pressure sensor, a tooling probe, a displacement sensor, and the like.

Referring to FIGS. 1-6, in an example, the indexing apparatus 100 includes a vehicle 160. The vehicle 160 is configured to support the fixture tool 102. The vehicle 160 is also configured to move the fixture tool 102 relative to the operation cell 106. In an example, the vehicle 160 is configured to move the fixture tool 102 and, thus, the workpiece 170 to the work location 258 at which the gripper 108 engages the indexing feature 104 to perform the locating and indexing operations described above. In another example, the vehicle 160 is configured to move the fixture tool 102 and, thus, the workpiece 170 to the pre-work location relative to the operation cell 106 at which the gripper 108 engages the indexing feature 104 to perform the moving, locating, and indexing operations described above.

Referring to FIG. 1, in an example, the vehicle 160 includes, or takes the form of, an automated guided vehicle 162. The automated guided vehicle 162 is configured to autonomously move along a predefined travel path under computer control. In this example, the operation cell 106 may include one or more of sensors, guide tape, guide wires, laser targets, and any other suitable navigation mechanisms for moving the automated guided vehicle 162 along the predefined travel path. In this example, the automated guided vehicle 162 moving along the predefined travel path is configured to move the fixture tool 102 into the work location 258 (or the pre-work location) for the gripper 108 to find and engage the indexing feature 104, as described above.

Referring to FIGS. 1 and 2, in an example, the vehicle 160 includes, or takes the form of, a cart 164. The cart 164 is configured to travel along a track 166 running through the operation cell 106. In this example, the cart 164 moving along the track 166 is configured to move the fixture tool 102 into the work location 258 (or the pre-work location) for the gripper 108 to find and engage the indexing feature 104, as described above.

In an example, the track 166 is arranged such that the Z-coordinate of the fixture tool 102 and, thus, the indexing feature 104 is fixed and remains constant as the cart 164 travels along the track 166 to the work location 258. In this example, the locating operation performed by the gripper 108 needs only to determine the XY-coordinate of the points of contact between the gripper 108 and the indexing feature 104.

Referring to FIGS. 1 and 2, in an example, the manufacturing system 168 includes the operation cell 106 and the automated machine 128. The automated machine 128 is located in the operation cell 106 and is configured to perform at least one manufacturing operation. The manufacturing system 168 also includes the fixture tool 102. The fixture tool 102 is configured to support the workpiece 170 and is movable relative to the operation cell 106. The manufacturing system 168 further includes the indexing feature 104.

The indexing feature 104 is fixed relative to the fixture tool 102. For example, the indexing feature 104 is coupled to the fixture tool 102.

The manufacturing system 168 also includes the gripper 108. The gripper 108 is configured to engage the indexing feature 104. The manufacturing system 168 further includes the controller 110. The controller 110 is in communication with the gripper 108 and the automated machine 128. The controller 110 is configured to locate the fixture tool 102 relative to the operation cell 106 from the gripper location 114 of the gripper 108, engaged with the indexing feature 104. The controller 110 is also configured to index the automated machine 128 relative to the fixture-tool location 118 of the fixture tool 102.

Referring to FIGS. 1 and 7, in an example of the manufacturing system 168, the controller 110 is configured to determine the gripper location 114 of the gripper 108 in at least one dimension of the fixed coordinate system 112. The controller 110 is also configured to determine the indexing-feature location 116 of the indexing feature 104 in the at least one dimension of the fixed coordinate system 112 from the gripper location 114 of the gripper 108. The controller 110 is further configured to determine the fixture-tool location 118 of the fixture tool 102 in the at least one dimension of the fixed coordinate system 112 from the indexing-feature location 116 of the indexing feature 104. The controller 110 is also configured to register the digital model 120, representing the fixture tool 102 and the indexing feature 104, to the indexing-feature location 116 of the indexing feature 104 and to convert the model location 126 of the digital model 120, registered to the indexing-feature location 116, to the fixture-tool location 118 of the fixture tool 102.

Referring to FIGS. 1-3, in an example of the manufacturing system 168, the fixture tool 102 includes the mandrel 130 that is configured to support a composite laminate and the automated machine 128 includes the automated fiber placement machine 132 that is configured to perform at least one composite lay-up or lamination operation.

Referring to FIGS. 2 and 4, in an example of the manufacturing system 168, the gripper 108 is coupled to the automated machine 128 and the automated machine 128 is configured to move the gripper 108 relative to the reference frame 216 in at least one dimension of the fixed coordinate system 112. Referring to FIGS. 5 and 6, in an example, the gripper 108 is configured to move independent of the automated machine 128. Referring to FIGS. 2-6, in an example, the gripper 108 is configured to move the fixture tool 102 inside of the work envelope 140 of the operation cell 106.

Referring to FIGS. 8A, 8B, 9A and 9B, in an example of the manufacturing system 168, the indexing feature 104 includes at least one interface-index 146. The gripper 108 includes at least one contact-index 148 that is configured to engage the at least one interface-index 146.

Referring to FIG. 1-6, in an example, the manufacturing system 168 includes the vehicle 160. The vehicle 160 is configured to support the fixture tool 102 and to move the fixture tool 102 relative to the operation cell 106.

Referring to FIGS. 1 and 2, in an example, the manufacturing system 168 also includes the track 166. The track 166 runs through the operation cell 106. In this example, the vehicle 160 includes, or takes the form of, the cart 164 that is configured to travel along the track 166.

Figure 10:
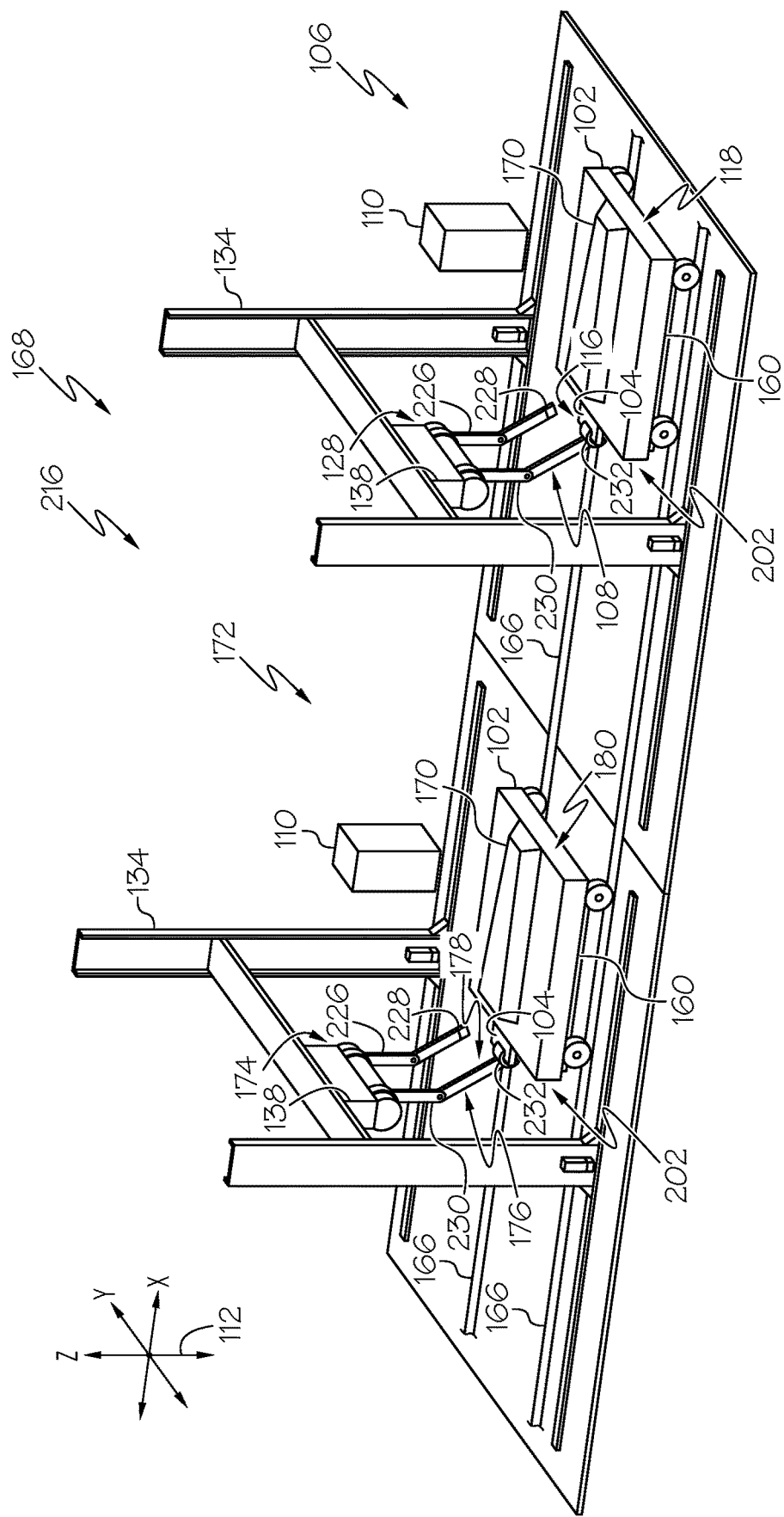
FIG. 10 is a schematic, perspective plan view of an example of the manufacturing system.

Referring to FIG. 10, in an example, the manufacturing system 168 includes the second operation cell 172. The manufacturing system 168 also includes the second automated machine 174. The second automated machine 174 is located in the second operation cell 172 and is configured to perform at least one manufacturing operation on the workpiece 170.

The manufacturing system 168 further includes a second gripper 176. The second gripper 176 is configured to engage the indexing feature 104. The controller 110 is in communication with the second gripper 176 and the second automated machine 174. The controller 110 is configured to locate the fixture tool 102 relative to the second operation cell 172 from a second gripper-location 178 of the second gripper 176, engaged with the indexing feature 104. The controller 110 is further configured to index the second automated machine 174 relative to a second fixture-tool location 180 of the fixture tool 102. Once indexed, the second automated machine 174 performs at least one manufacturing operation on the workpiece 170.

Figure 11:
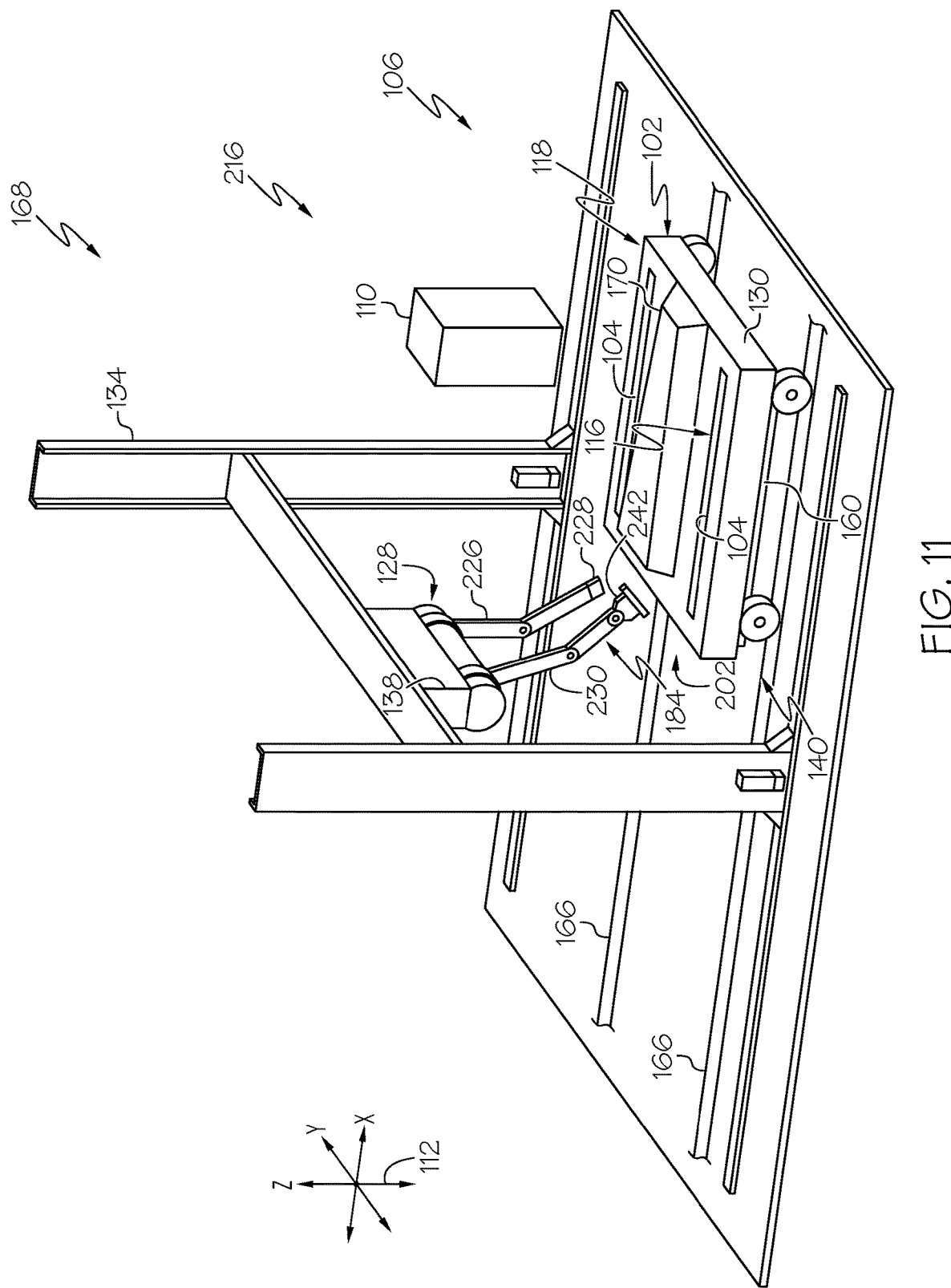
FIG. 11 is a schematic, perspective view of an example of the manufacturing system using the indexing apparatus.
Figure 12:
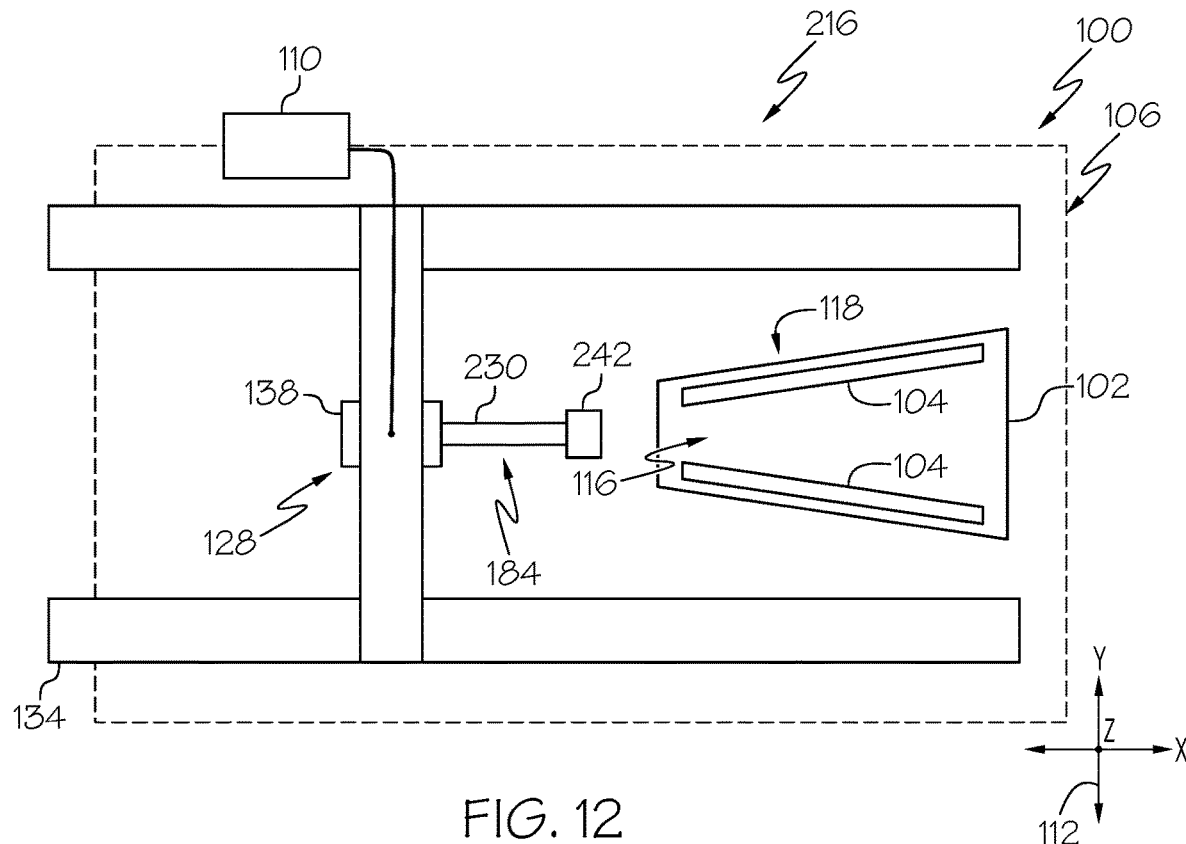
FIG. 12 is a schematic, top plan view of an example of the indexing apparatus.
Figure 13:
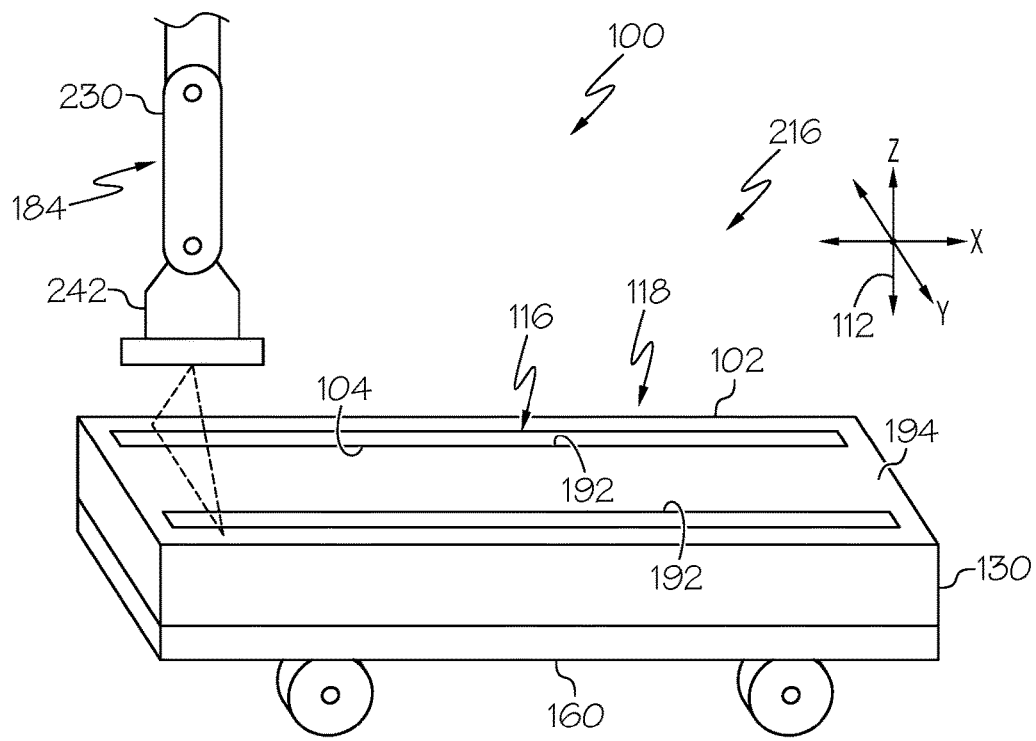
FIG. 13 is a schematic, perspective view of an example of the interfacing device, the indexing feature, and the fixture tool of the indexing apparatus.

Referring generally to FIG. 1 and particularly to FIGS. 11-13, in another example, the indexing apparatus 100 includes the fixture tool 102. The fixture tool 102 is movable relative to the operation cell 106. The apparatus 100 also includes the indexing feature 104. The indexing feature 104 is fixed relative to the fixture tool 102. For example, the indexing feature 104 is located on the fixture tool 102.

In the examples illustrated in FIGS. 11-15, the indexing feature 104 is coupled to, or is located on, a top of the fixture tool 102. In other examples, the indexing feature 104 is coupled to, or is located on, another portion (e.g., a side, a front, a rear, a bottom, etc.) of the fixture tool 102.

In an example, the indexing apparatus 100 includes the sensor 184. The sensor 184 is configured to detect (e.g., visually identify) the indexing feature 104. The indexing feature 104 is appropriately located relative to the fixture tool 102 so that at least a portion of the indexing feature 104 is visually accessible by the sensor 184. Conversely, the sensor 184 is appropriately located relative to the fixture tool 102 so that at least a portion of the sensor 184 is physically accessible by the indexing feature 104. In an example, the indexing feature 104 is located on, or is formed in, an exposed, outer surface of the fixture tool 102. The sensor 184 is configured to generate sensor data 186 (FIG. 1) that is representative of the location of the indexing feature 104 (the indexing-feature location 116) (FIG. 1). In other words, the sensor 184 locates the indexing feature 104 in the reference frame 216.

Referring to FIGS. 11-13, in an example, the sensor 184 includes the articulation mechanism 230 and a sensor head 242 that is coupled to the working end of the articulation mechanism 230. The articulation mechanism 230 is configured to move the sensor head 242 in three-dimensional space, such as linearly along at least one axis of the fixed coordinate system 112 and/or rotationally about at least one axis of the fixed coordinate system 112.

The articulation mechanism 230 is also configured to provide location data (e.g., interface data 222) (FIG. 1) that represents a location of the sensor 184 (e.g., the sensor head 242) relative to the reference frame 216. In an example, the location data and the sensor data 186 are used to determine the indexing-feature location 116 relative to the reference frame 216. In an example, and for the purpose of the present description, the location data of the sensor 184 relative to the reference frame 216 is incorporated with the sensor data 186.

Referring to FIG. 13, the sensor head 242 includes, or takes the form of, any one of various machine vision or computer vision systems that is configured to scan the fixture tool 102 and identify the indexing feature 104 from the scan. In an example, the sensor 184 (e.g., the sensor head 242) includes, or takes the form of, a camera that is configured to capture still images or video (e.g., the sensor data 186) that visually represent the fixture tool 102 and the indexing feature 104. In another example, the sensor 184 (e.g., the sensor head 242) includes, or takes the form of, a laser scanner that is configured to project laser light onto the fixture tool 102 and collect laser light deflected back from the fixture tool 102 and to generate the sensor data 186 from the collected laser light that represents the indexing feature 104.

In an example, the sensor data 186 is representative of, or corresponds to, the indexing-feature location 116. In an example, the laser scanner is a two-dimensional laser scanner and the sensor data 186 is representative of the location of the indexing feature 104 in two dimensions of the fixed coordinate system (e.g., the XY-coordinates). In another example, the laser scanner is a three-dimensional laser scanner and the sensor data 186 is representative of the location of the indexing feature in three dimensions of the fixed coordinate system (e.g., the XYZ-coordinates).

Referring to FIGS. 11 and 12, in an example, the articulation mechanism 230 is coupled to, or forms a portion of, the automated machine 128. In FIG. 12, the robotic arm 226 and the end effector 228 (FIG. 11) of the automated machine 128 (e.g., for performing the at least one manufacturing operation) are removed for clarity of illustration. In this example, the automated machine 128 is configured to move the sensor 184 relative to the operation cell 106 and the fixture tool 102 in at least one dimension of the fixed coordinate system 112. In other words, at least a portion of the range of motion, or one or more degrees of freedom, of the articulation mechanism 230 is provided by the automated machine 128.

Referring to FIG. 13, in an example, the articulation mechanism 230 is separate from and is independent of the automated machine 128. In this example, a full range of motion, or every degree of freedom, of the sensor 184 is provided by (e.g., is inherent to) the articulation mechanism 230.

Figure 14:
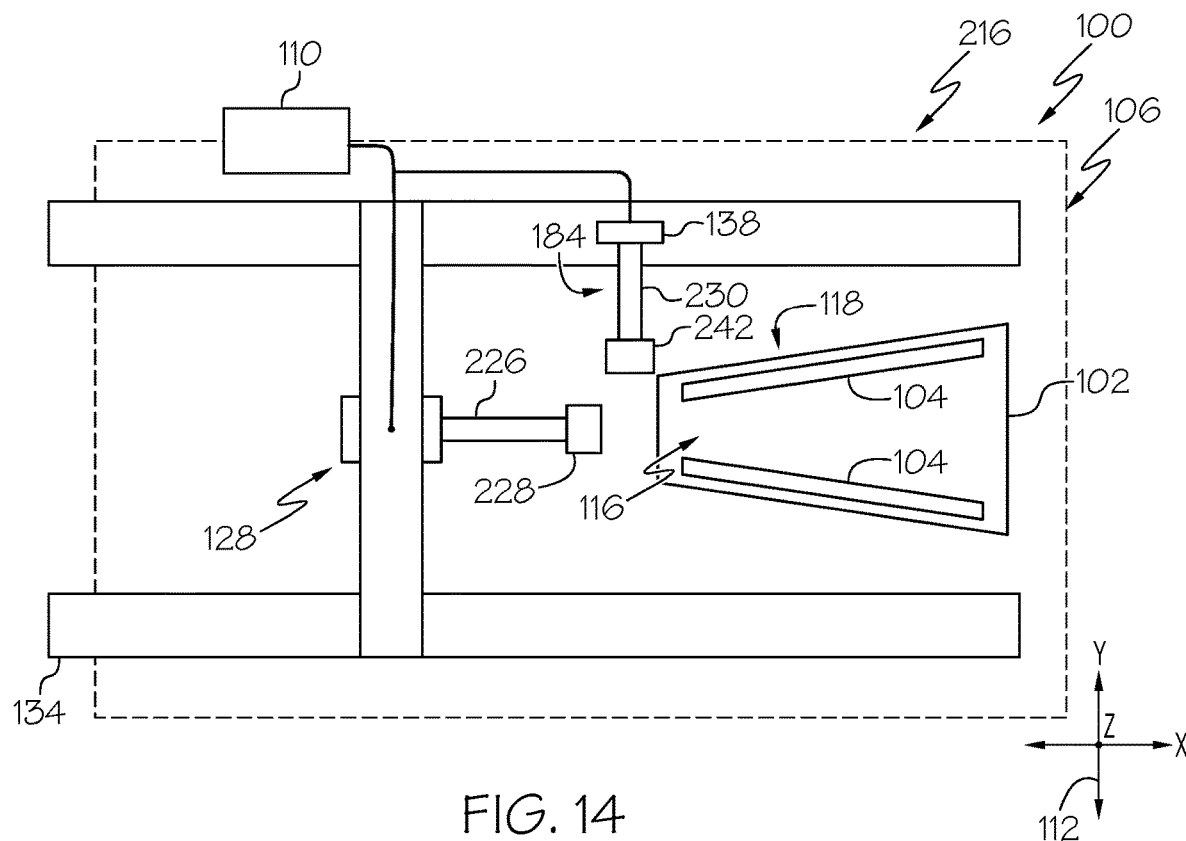
FIG. 14 is a schematic, top plan view of an example of the indexing apparatus.

Referring to FIG. 14, in another example of the indexing apparatus 100, the interfacing device 220 (FIG. 1) includes more than one sensor 184 (referred to herein as a plurality of sensors 184). In this example, the indexing apparatus 100 includes more than one indexing feature 104 (e.g., the plurality of indexing features 104). Each one of the indexing features 104 is fixed relative to the fixture tool 102. Each one of sensors 184 is configured to scan, detect, and locate at least a portion of the indexing feature 104 or a corresponding one of a plurality of the indexing features 104.

Referring to FIGS. 1 and 11-15, the indexing apparatus 100 also includes the controller 110. The controller 110 is in communication with the sensor 184. The controller 110 is configured to locate the fixture tool 102 relative to the operation cell 106 from the indexing-feature location 116 of the indexing feature 104, identified by the sensor 184.

In an example, the controller 110 is configured to determine the indexing-feature location 116 of the indexing feature 104, for example, relative to the reference frame 216 in at least one dimension of the fixed coordinate system 112, from the sensor data 186, generated by the sensor 184. The controller 110 is also configured to determine the fixture-tool location 118 of the fixture tool 102, for example, relative to the reference frame 216 in the at least one dimension of the fixed coordinate system 112, from the indexing-feature location 116 of the indexing feature 104.

In an example, the controller 110 is configured to register the digital model 120 (FIG. 1), representing the fixture tool 102 and the indexing feature 104, to the indexing-feature location 116 of the indexing feature 104. The controller 110 is also configured to convert the model location 126 of the digital model 120, registered to the indexing-feature location 116, to the fixture-tool location 118 of the fixture tool 102.

Figure 16:
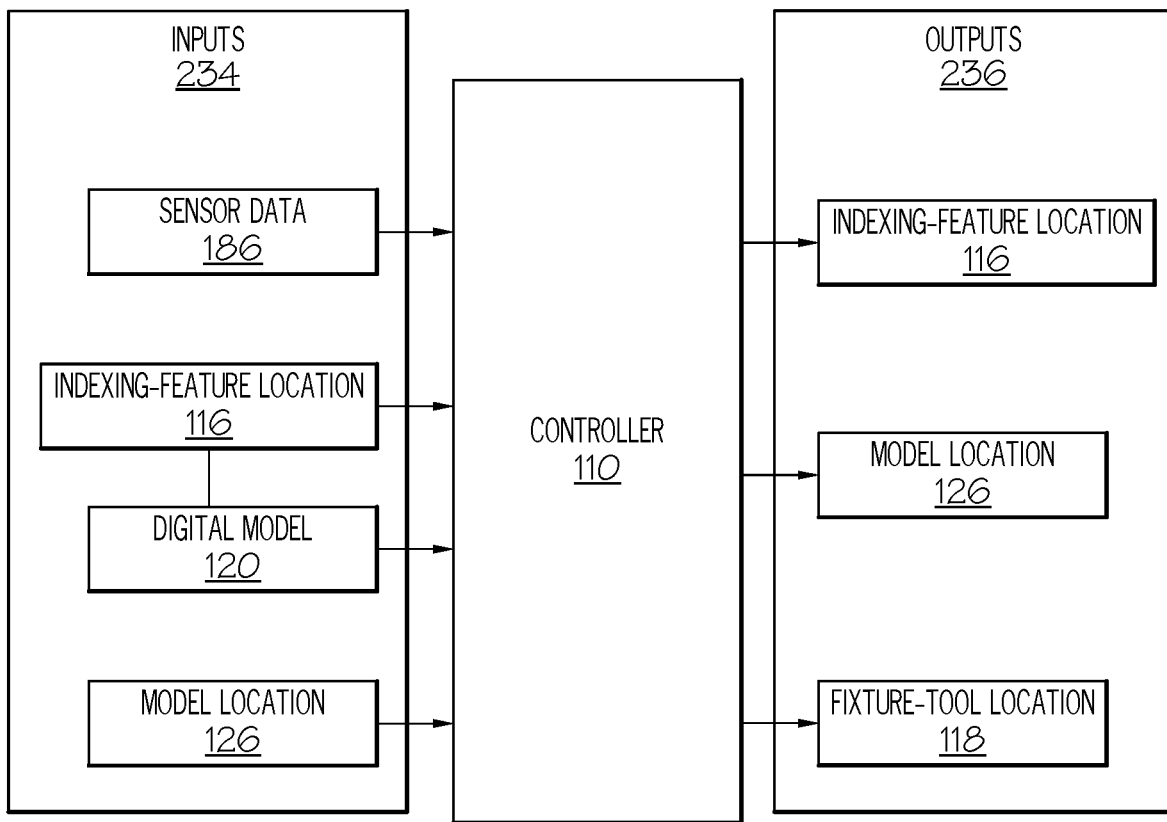
FIG. 16 is a schematic block diagram of an example of the processing operation used to determine the location of the fixture tool of the indexing apparatus.

FIG. 16 schematically illustrates an example of the inputs 234 provided to the controller 110 and the outputs 236 generated by the controller 110 during the locating and indexing operation. In an example, the sensor data 186 is provided to the controller 110 from the sensor 184. The sensor data 186 is an example of the interface data 222 (FIG. 1). In an example, the sensor data 186 (e.g., the interface data 222) also includes the location data that is representative of the actual, physical location of the sensor 184 (e.g., the sensor head 242) (FIG. 13) relative to the reference frame 216, for example, as generated by encoders, sensors, other relative positioning devices, or a combination thereof. The controller 110 processes the sensor data 186 and determines the indexing-feature location 116, based on the sensor data 186.

Referring to FIGS. 11-15, in an example, the sensor 184 (e.g., the sensor head 242) moves along a scan path relative to the fixture tool 102 and scans at least a portion of the fixture tool 102 that includes the indexing feature 104. The sensor 184 may collect a sufficient amount of data points of the sensor data 186 (FIG. 16) to locate the indexing feature 104 in a single pass or may require more than one pass. The controller 110 is configured to identify and extract data points representing the indexing feature 104. The controller 110 then determines the XYZ-coordinates of the data points representing the indexing feature 104 relative to the reference frame 216. The controller 110 then determines the indexing-feature location 116 as described by the XYZ-coordinates of the data points representing the indexing feature 104 in the sensor data 186.

The indexing feature 104 includes a structure that is visually perceptible and/or computationally distinguishable from a surrounding surface area of the fixture tool 102. For example, the indexing feature 104 includes a structural configuration that is suitable for computational perception and recognition, such as in a point cloud processing operation performed on a plurality of data points of the sensor data 186. The indexing-feature location 116 is described by the XYZ-coordinates of the plurality of data points representing the indexing feature 104 in the sensor data 186.

It should be noted that increasing the number of data points representing the indexing feature 104 in the sensor data 186 provides a greater number of XYZ-coordinate data points for processing, which, in turn, increases the accuracy of the indexing-feature location 116 and the fixture-tool location 118 during data point alignment of the indexing operation.

The controller 110 is configured to register the digital model 120, representing the fixture tool 102 and the indexing feature 104, to the indexing-feature location 116 and determines the model location 126. In an example, the controller 110 is configured to overlay and align the digital model 120 with the XYZ-coordinates describing the indexing-feature location 116 within the reference frame 216. The digital model 120 includes data points representing the indexing feature 104. In an example, the controller 110 performs a best fit operation (e.g., executes a best fit algorithm) to align data points representing the indexing feature 104 with data points representing the XYZ-coordinates describing the indexing-feature location 116. In an example, the best fit operation includes a rigid body, point cloud transformation operation.

With the digital model 120 registered and aligned with the indexing-feature location 116, the controller 110 is configured to convert the model location 126 to the fixture-tool location 118 of the fixture tool 102, for example, relative to the reference frame 216. For example, the fixture-tool location 118 is assumed to be the same as the model location 126 within tolerance. Thus, the fixture-tool location 118 represents the immediate (e.g., current, real-time) location of the fixture tool 102 and, thus, the workpiece 170 relative to the operation cell 106 and the automated machine 128.

With the fixture-tool location 118 known, the automated machine 128 is indexed, or is "zeroed", relative to the fixture-tool location 118 and follows the predetermined tool path to perform the manufacturing operation on the workpiece 170. Indexing the automated machine 128 relative to the fixture tool 102, based on the fixture-tool location 118, consequently indexes the automated machine 128 relative to the workpiece 170. The geometry of the workpiece 170 and the known location of the workpiece 170 relative to the fixture tool 102 are incorporated in and are accounted for by the programmed tool path of the automated machine 128

Referring to FIGS. 1 and 11, in an example, the indexing apparatus 100 includes the automated machine 128. The automated machine 128 is located in the operation cell 106 and is in communication with the controller 110. The controller 110 is configured to index the automated machine 128 relative to the fixture-tool location 118 of the fixture tool 102.

Referring to FIGS. 11, 12, 14 and 15, in an example, the automated machine 128 includes the gantry 134. In this example, the fixture tool 102 and, thus, the workpiece 170 is moved to the work location 258 within the operation cell 106 and the gantry 134 and/or the robotic arm 226, coupled to the gantry 134, moves relative to the fixture tool 102 so that the end effector 228 follows along the predetermined tool path.

In another example (not shown), the robotic arm 226 is a stand-alone robot that has a fixed base within the operation cell 106. In this example, the fixture tool 102 and, thus, the workpiece 170 are moved to the work location 258 within the operation cell 106 and the robotic arm 226 moves relative to the fixture tool 102 so that the end effector 228 follows along the predetermined tool path.

While the illustrated examples of the indexing apparatus 100 show only one automated machine 128 (e.g., one robotic arm 226 with one end effector 228) for performing the manufacturing operation on the workpiece 170 in the operation cell 106, in other examples, the indexing apparatus 100 may have any number of additional automated machines 128 (e.g., additional robotic arms 226 and/or additional end effectors 228).

Referring to FIGS. 1 and 11, in an example, the manufacturing operation includes a pre-cure composite assembly operation, such as the composite layup operation and/or composite lamination operation. In this example, the workpiece 170 includes the composite laminate (e.g., layup of a composite material). The fixture tool 102 includes, or takes the form of, the mandrel 130. The mandrel 130 is configured to support a composite laminate. The automated machine 128 includes, or takes the form of, the automated fiber placement machine 132.

In an example, the fixture tool 102 is moved into the work location 258 and the immediate location of the fixture tool 102 and the workpiece 170 (e.g., the fixture-tool location 118) is determined using the sensor 184 and the indexing feature 104, as described above. Based on the fixture-tool location 118 (e.g., the location of the fixture tool 102 and the location of the workpiece 170 relative to the location of the fixture tool 102), the automated fiber placement machine 132 lays down and/or consolidates at least a portion of at least one layer of a stack of composite sheets.

In one or more other examples (not explicitly illustrated), the manufacturing operation includes another assembly operation or machining operation. In such examples, the workpiece 170 may be a post-cure composite workpiece, metallic workpiece, plastic workpiece, or other non-composite workpiece. The fixture tool 102 includes the suitable holding-features 260 (FIG. 1) configured to secure the workpiece 170 during movement to the operation cell 106 and during the manufacturing operation. The automated machine 128 includes, or takes the form of, any appropriate machine tool.

Figure 15:
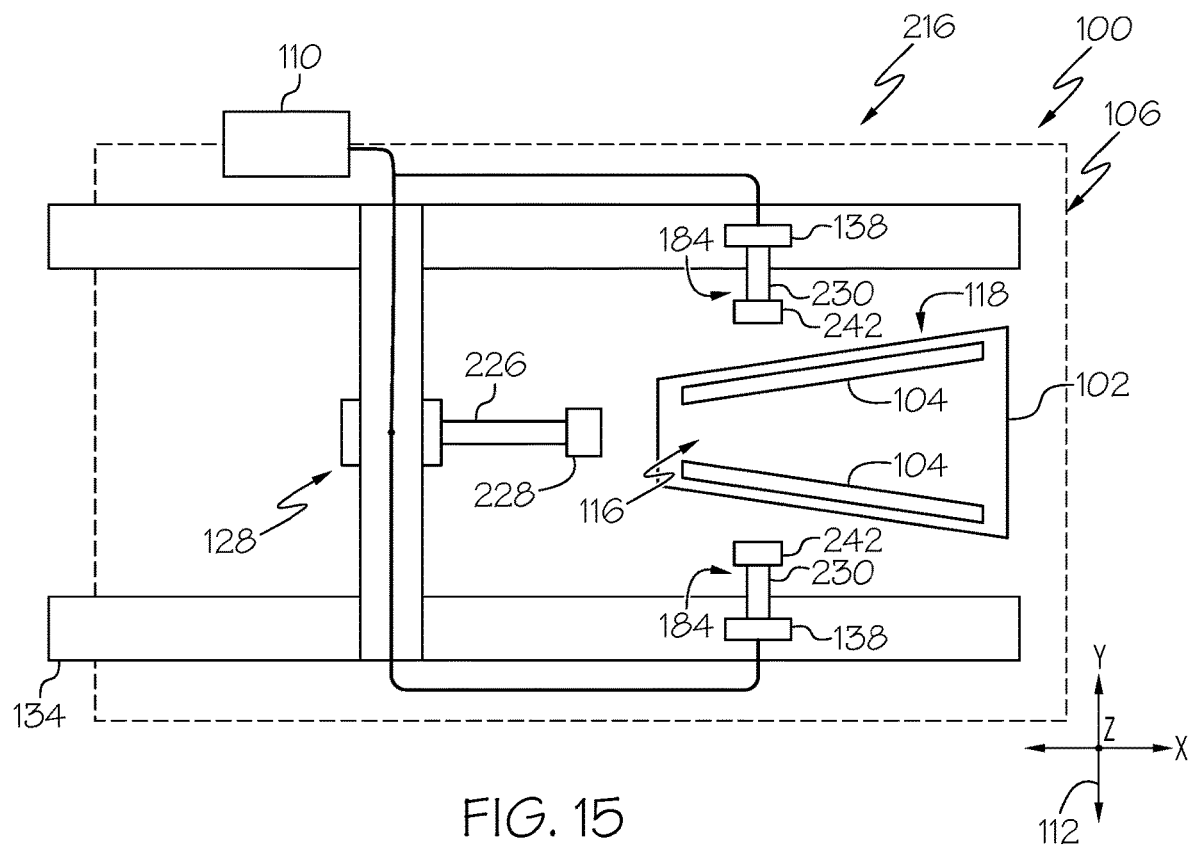
FIG. 15 is a schematic, top plan view of an example of the indexing apparatus.

Referring to FIGS. 12, 14 and 15, in an example, the indexing apparatus 100 includes the drive assembly 138 that is coupled to the sensor 184. The drive assembly 138 is configured to move the sensor 184 (e.g., the sensor head 242) relative to the reference frame 216, such as in one or more dimensions of the fixed coordinate system 112. In an example, the drive assembly 138 is coupled to, or forms a portion of the articulation mechanism 230 of the sensor 184, such as in examples where the sensor 184 is separate from the automated machine 128, as illustrated in FIGS. 14 and 15. In another example, the drive assembly 138 is couple to, or is formed by, the automated machine 128, such as in examples where the sensor 184 is coupled to the automated machine 128, as illustrated in FIGS. 11 and 12.

In an example, the indexing apparatus 100 includes the independent moving mechanism (not shown) that is configured to move the fixture tool 102 to the work location 258.

Referring to FIG. 13, in an example, the indexing feature 104 includes at least one interfacing-structure 192. In the example illustrated in FIG. 13, the indexing feature 104 includes two interfacing-structures 192. However, in other examples, the indexing feature 104 includes any number of interfacing-structures 192.

In an example, the interfacing-structure 192 is located on a surface 194 (e.g., an exposed surface) of the fixture tool 102. In other words, the interfacing-structure 192 is suitably located as not to be covered or otherwise obscured by the workpiece 170 (not shown in FIG. 13) that is secured to the fixture tool 102. The interfacing-structure 192 is suitably located to be visually accessible by the sensor 184 during the locating and indexing operation described above. The interfacing-structure 192 includes any one of a variety of different structures that is visually perceptible and/or computationally discernable from the surface 194 of the fixture tool 102 that surrounds the indexing feature 104. FIGS. 17-20 schematically illustrate various examples of the interfacing-structure 192.

Figure 17:
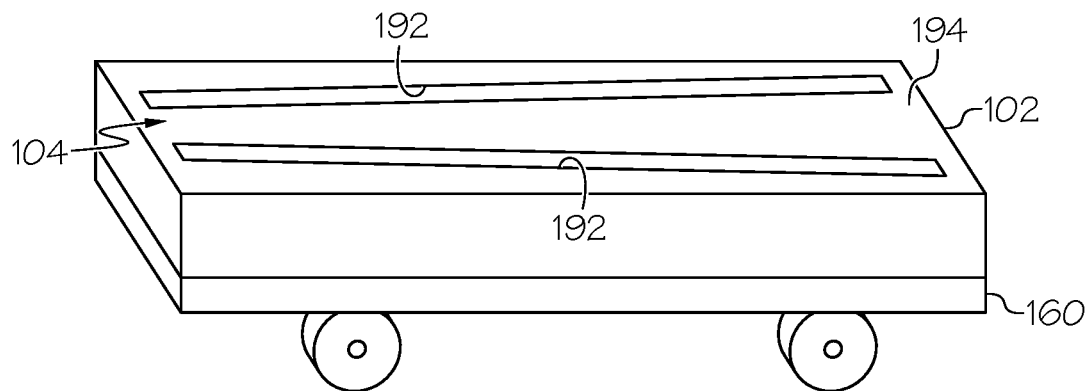
FIG. 17 is a schematic, perspective view of an example of the indexing feature and the fixture tool of the indexing apparatus.

Referring to FIG. 17, in an example, in an example of the indexing feature 104, the interfacing-structure 192 is continuous and extends longitudinally along the surface 194 (e.g., a top surface) of the fixture tool 102. In other words, the interfacing-structure 192 may be a continuous interfacing-structure. In an example, the interfacing-structure 192 may be linear, as illustrated in FIG. 17. In another example, the interfacing-structure 192 may be non-linear.

Figure 18:
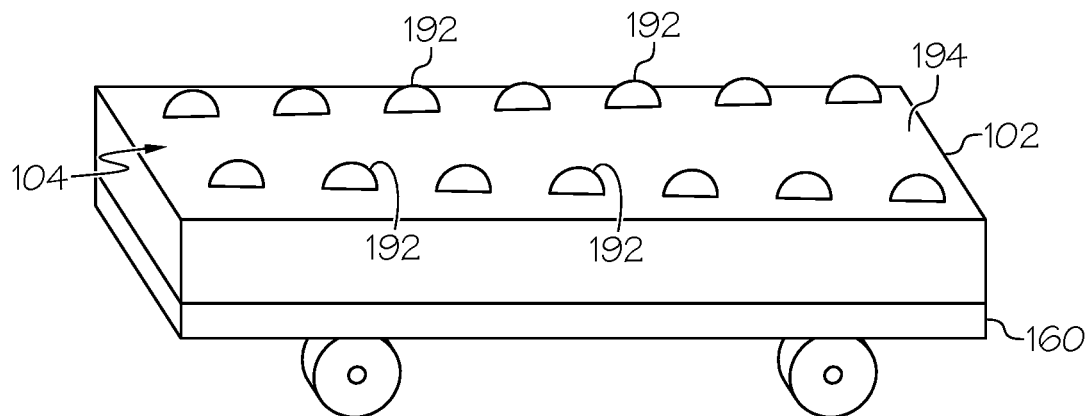
FIG. 18 is a schematic, perspective view of an example of the indexing feature and the fixture tool of the indexing apparatus.

Referring to FIG. 18, in another example of the indexing feature 104, the interfacing-structure 192 is discontinuous and extends longitudinally along the surface 194 of the fixture tool 102. In other words, the interfacing-structure 192 may be a plurality of discontinuous interfacing-point structures (e.g., also referred to herein as a plurality of interfacing-structures 192). In an example, the plurality of interfacing-structures 192 may be arranged linearly, as illustrated in FIG. 18. In another example, the plurality of interfacing-structures 192 may be arranged non-linearly.

In an example, the interfacing-structure 192 is a continuous groove formed in (e.g., depending from) the surface 194 of the fixture tool 102. In another example, the interfacing-structure 192 is a continuous ridge formed on (e.g., projecting from) the surface 194 of the fixture tool 102. In another example, each one of the plurality of interfacing-structures 192 includes an aperture formed in (e.g., depending from) the surface 194. In another example, each one of the plurality of interfacing-structures 192 includes a protrusion formed on (e.g., projecting from) the surface 194.

In the illustrated example, the indexing feature 104 includes two interfacing-structures 192. In other examples, the indexing feature 104 includes any number of interfacing-structures 192. Other structural configurations and/or arrangements of the interfacing-structure 192 are also contemplated.

Figure 19:
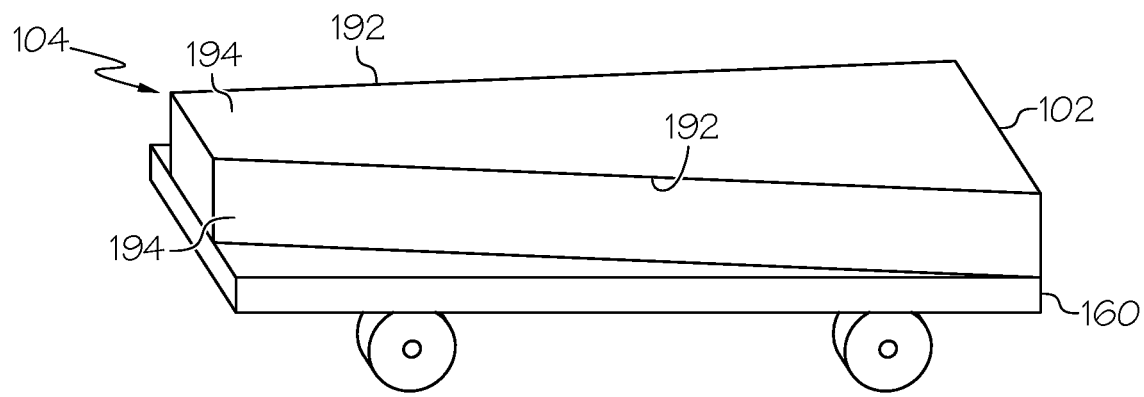
FIG. 19 is a schematic, perspective view of an example of the indexing feature and the fixture tool of the indexing apparatus.

Referring to FIG. 19, in another example, the interfacing-structure 192 is formed by an edge of the fixture tool 102. In an example, the edge extends continuously and longitudinally along the fixture tool 102. In an example, the edge is formed by the intersection of two exposed surfaces 194 (e.g., a top surface and a side surface) of the fixture tool 102. In the illustrated example, the interfacing-structure 192 of the indexing feature 104 includes, or is formed by, two edges of the fixture tool 102. In other examples, the interfacing-structure 192 of the indexing feature 104 includes, or is formed by, any number of edges.

In another example, the interfacing-structure 192 includes a combination of two or more of types of structures, such as grooves, ridges, a series of apertures, a series of protrusions, and edges. Various other configurations of the interfacing-structure 192 are also contemplated.

In an example in which the indexing feature 104 includes two or more interfacing-structures 192, the interfacing-structures 192 (e.g., grooves, ridges, apertures, protrusions, and edges) are non-parallel to each other (e.g., oriented oblique to each other). The non-parallel arrangement of the interfacing-structures 192 provides non-parallel data points in the sensor data 186 that can be combined during processing to derive the XYZ-coordinates of the plurality of data points relative to the reference frame 216 in more than one dimension of the fixed coordinate system 112.

Referring to FIGS. 11-15, in an example, the indexing apparatus 100 includes the vehicle 160. The vehicle 160 is configured to support the fixture tool 102 and to move the fixture tool 102 relative to the operation cell 106. In an example, the vehicle 160 is configured to move the fixture tool 102 and, thus, the workpiece 170 to the work location 258 at which the sensor 184 scans and detects (e.g., visually identifies) the indexing feature 104 to perform the locating and indexing operations described above.

Referring to FIG. 1, in an example of the indexing apparatus 100, the vehicle 160 includes, or takes the form of, the automated guided vehicle 162. Referring to FIGS. 1 and 11, in an example, the vehicle 160 includes, or takes the form of, the cart 164. The cart 164 is configured to travel along the track 166 running through the operation cell 106.

In an example, the track 166 is arranged such that the Z-coordinate of the fixture tool 102 and, thus, the indexing feature 104 is fixed and remains constant as the cart 164 travels along the track 166 to the work location 258. In this example, the locating operation performed by the sensor 184 needs only to determine the XY-coordinate of the indexing feature 104.

Referring to FIGS. 1 and 11, in another example, the manufacturing system 168 includes the operation cell 106 and the automated machine 128. The automated machine 128 is located in the operation cell 106 and is configured to perform at least one manufacturing operation. The manufacturing system 168 also includes the fixture tool 102. The fixture tool 102 is configured to support the workpiece 170 and is movable relative to the operation cell 106. The manufacturing system 168 further includes the indexing feature 104. The indexing feature 104 is fixed relative to the fixture tool 102. For example, the indexing feature 104 is located on the fixture tool 102.

The manufacturing system 168 also includes the sensor 184. The sensor 184 is configured to detect (e.g., visually identify) the indexing feature 104. The manufacturing system 168 further includes the controller 110 that is in communication with the sensor 184 and the automated machine 128. The controller 110 is configured to locate the fixture tool 102 relative to the operation cell 106 from the indexing-feature location 116 of the indexing feature 104, identified by the sensor 184. The controller 110 is also configured to index the automated machine 128 relative to the fixture-tool location 118 of the fixture tool 102.

Referring to FIGS. 1 and 16, in an example of the manufacturing system 168, the controller 110 is configured to determine the indexing-feature location 116 of the indexing feature 104 in at least one dimension of the fixed coordinate system 112 from sensor data 186, generated by the sensor 184. The controller 110 is also configured to determine the fixture-tool location 118 of the fixture tool 102 in the at least one dimension of the fixed coordinate system 112 from the indexing-feature location 116 of the indexing feature 104. The controller 110 is further configured to register the digital model 120, representing the fixture tool 102 and the indexing feature 104, to the indexing-feature location 116 of the indexing feature 104; and to convert the model location 126 of the digital model 120, registered to the indexing-feature location 116, to the fixture-tool location 118 of the fixture tool 102.

Referring to FIGS. 1, 11 and 13, in an example of the manufacturing system 168, the fixture tool 102 includes the mandrel 130 that is configured to support a composite laminate and the automated machine 128 includes the automated fiber placement machine 132 that is configured to perform at least one composite lay-up or lamination operation.

Referring to FIGS. 11 and 12, in an example of the manufacturing system 168, the sensor 184 is coupled to the automated machine 128 and the automated machine 128 is configured to move the sensor 184 relative to the fixture tool 102 in at least one dimension of the fixed coordinate system 112. Referring to FIGS. 14 and 15, in an example, the sensor 184 is configured to move independent of the automated machine 128.

Referring to FIGS. 13 and 17-19, in an example of the manufacturing system 168, the indexing feature 104 includes at least one interfacing-structure 192, located on the surface 194 of the fixture tool 102. The interfacing-structure 192 is visually detectable (e.g., perceptible and recognizable) by the sensor 184.

Referring to FIGS. 1 and 11-15, in an example, the manufacturing system 168 includes the vehicle 160. The vehicle 160 is configured to support the fixture tool 102 and to move the fixture tool 102 relative to the operation cell 106.

Referring to FIGS. 1 and 11, in an example, the manufacturing system 168 also includes the track 166. The track 166 runs through the operation cell 106. In this example, the vehicle 160 includes, or takes the form of, the cart 164 that is configured to travel along the track 166.

Figure 20:
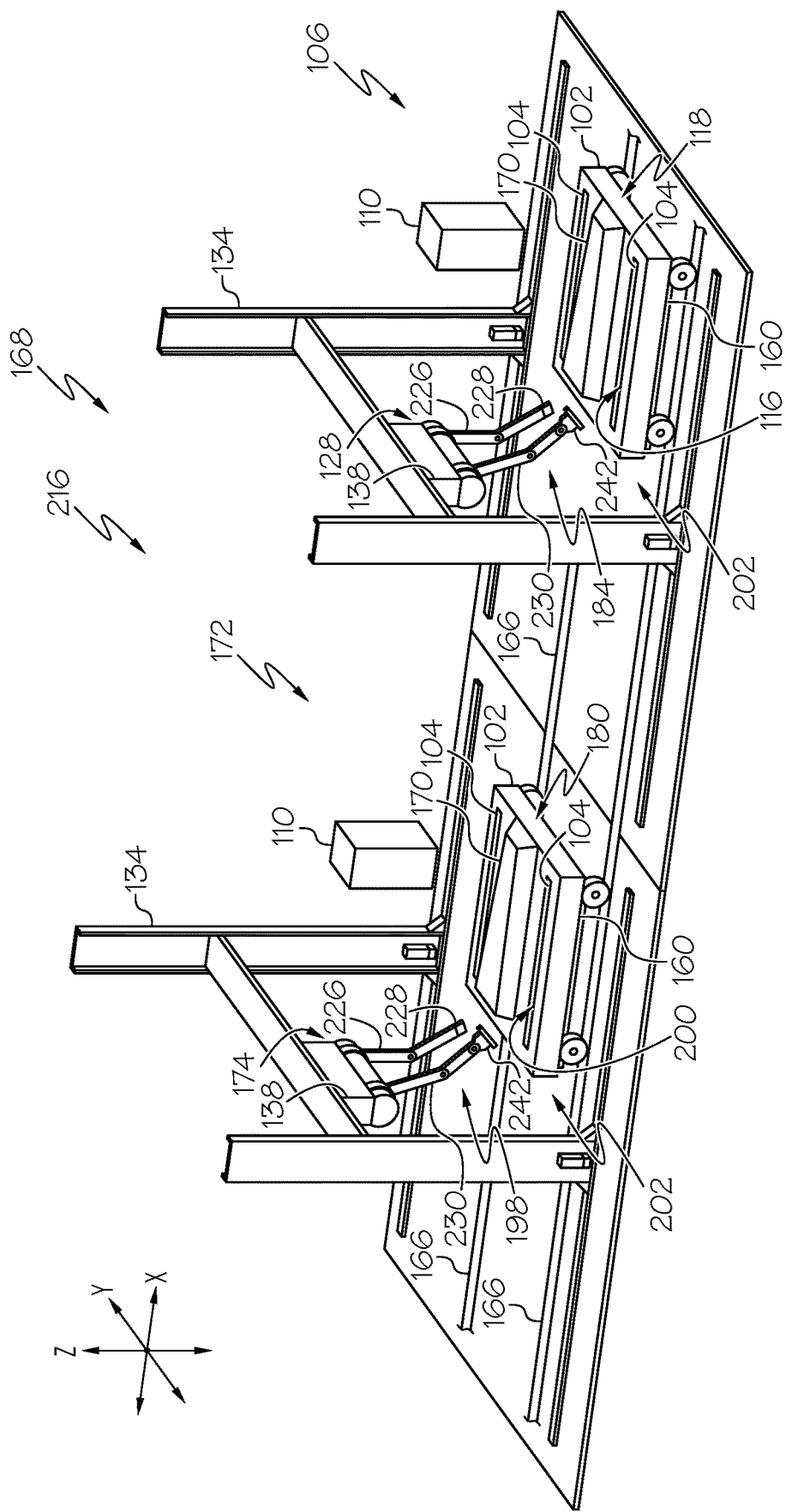
FIG. 20 is a schematic, perspective plan view of an example of the manufacturing system.

Referring to FIG. 20, in an example, the manufacturing system 168 includes the second operation cell 172. The manufacturing system 168 also includes the second automated machine 174. The second automated machine 174 is located in the second operation cell 172 and configured to perform at least one manufacturing operation on the workpiece 170.

The manufacturing system 168 also includes a second sensor 198. The second sensor 198 is configured to detect (e.g., visually identify) the indexing feature 104. The controller 110 is in communication with the second sensor 198 and the second automated machine 174. The controller 110 is configured to locate the fixture tool 102 relative to the second operation cell 172 from a second indexing-feature location 200 of the indexing feature 104, identified by the second sensor 198. The controller 110 is also configured to index the second automated machine 174 relative to a second fixture-tool location 180 of the fixture tool 102. Once indexed, the second automated machine 174 performs at least one manufacturing operation on the workpiece 170.

Figure 21:
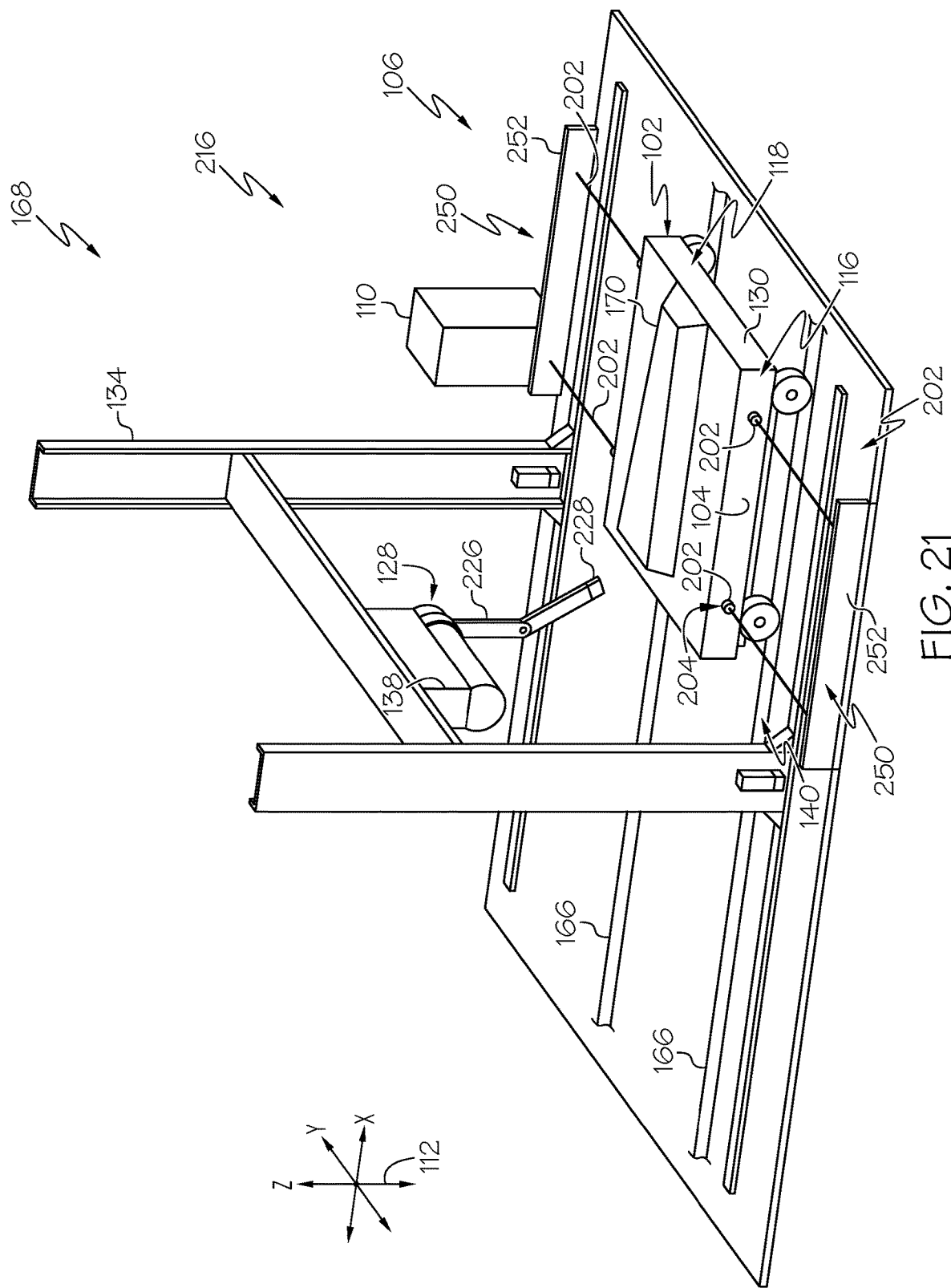
FIG. 21 is a schematic, perspective view of an example of the manufacturing system using the indexing apparatus.
Figure 22:
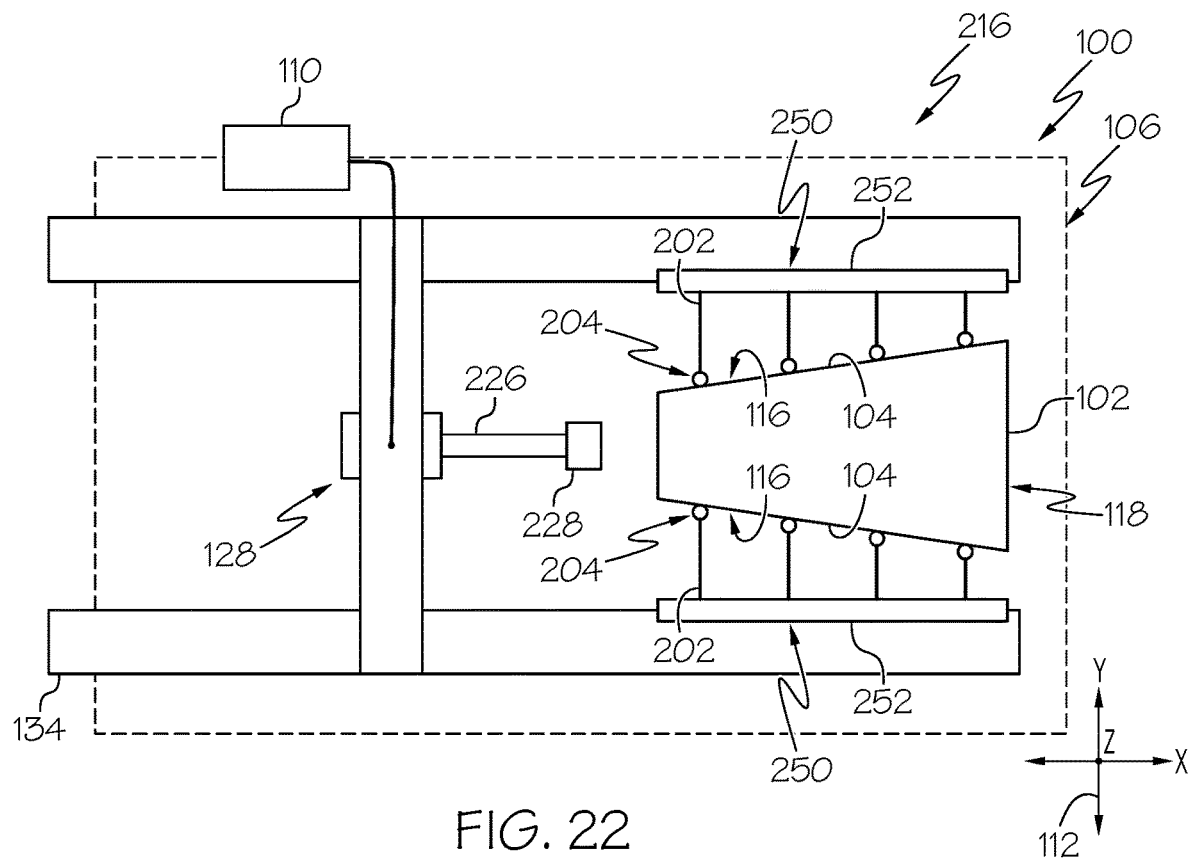
FIG. 22 is a schematic, top plan view of an example of the indexing apparatus.
Figure 23:
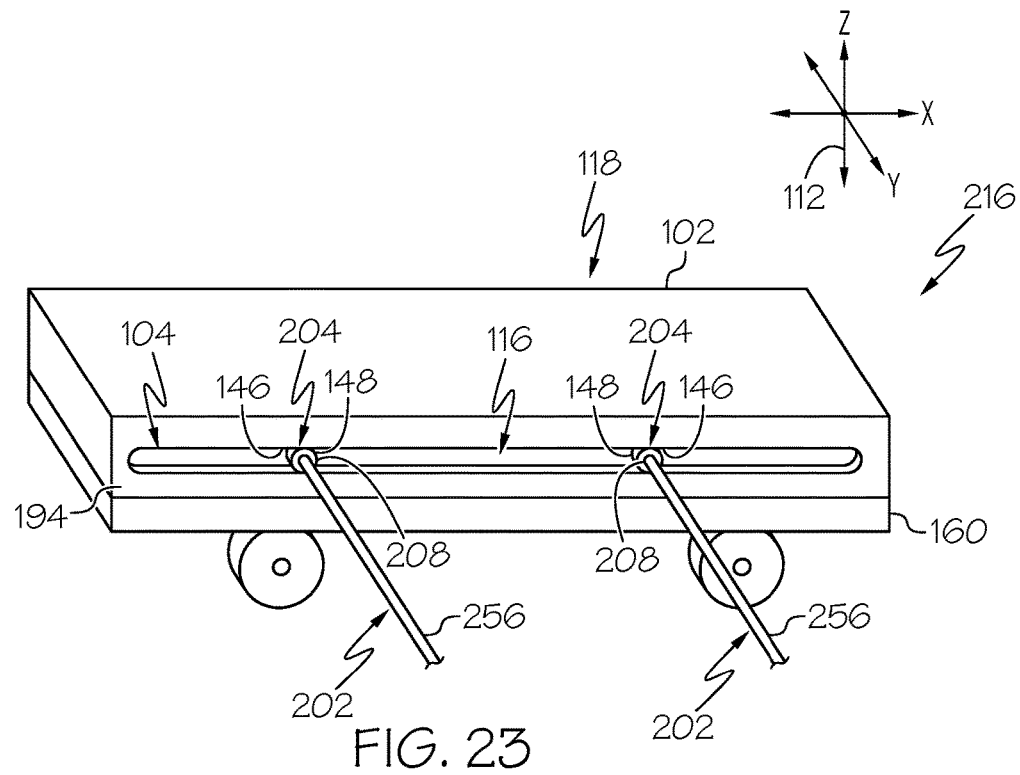
FIG. 23 is a schematic, perspective view of an example of the interfacing device, the indexing feature, and the fixture tool of the indexing apparatus.

Referring generally to FIG. 1 and particularly to FIGS. 21-23 in another example, the indexing apparatus 100 includes the fixture tool 102. The fixture tool 102 is movable relative to the operation cell 106. The indexing apparatus 100 also includes the indexing feature 104. The indexing feature 104 is fixed relative to the fixture tool 102. For example, the indexing feature 104 is formed by, or is otherwise disposed on, the fixture tool 102.

In the examples illustrated in FIGS. 21-23, the indexing feature 104 is coupled to, or is located on, at least one side of the fixture tool 102. In other examples, the indexing feature 104 is coupled to, or is located on, another portion (e.g., an opposing side, a front, a rear, a top, a bottom, etc.) of the fixture tool 102.

In an example, the indexing apparatus 100 includes the plurality of probes 202. The plurality of probes 202 is movable relative to the operation cell 106 and the fixture tool 102. The plurality of probes 202 is configured to engage (e.g., to make physical contact with) the indexing feature 104. The indexing feature 104 is appropriately located relative to the fixture tool 102 so that at least a portion of the indexing feature 104 is physically accessible by the plurality of probes 202. Conversely, the plurality of probes 202 is appropriately located relative to the fixture tool 102 so that at least a portion of the plurality of probes 202 is physically accessible by the indexing feature 104. With the plurality of probes 202 engaged to the indexing feature 104, a plurality of locations of the plurality of probes 202 (also referred to herein as a plurality of probe locations 204) (FIG. 1) is representative of, or corresponds to, the indexing-feature location 116 (FIG. 1). In other words, the plurality of probes 202 locates the indexing feature 104 in the reference frame 216.

Referring to FIGS. 21-23, in an example of the indexing apparatus 100, the plurality of probes 202 form a portion of a probe assembly 250 (e.g., the probe assembly 250 includes the plurality of probes 202). The probe assembly 250 includes a drive mechanism 252 that is coupled to each one of the plurality of probes 202 associated with the probe assembly 250. The drive mechanism 252 is configured to move each one of the plurality of probes 202 (e.g., also referred to collectively as probes 202 and individually as probe 202) relative to the fixture tool 102 in at least one dimension of the fixed coordinate system 112. For example, the drive mechanism 252 is configured to linearly translate (e.g., extend and retract) each probe 202 in one dimension (e.g., a Y-direction) of the fixed coordinate system 112.

The drive mechanism 252 includes at least one suitable drive motor (not shown) to drive motion of the probes 202, such as an electromechanical motor, a pneumatic motor, a hydraulic motor, and the like. The probe assembly 250 is also configured to provide location data (e.g., the interface data 222) that represents a plurality of locations of the probes 202, for example, relative to the reference frame 216 in at least one dimension of the fixed coordinate system 112 (e.g., the plurality of probe locations 204). For example, the probe assembly 250 also includes at least one encoder (not shown) and/or at least one sensor (not shown) that converts motion of each probe 202 into an electrical signal that represents the probe location 204 of the corresponding probe 202. The probe assembly 250 also includes other suitable electronic, mechanical, pneumatic, and hydraulic components (not shown). The drive mechanism 252 operates under computer control, such as by the controller 110.

In the examples illustrated in FIGS. 21 and 22, the indexing apparatus 100 includes two probe assemblies 250, for example, that are opposite each other, so that the probes 202 associated with each one of the probe assemblies 250 engage corresponding indexing features 104, for example, disposed on opposing sides of the fixture tool 102. In another example, the indexing apparatus 100 includes one probe assembly 250 so that the probes 202 associated with the probe assembly 250 engage the indexing feature 104 disposed on the fixture tool 102.

Referring to FIGS. 1 and 21-23, the indexing apparatus 100 also includes the controller 110. The controller 110 is in communication with the plurality of probes 202. The controller 110 is configured to locate the fixture tool 102 relative to the operation cell 106 from the plurality of probe locations 204 of the plurality of probes 202, with the plurality of probes 202 engaged to the indexing feature 104.

In an example of the indexing apparatus 100, the controller 110 is configured to determine the plurality of probe locations 204 of the plurality of probes 202, for example, relative to the reference frame 216 in at least one dimension of the fixed coordinate system 112. The controller 110 is also configured to determine the indexing-feature location 116 of the indexing feature 104, for example, relative to the reference frame 216 in the at least one dimension of the fixed coordinate system 112, from the plurality of probe locations 204 of the plurality of probes 202. The controller 110 is further configured to determine the fixture-tool location 118 of the fixture tool 102, for example, relative to the reference frame 216 in the at least one dimension of the fixed coordinate system 112, from the indexing-feature location 116 of the indexing feature 104.

In an example, the controller 110 is configured to register the digital model 120 (FIG. 1), representing the fixture tool 102 and the indexing feature 104, to the indexing-feature location 116 of the indexing feature 104. The controller 110 is also configured to convert the model location 126 of the digital model 120, registered to the indexing-feature location 116, to the fixture-tool location 118 of the fixture tool 102.

Figure 24:
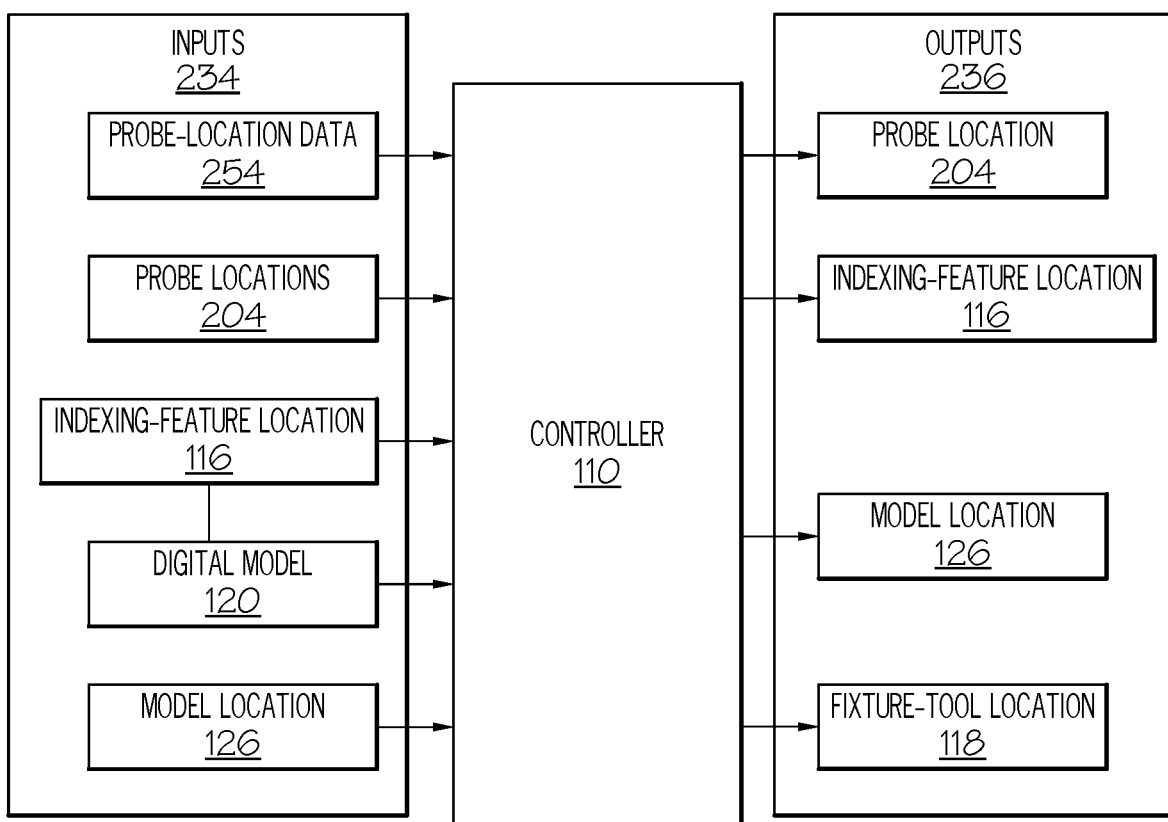
FIG. 24 is a schematic block diagram of an example of the processing operation used to determine the location of the fixture tool of the indexing apparatus.

FIG. 24 schematically illustrates an example of the inputs 234 provided to the controller 110 and the outputs 236 generated by the controller 110 during the locating and indexing operation. In an example, probe-location data 254 is provided to the controller 110 by the probe assembly 250. The probe-location data 254 is an example of the interface data 222 (FIG. 1). In an example, the probe-location data 254 is generated by encoders, sensors, other relative positioning devices, or a combination thereof and is representative of the actual, physical location of the plurality of probes 202 (the probe locations 204) (FIG. 13). The controller 110 processes the probe-location data 254 and determines the probe locations 204 based on the probe-location data 254. The controller 110 then processes the probe locations 204 and determines the indexing-feature location 116 based on the probe locations 204.

Referring to FIGS. 21-23, in an example, with the probes 202 engaged to the indexing feature 104, there are a plurality of points of contact between the probes 202 and the indexing feature 104. Each one of these points of contact has an XYZ-coordinate that is common to both the corresponding probe 202 and the indexing feature 104. The probe-location data 254 (FIG. 24) represents an XYZ-coordinates of the points of contact of the probes 202 (e.g., the XYZ-coordinate of the point of contact of each probe 202) and the probe locations 204 are described by the XYZ-coordinates of the points of contact of the probes 202. The controller 110 converts the XYZ-coordinates of the points of contact of the probes 202 to XYZ-coordinates of corresponding points of contact of the indexing feature 104. The controller 110 then determines the indexing-feature location 116 as described by the XYZ-coordinates of points of contact of the indexing feature 104.

In an example, the probe assembly 250 includes at least two probes 202 corresponding to at least two points of contact between the probes 202 and the indexing feature 104, which, in turn, provides at least two XYZ-coordinates describing the indexing-feature location 116 of the indexing feature 104. In another example, the probe assembly 250 includes at least three probes 202 corresponding to at least three points of contact between the probes 202 and the indexing feature 104, which, in turn, provides at least three XYZ-coordinates describing the indexing-feature location 116 of the indexing feature 104. In another example, a combination of the probes 202 from two or more probe assemblies 250 correspond to at least three points of contact between the probes 202 and the indexing feature 104, which, in turn, provides at least three XYZ-coordinates describing the indexing-feature location 116 of the indexing feature 104.

In an example, the plurality of points of contact are provided by the probes 202 of one probe assembly 250 that engage the indexing feature 104 disposed on the fixture tool 102. In another example, some of the points of contact are provided by the probes 202 associated in a first probe assembly 250 that engage a first portion of the indexing feature 104 (or a first indexing feature 104) disposed on a first side (or first surface) of the fixture tool 102 and some of the points of contact are provided by the probes 202 associated with a second probe assembly 250 that engage a second portion of the indexing feature 104 (or a second indexing feature 104) disposed on a second side (or second surface) of the fixture tool 102.

It should be noted that increasing the number of points of contact between the probes 202 and the indexing feature 104 (e.g., by increasing the number of probes 202 engaged with the indexing feature 104) provides a greater number of XYZ-coordinate data points for processing, which, in turn, increases the accuracy of the indexing-feature location 116 and the fixture-tool location 118 during data point alignment of the indexing operation.

In the illustrated examples, probes 202 (e.g., of opposing probe assemblies 250) are arranged to engage portions of the indexing feature 104 (or different indexing features 104) that are disposed on the opposing sides (e.g., side surfaces) of the fixture tool 102. In other examples (not shown), probes 202 (e.g., from an additional or alternate probe assembly 250) are arranged to engage portions of the indexing feature 104 (or different indexing features 104) that are disposed on another portion or another surface (e.g., a top, bottom, front, back, etc.) of the fixture tool 102.

Figure 27:
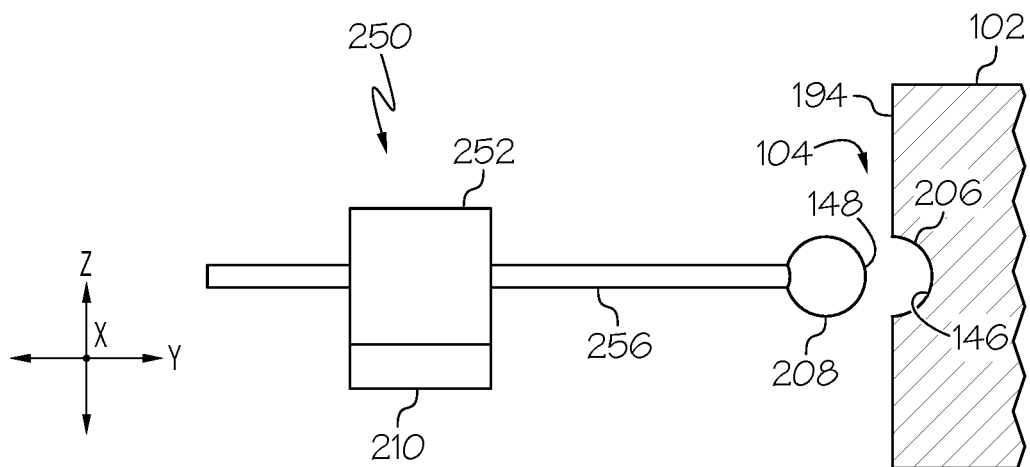
FIG. 27 is a schematic, elevational view, in partial section, of an example of a probe of the interfacing device, the indexing feature, and the fixture tool of the indexing apparatus.

Referring to FIG. 27, in an example, the probe 202 includes the contact-index 148 and the indexing feature 104 includes the interface-index 146. With the probe 202 engaged to the indexing feature 104, there is a point of contact between the contact-index 148 and the interface-index 146. This point of contact has an XYZ-coordinate that is common to both the contact-index 148 and the interface-index 146. The probe-location data 254 represents an XYZ-coordinate of the point of contact of the contact-index 148 of the probe 202 and the probe location 204 of the probe 202 is described by the XYZ-coordinate of the point of contact of the contact-index 148 of the probe 202.

The controller 110 converts the XYZ-coordinate of the point of contact of the contact-index 148 to an XYZ-coordinate of a corresponding point of contact of the interface-index 146. The controller 110 determines the indexing-feature location 116 as described by the XYZ-coordinates of points of contact of the interface-index 146.

Generally, the plurality of probes 202 includes, or forms, a plurality of contact-indexes 148 and the indexing feature 104 includes, or forms, a plurality of interface-indexes 146, which, in turn, provides the plurality of points of contact. Accordingly, the probe-location data 254 (FIG. 24) represents the XYZ-coordinates of the plurality of points of contact of the contact-indexes 148 of the plurality of probes 202. The plurality of probe locations 204 is described by the XYZ-coordinates of the points of contact of the contact-indexes 148 of the plurality of probes 202. The indexing-feature location 116 is described by the XYZ-coordinates of the corresponding plurality of points of contact of the interface-indexes 146.

It should be noted that increasing the number of contact-indexes 148 and interface-indexes 146 increases the number of points of contact between the probes 202 and the indexing feature 104, which, in turn, provides a greater number of XYZ-coordinate data points for processing, which, in turn, increases the accuracy of the indexing-feature location 116 and the fixture-tool location 118 during data point alignment of the indexing operation. In an example, the probe assembly 250 (e.g., plurality of probes 202) includes at least three contact-indexes 148 and the indexing feature 104 include at least three interface-indexes 146.

Referring again to FIG. 24, the controller 110 is configured to register the digital model 120, representing the fixture tool 102 and the indexing feature 104, to the indexing-feature location 116 and determines the model location 126. In an example, the controller 110 is configured to overlay and align the digital model 120 with the XYZ-coordinates describing the indexing-feature location 116 within the reference frame 216. The digital model 120 includes data points representing the points of contact of the indexing feature 104. For example, the digital model 120 includes data points that represent the interface-index 146 of the indexing feature 104. In an example, the controller 110 performs a best fit operation (e.g., executed a best fit algorithm) to align data points representing the points of contact of the indexing feature 104, such as the data points representing the interface-indexes 146, with data points representing the XYZ-coordinates describing the indexing-feature location 116. In an example, the best fit operation includes a rigid body, point cloud transformation operation.

With the digital model 120 registered and aligned with the indexing-feature location 116, the controller 110 is configured to convert the model location 126 to the fixture-tool location 118 of the fixture tool 102 relative to the reference frame 216. For example, the fixture-tool location 118 is assumed to be the same as the model location 126 within tolerance. Thus, the fixture-tool location 118 represents the immediate (e.g., current, real-time) location of the fixture tool 102 and, thus, the workpiece 170 relative to the operation cell 106 and the automated machine 128.

With the fixture-tool location 118 known, the automated machine 128 is indexed, or is "zeroed", relative to the fixture-tool location 118 and follows the predetermined tool path to perform the manufacturing operation on the workpiece 170. Indexing the automated machine 128 relative to the fixture tool 102, based on the fixture-tool location 118, consequently indexes the automated machine 128 relative to the workpiece 170. The geometry of the workpiece 170 and the known location of the workpiece 170 relative to the fixture tool 102 are incorporated in and are accounted for by the programmed tool path of the automated machine 128.

Referring to FIGS. 1 and 21, in an example, the indexing apparatus 100 includes the automated machine 128. The automated machine 128 is located in the operation cell 106. The automated machine 128 is in communication with the controller 110. The controller 110 is configured to index the automated machine 128 relative to the fixture-tool location 118 of the fixture tool 102.

Referring to FIGS. 22 and 23, in an example, the automated machine 128 includes the gantry 134. In this example, the fixture tool 102 and, thus, the workpiece 170 is moved to the work location 258 within the operation cell 106 and the gantry 134 and/or the robotic arm 226, coupled to the gantry 134, moves relative to the fixture tool 102 so that the end effector 228 follows along the predetermined tool path.

In another example (not shown), the robotic arm 226 is a stand-alone robot that has a fixed base within the operation cell 106. In this example, the fixture tool 102 and, thus, the workpiece 170 is moved to the work location 258 within the operation cell 106 and the robotic arm 226 moves relative to the fixture tool 102 so that the end effector 228 follows along the predetermined tool path.

While the illustrated examples of the indexing apparatus 100 show only one automated machine 128 (e.g., one robotic arm 226 with one end effector 228) for performing the manufacturing operation on the workpiece 170 in the operation cell 106, in other examples, the indexing apparatus 100 may have any number of additional automated machines 128 (e.g., additional robotic arms 226 and/or additional end effectors 228).

Referring to FIGS. 1 and 22, in an example, the manufacturing operation includes a pre-cure composite assembly operation, such as the composite layup operation and/or composite lamination operation. In this example, the workpiece 170 includes a composite laminate (e.g., layup of a composite material). The fixture tool 102 includes, or takes the form of, the mandrel 130. The mandrel 130 is configured to support the composite laminate. The automated machine 128 includes, or takes the form of, the automated fiber placement machine 132.

In an example, the fixture tool 102 is moved into the work location 258 and the immediate location of the fixture tool 102 and the workpiece 170 (e.g., the fixture-tool location 118) is determined using the plurality of probes 202 and the indexing feature 104, as described above. Based on the fixture-tool location 118 (e.g., the location of the fixture tool 102 and the location of the workpiece 170 relative to the fixture tool 102), the automated fiber placement machine 132 lays down and/or consolidates at least a portion of at least one layer of a stack of composite sheets.

In one or more other examples (not explicitly illustrated), the manufacturing operation includes another assembly operation or machining operation. In such examples, the workpiece 170 may be a post-cure composite workpiece, metallic workpiece, plastic workpiece, or other non-composite workpiece. The fixture tool 102 includes the suitable holding-features 260 (FIG. 1) configured to secure the workpiece 170 during movement to the operation cell 106 and during the manufacturing operation. The automated machine 128 includes, or takes the form of, any appropriate machine tool.

In an example, the indexing apparatus 100 includes the independent moving mechanism (not shown) that is configured to move the fixture tool 102 to the work location 258.

Figure 25:
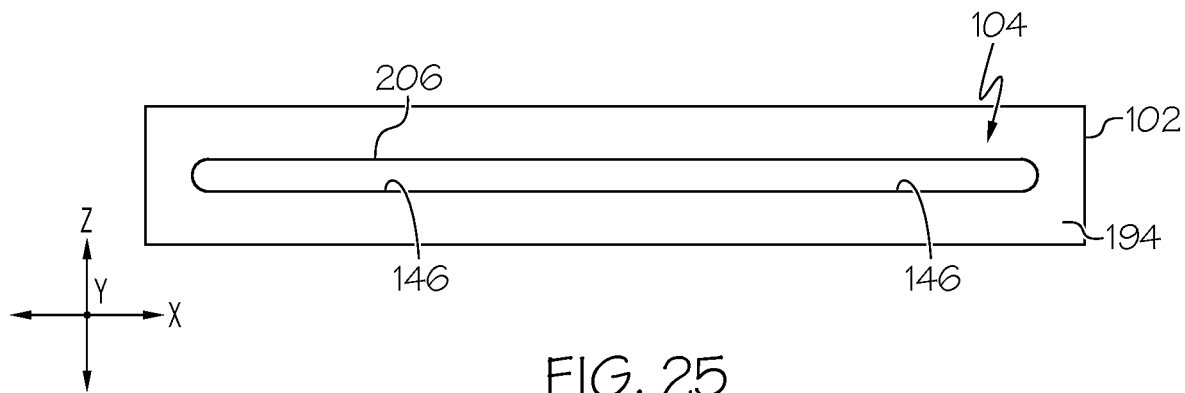
FIG. 25 is a schematic, elevational view of an example of the indexing feature and the fixture tool of the indexing apparatus.
Figure 26:
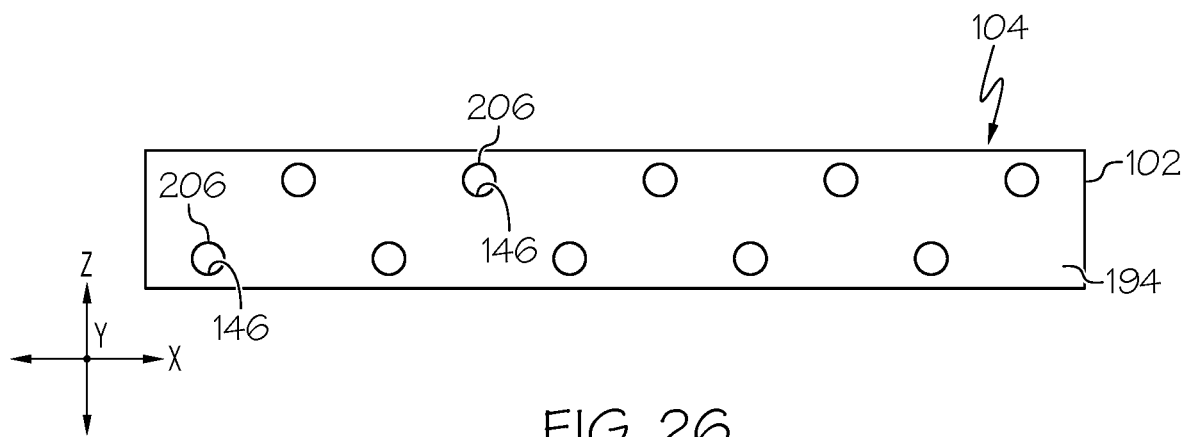
FIG. 26 is a schematic, elevational view of an example of the indexing feature and the fixture tool of the indexing apparatus.

FIGS. 25 and 26 schematically illustrate examples of the indexing feature 104. FIG. 27 schematically illustrates an example of the probe 202 and the indexing feature 104. Generally, the indexing feature 104 includes at least one interface-index 146. In an example, the interface-index 146 is disposed on (e.g., located or formed on) the surface 194 of the fixture tool 102. Each one of the plurality of probes 202 includes the contact-index 148 (FIG. 27). The contact-index 148 is movable relative to the at least one interface-index 146. The contact-index 148 is configured to engage the interface-index 146 to enable the probe 202 to locate the indexing feature 104.

Referring to FIG. 27, in an example, each probe 202 includes a probe head 208. The probe 202 is configured to move in at least one dimension of the fixed coordinate system 112 relative to the fixture tool 102 to engage the probe head 208 with the indexing feature 104. In an example, each probe 202 includes a probe shaft 256. The probe head 208 is coupled to an end of the probe shaft 256. The drive mechanism 252 is configured to extend and retract the probe shaft 256 to move the probe head 208.

In an example, the interface-index 146 includes, or is formed by, at least one interfacing-structure 206 that is located on the surface 194 of the fixture tool 102. For example, the interface-index 146 is formed by a portion of interfacing-structure 206, such as a portion of a surface of the interfacing-structure 206. In an example, the contact-index 148 includes, or is formed by, the probe head 208. In this example, the probe head 208 is the contacting-structure of the contact-index 148. For example, contact-index 148 is formed by a portion of the probe head 208, such as a portion of a surface of the probe head 208.

In an example, the probe head 208 is configured to engage the interfacing-structure 206 so that the contact-index 148 contacts the interface-index 146. The contact-index 148 and the interface-index 146 are configured to contact and mate with each other when the probe 202 (e.g., the probe head 208) properly engages the indexing feature 104 (e.g., the interfacing-structure 206).

Referring to FIG. 25, in an example of the indexing feature 104, the interfacing-structure 206 is continuous and extends longitudinally along the surface 194 (e.g., a side surface) of the fixture tool 102. In other words, the interfacing-structure 206 may be a continuous interfacing-structure. In an example, the interfacing-structure 206 may be linear, as illustrated in FIG. 25. In another example, the interfacing-structure 206 may be non-linear.

Referring to FIG. 26, in another example of the indexing feature 104, the interfacing-structure 206 is discontinuous and extends longitudinally along the surface 194 of the fixture tool 102. In other words, the interfacing-structure 206 may be a plurality of discontinuous interface point structures (e.g., also referred to herein as a plurality of interfacing-structures 206). In an example, the plurality of interfacing-structures 206 may be arranged linearly. In another example, the plurality of interfacing-structures 206 may be arranged non-linearly, as illustrated in FIG. 26.

In an example, the probe head 208 and the interfacing-structure 206 have complementary geometric shapes and dimensions so that corresponding surfaces of the probe head 208 (e.g., forming the contact-index 148) and interfacing-structure 206 (e.g., forming the interface-index 146) are in contact when the probe 202 properly engages the indexing feature 104. Each one of the probe head 208 and the interfacing-structure 206 includes, or takes the form of, any one of various structural configurations.

In an example, the interfacing-structure 206 is a continuous groove formed in (e.g., depending from) the surface 194 of the fixture tool 102. In this example, the probe head 208 is configured to be inserted in a portion of the interfacing-structure 206. In another example, the interfacing-structure 206 is a continuous ridge formed on (e.g., projecting from) the surface 194 of the fixture tool 102. In this example, the probe head 208 is configured to receive a portion of the interfacing-structure 206. In another example, each one of the plurality of interfacing-structures 206 includes an aperture formed in (e.g., depending from) the surface 194. In this example, the probe head 208 is configured to be inserted in the interfacing-structure 206. In another example, each one of the plurality of interfacing-structures 206 includes a protrusion formed on (e.g., projecting from) the surface 194. In this example, the probe head 208 is configured to receive the interfacing-structure 206.

Other structural configurations and/or arrangements of the contact-index 148 (e.g., the probe head 208) and the interface-index 146 (e.g., the interfacing-structure 206) are also contemplated.

In another example of the indexing feature 104, the interfacing-structure 206 includes, or takes the form of, at least one surface 194 (e.g., an exterior surface) of the fixture tool 102. In other words, the surface 194 of the fixture tool 102 is the interfacing-structure 206 of the interface-index 146. Each one of the plurality of probes 202 is configured to move the probe head 208 into contact with the surface 194 of the fixture tool 102. For example, the drive mechanism 252 extends the probe shaft 256 to move the probe head 208 into contact with the surface 194 and, thus, place the contact-index 148, formed by a portion of the surface of the probe head 208, in contact with the interface-index 146, formed by a portion of the surface 194 of the fixture tool 102.

Referring to FIG. 27, in an example of the indexing apparatus 100, the probe assembly 250 includes a displacement sensor 210. The displacement sensor 210 is in communication with each one of the plurality of probes 202. The displacement sensor 210 is configured to measure a displacement of the plurality of probes 202 (e.g., each one of the probes 202) in the at least one dimension of the fixed coordinate system 112, when the plurality of probes 202 moves into contact with the indexing feature 104. In an example, the displacement sensor 210 generates displacement data representing the displacement or movement of the probe 202 and corresponding to the probe location 204. This displacement data is an example of the probe-location data 254 (FIG. 24) provided to the controller 110.

Referring to FIGS. 21-23, in an example, the indexing apparatus 100 includes the vehicle 160. The vehicle 160 is configured to support the fixture tool 102 and to move the fixture tool 102 relative to the operation cell 106. In an example, the vehicle 160 is configured to move the fixture tool 102 and, thus, the workpiece 170 to the work location 258 at which the plurality of probes 202 extend into engagement with the indexing feature 104 to perform the locating and indexing operations described above.

Referring to FIG. 1, in an example of the indexing apparatus 100, the vehicle 160 includes, or takes the form of, the automated guided vehicle 162. Referring to FIGS. 1 and 22, in an example of the indexing apparatus 100, the vehicle 160 includes, or takes the form of, the cart 164. The cart 164 is configured to travel along the track 166 running through the operation cell 106.

In an example, the track 166 is arranged such that the Z-coordinate of the fixture tool 102 and, thus, the indexing feature 104 is fixed and remains constant as the cart 164 travels along the track 166 to the work location 258. In this example, the locating operation performed by the plurality of probes 202 need only to determine the XY-coordinate of the indexing feature 104.

Referring to FIGS. 1 and 21, in another example, the manufacturing system 168 includes the operation cell 106 and the automated machine 128. The automated machine 128 is located in the operation cell 106 and is configured to perform at least one manufacturing operation. The manufacturing system 168 also includes the fixture tool 102. The fixture tool 102 is configured to support the workpiece 170 and is movable relative to the operation cell 106. The manufacturing system 168 further includes the indexing feature 104. The indexing feature 104 is fixed relative to the fixture tool 102. For example, the indexing feature 104 is located on the fixture tool 102.

The manufacturing system 168 also includes the plurality of probes 202. The plurality of probes 202 is movable relative to the operation cell 106 and the fixture tool 102. The plurality of probes 202 is configured to engage the indexing feature 104. The manufacturing system 168 further includes the controller 110 that is in communication with the plurality of probes 202 and the automated machine 128. The controller 110 is configured to locate the fixture tool 102 relative to the operation cell 106 from the plurality of probe locations 204 of the plurality of probes 202, engaged with the indexing feature 104. The controller 110 is also configured to index the automated machine 128 relative to the fixture-tool location 118 of the fixture tool 102.

Referring to FIGS. 1 and 24, in an example of the manufacturing system 168, the controller 110 is configured to determine the plurality of probe locations 204 of the plurality of probes 202, for example, relative to the reference frame 216 in at least one dimension of the fixed coordinate system 112. The controller 110 is also configured to determine the indexing-feature location 116 of the indexing feature 104, for example, relative to the reference frame 216 in the at least one dimension of the fixed coordinate system 112, from the plurality of probe locations 204 of the plurality of probes 202. The controller 110 is further configured to determine the fixture-tool location 118 of the fixture tool 102, for example, relative to the reference frame 216 in the at least one dimension of the fixed coordinate system 112, from the indexing-feature location 116 of the indexing feature 104. The controller 110 is also configured to register the digital model 120, representing the fixture tool 102 and the indexing feature 104, to the indexing-feature location 116 of the indexing feature 104 and to convert the model location 126 of the digital model 120, registered to the indexing-feature location 116, to the fixture-tool location 118 of the fixture tool 102.

Referring to FIGS. 1 and 21, in an example of the manufacturing system 168, the fixture tool 102 includes, or takes the form of, the mandrel 130 that is configured to support a composite laminate and the automated machine 128 includes, or takes the form of, an automated fiber placement machine 132.

Referring to FIGS. 21 and 22, in an example of the manufacturing system 168, the plurality of probes 202 is configured engage the indexing feature 104 while the fixture tool 102 is inside of the work envelope 140 of the operation cell 106. In an example of the manufacturing system 168, the indexing feature 104 includes, or takes the form of, at least one surface 194 of the fixture tool 102. Each one of the plurality of probes 202 moves into contact with the at least one surface 194 along at least one dimension of the fixed coordinate system 112.

Referring to FIGS. 23 and 25-27, in an example of the manufacturing system 168, the indexing feature 104 includes at least one interface-index 146 that is located on the surface 194 of the fixture tool 102. Each one of the plurality of probes 202 includes the contact-index 148 that is movable relative to the at least one interface-index 146 and that is configured to engage the at least one interface-index 146. In an example, the interface-index 146 includes the interfacing-structure 206 and the contact-index 148 includes the probe head 208 of a corresponding one of the plurality of probes 202. The probe head 208 is configured to engage the interfacing-structure 206 so that the contact-index 148 contacts the interface-index 146.

Referring to FIGS. 1 and 21-23, in an example, the manufacturing system 168 includes vehicle 160. The vehicle 160 is configured to support the fixture tool 102 and to move the fixture tool 102 relative to the operation cell 106.

Referring to FIGS. 1 and 21, in an example, the manufacturing system 168 also includes the track 166. The track 166 runs through the operation cell 106. In this example, the vehicle 160 includes, or takes the form of, the cart 164 that is configured to travel along the track 166.

Figure 28:
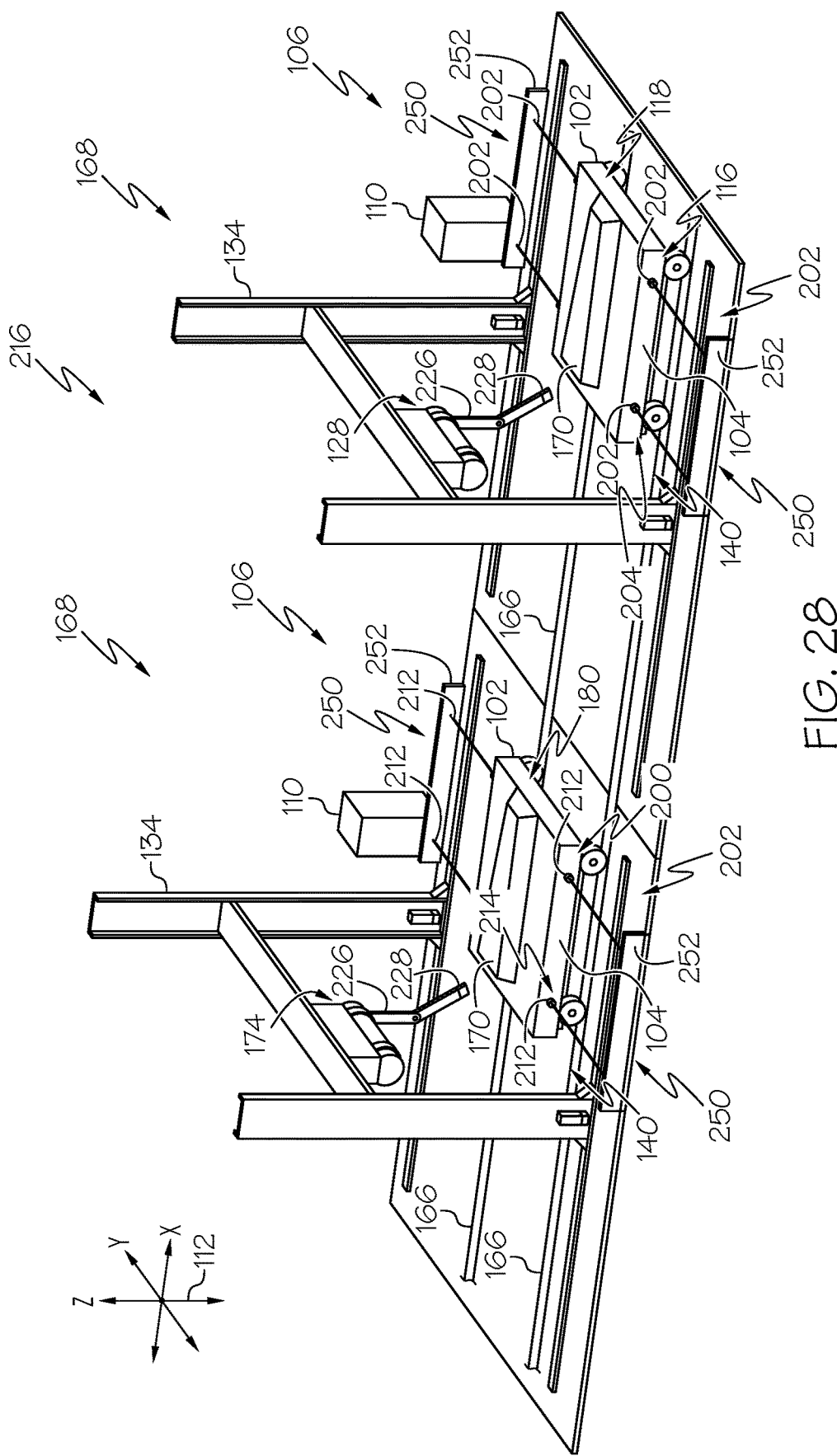
FIG. 28 is a schematic, perspective plan view of an example of the manufacturing system.

Referring to FIG. 28, in an example, the manufacturing system 168 includes the second operation cell 172 and the second automated machine 174. The second automated machine 174 is located in the operation cell 106 and is configured to perform at least one manufacturing operation.

The manufacturing system 168 also includes a second plurality of probes 212. The second plurality of probes 212 is movable relative to the second operation cell 172 and the fixture tool 102. The second plurality of probes 212 is configured to engage the indexing feature 104. The controller 110 is in communication with the second plurality of probes 212 and the second automated machine 174. The controller 110 is configured to locate the fixture tool 102 relative to the second operation cell 172 from a second plurality of probe locations 214 of the second plurality of probes 212, engaged with the indexing feature 104. The controller 110 is further configured to index the second automated machine 174 relative to a second fixture-tool location 180 of the fixture tool 102. Once indexed, the second automated machine 174 performs at least one manufacturing operation on the workpiece 170.

Referring to FIGS. 10, 20 and 28, in an example of the manufacturing system 168, the track 166 extends from the operation cell 106 to the second operation cell 172 and runs through the second operation cell 172. In other words, the track 166 links the operation cell 106 to the second operation cell 172 together. As illustrated in FIGS. 10, 20 and 28, in an example, the operation cell 106 and the second operation cell 172 are arranged in a continuous linked sequence. In these examples, the manufacturing system 168 is a continuous flow manufacturing system in which at least a portion of one or more manufacturing operations is performed in each operation cell. While only two operation cells (e.g., the operation cell 106 and the second operation cell 172) are shown by example in FIGS. 10, 20 and 28, in other examples, the manufacturing system 168 may include any number of operation cells.

In the examples illustrated in FIGS. 10, 20 and 28, an entirety of the fixture tool 102 and an entirely of the workpiece 170 are located in a corresponding one of the operation cell 106 and the second operation cell 172, as the fixture tool 102 and the workpiece 170 travel continuously along the manufacturing system 168. However, in another example, the fixture tool 102 and the workpiece 170 extend between more than one operation cell of the manufacturing system 168. For example, a first portion (or first section) of the fixture tool 102 and a first portion (or first section) of the workpiece 170 are located in the operation cell 106 and a second portion (or second section) of the fixture tool 102 and a second portion (or second section) of the workpiece 170 are located in the second operation cell 172. In this example of the manufacturing system 168, the operation cell 106 and the second operation cell 172 depend upon each other such that the manufacturing operation performed in the second operation cell 172 builds upon or adds to the manufacturing operation performed in the operation cell 106. This arrangement is particularly advantageous for examples in which the fixture tool 102 and the workpiece 170 are large, elongate structures. For example, the workpiece 170 may be a spar, a wing section, or a fuselage section of an aircraft and the fixture tool 102 is a fixture that is configured to support and securely hold the large workpiece 170.

In other examples (not shown) of the manufacturing system 168, the operation cell 106 and the second operation cell 172 are separately located and independent of each other. In this example, the vehicle 160 (e.g., the automated guided vehicle 162) is configured to move along the predefined travel path to move the fixture tool 102 and the workpiece 170 between the different operation cells.

In the examples illustrated herein, the fixture tool 102 is a rigid body and the indexing feature 104 is coupled to the fixture tool 102. However, in other examples, the fixture tool 102 and the vehicle 160 form a rigid body. For example, the fixture tool 102 and the vehicle 160 may be integrated into a unitary member. In such examples, the location of the indexing feature 104 is also fixed relative to the vehicle 160. For example, the indexing feature 104 may be coupled to, disposed on, or otherwise associated with the vehicle 160, rather than the fixture tool 102.

As described herein, the locating and indexing operations advantageously enable the fixture tool 102 and the workpiece 170 to be moved into an approximate location within the operation cell 106 relative to the automated machine 128. The immediate location of the fixture tool 102 (e.g., the fixture-tool location 118), for example, as determined by the gripper 108, the sensor 184, or the probes 202 described above, becomes the work location 258 and the automated machine 128 indexes itself from the fixture-tool location 118. This operation improves the cycle time of the manufacturing operation by eliminating the need for incremental indexing of the automated machine 128 relative to the workpiece 170 and the need for setting up the workpiece 170 in a specific, predetermined location using a non-movable fixture.

As described herein, the locating and indexing operations also advantageously enable subsequent fixture tools 102 and workpieces 170 to be located at moderately different working locations within the operation cell 106 and relative to the automated machine 128. In other words, the work location 258 of the fixture tool 102 and the workpiece 170, at which the manufacturing operation is performed, does not need to be same, fixed and repeatable, location for subsequent workpieces 170.

While not explicitly illustrated, in one or more examples of the indexing apparatus 100 and/or manufacturing system 168, the interfacing device 220 includes a combination (e.g., two or more) of the gripper 108, the sensor 184, and/or the probes 202. The combination of the gripper 108, the sensor 184, and/or the probes 202 is used to interface with corresponding indexing features 104 to locate and index the fixture tool 102 based on the location of the indexing feature 104.

Figure 29:
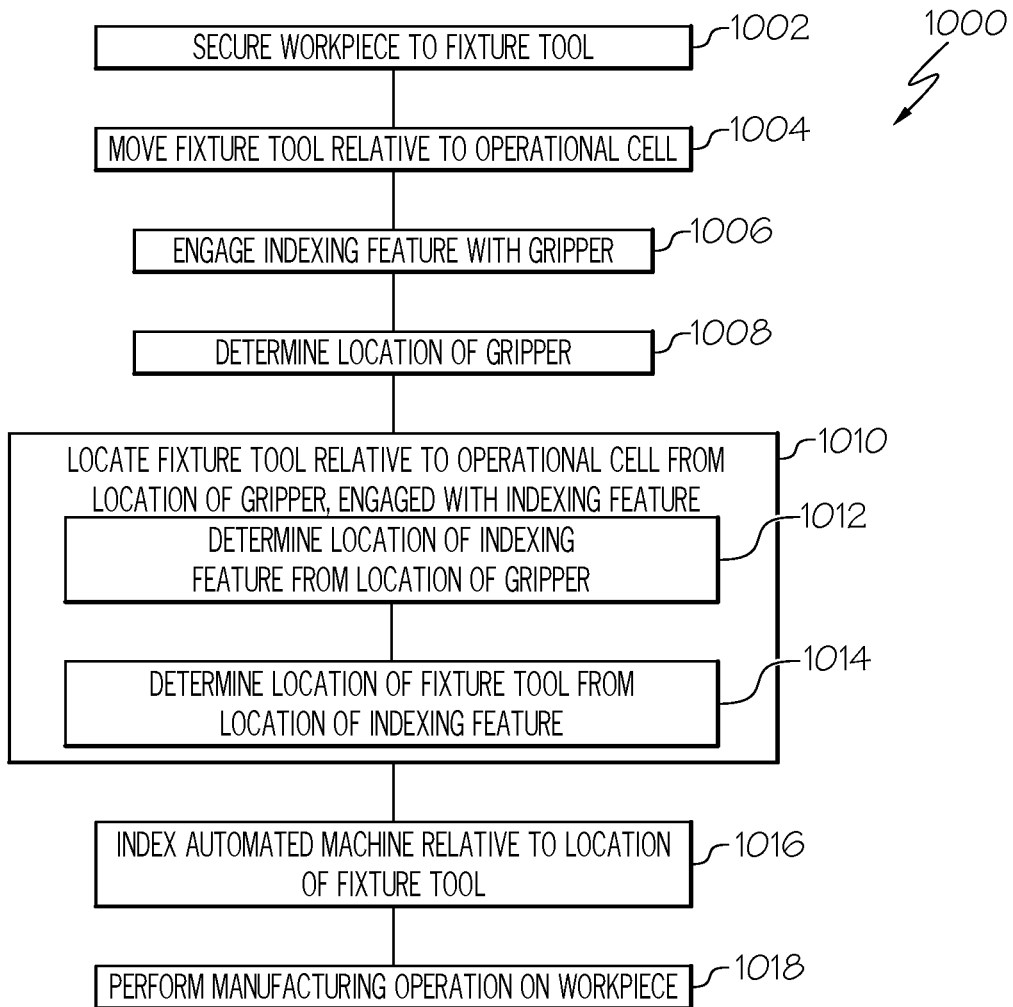
FIG. 29 is a flow diagram of an example of a method of manufacturing.

FIG. 29 is a flow diagram of an example of the method 1000 of manufacturing. Referring generally to FIGS. 1-10 and particularly to FIG. 29, the method 1000 includes a step of (block 1002) securing the workpiece 170 to the fixture tool 102. With the workpiece 170 secured to the fixture tool 102, the location of the workpiece 170 (the workpiece location 262) is fixed and is known relative to the fixture tool 102. Additionally, the geometry of the workpiece 170 (the workpiece geometry 268) is known. In accordance with the method 1000, locating the fixture tool 102 relative to the operation cell 106 (e.g., relative to the reference frame 216), in turn, locates the workpiece 170 relative to the operation cell 106 (e.g., relative to the reference frame 216).

The method 1000 includes a step of (block 1004) moving the fixture tool 102 relative to the operation cell 106. The method 1000 also includes a step of (block 1006) engaging the indexing feature 104 with the gripper 108. The location of the indexing feature 104 (the indexing-feature location 116) is fixed and is known relative to the fixture tool 102. In an example, the indexing feature 104 is coupled to the fixture tool 102. The method 1000 further includes a step of (block 1010), with the gripper 108 engaged to the indexing feature 104, locating the fixture tool 102 relative to the operation cell 106 from the location of the gripper 108 (the gripper location 114).

The method 1000 includes a step of (block 1016) indexing the automated machine 128 relative to the location of the fixture tool 102 (the fixture-tool location 118). In accordance with the method 1000, indexing the automated machine 128 relative to the location of the fixture tool 102 (the fixture-tool location 118), in turn, indexes the automated machine 128 relative to the location of the workpiece 170 (the workpiece location 262). The method 1000 further includes a step of (block 1018) performing at least one manufacturing operation on the workpiece 170, using the automated machine 128. With the automated machine 128 indexed relative to the location of the fixture tool 102 (the fixture-tool location 118), the geometry of the workpiece 170 (the workpiece geometry 268) and the location of the workpiece 170 (the workpiece location 262) relative to the fixture tool 102 are incorporated in and are accounted for by the programmed tool path of the automated machine 128 during performance of the manufacturing operation.

In an example, the method 1000 includes a step of (block 1008) determining the location of the gripper 108 (the gripper location 114) relative to the operation cell 106, for example, relative to the reference frame 216 in at least one dimension of the fixed coordinate system 112. The method 1000 also includes a step of (block 1012) determining the location of the indexing feature 104 (the indexing-feature location 116) relative to the operation cell 106, for example, relative to the reference frame 216 in the at least one dimension of the fixed coordinate system 112, from the location of the gripper 108 (the gripper location 114). The method 1000 further includes a step of (block 1014) determining the location of the fixture tool 102 (the fixture-tool location 118) relative to the operation cell 106, for example, relative to the reference frame 216 in the at least one dimension of the fixed coordinate system 112, from the location of the indexing feature 104 (the indexing-feature location 116).

In an example, the method 1000 includes a step of registering the digital model 120, representing the fixture tool 102 and the indexing feature 104, to the location of the indexing feature 104 (the indexing-feature location 116). The method 1000 also includes a step of converting the location of the digital model 120 (the model location 126), registered to the location of the indexing feature 104 (the indexing-feature location 116), to the location of the fixture tool 102 (the fixture-tool location 118). In other words, the location of the fixture tool 102 (the fixture-tool location 118) is assumed (within tolerance) to be the same as the location of the digital model 120 (the model location 126) when the digital model 120 is registered to the location of the indexing feature 104 (the indexing-feature location 116).

In an example, the method 1000 includes a step of moving the fixture tool 102 to the work location 258 (e.g., within the work envelope 140 of the operation cell 106) using the gripper 108, while (e.g., approximately concurrent with) performing the steps of (block 1008) determining the location of the gripper 108 (the gripper location 114) and (block 1008) determining the location of the indexing feature 104 (the indexing-feature location 116).

In an example, the method 1000 includes a step of engaging the interface-index 146 of the indexing feature 104 with the contact-index 148 of the gripper 108, for example, when performing the step of (block 1004) engaging the indexing feature 104 with the gripper 108. The method 1000 also includes a step of generating the gripper-location data 238, representing XYZ-coordinates of the points of contact between the contact-index 148 and the interface-index 146.

In an example, the method 1000 includes a step of gripping the plate 150 of the indexing feature 104 with the jaw assembly 144 of the gripper 108. The method 1000 also includes a step of engaging the interface-index 146, coupled to the plate 150, with the contact-index 148, coupled to the jaw assembly 144.

Figure 30:
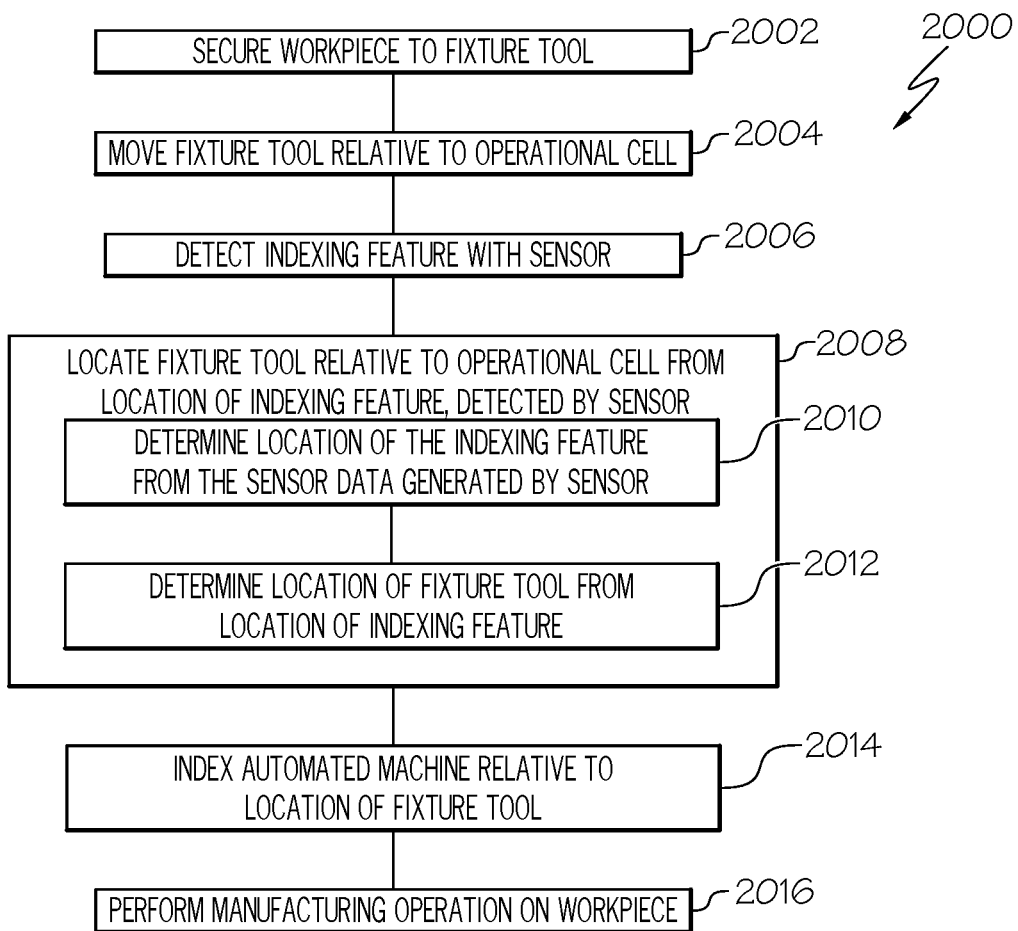
FIG. 30 is a flow diagram of an example of a method of manufacturing.

FIG. 30 is a flow diagram of an example of the method 2000 of manufacturing. Referring generally to FIGS. 1 and 11-20 and particularly to FIG. 30, in an example, the method 3000 includes a step of (block 2002) securing the workpiece 170 to the fixture tool 102. With the workpiece 170 secured to the fixture tool 102, the location of the workpiece 170 (the workpiece location 262) is fixed and is known relative to the fixture tool 102. Additionally, the geometry of the workpiece 170 (the workpiece geometry 268) is known. In accordance with the method 1000, locating the fixture tool 102 relative to the operation cell 106 (e.g., relative to the reference frame 216), in turn, locates the workpiece 170 relative to the operation cell 106 (e.g., relative to the reference frame 216).

The method 2000 includes a step of (block 2004) moving the fixture tool 102 relative to the operation cell 106. The method 2000 also includes a step of (block 2006) detecting (e.g., visually identifying) the indexing feature 104 with the sensor 184. The location of the indexing feature 104 (the indexing-feature location 116) is fixed and is known relative to the fixture tool 102. In an example, the indexing feature 104 is located on the fixture tool 102. The method 2000 further includes a step of (block 2008) locating the fixture tool 102 relative to the operation cell 106 from the location of the indexing feature 104 (the indexing-feature location 116), detected by the sensor 184.

The method 2000 also includes a step of (block 2014) indexing the automated machine 128 relative to the location of the fixture tool 102 (the fixture-tool location 118). In accordance with the method 2000, indexing the automated machine 128 relative to the location of the fixture tool 102 (the fixture-tool location 118), in turn, indexes the automated machine 128 relative to the location of the workpiece 170 (the workpiece location 262). The method 2000 further includes a step of (block 2016) performing at least one manufacturing operation on the workpiece 170, using the automated machine 128. With the automated machine 128 indexed relative to the location of the fixture tool 102 (the fixture-tool location 118), the geometry of the workpiece 170 (the workpiece geometry 268) and the location of the workpiece 170 (the workpiece location 262) relative to the fixture tool 102 are incorporated in and are accounted for by the programmed tool path of the automated machine 128 during performance of the manufacturing operation.

In an example, the method 2000 includes a step of (block 2010) determining the location of the indexing feature 104 (the indexing-feature location 116) relative to the operation cell 106, for example, relative to the reference frame 216 in at least one dimension of the fixed coordinate system 112, from the sensor data 186, generated by the sensor 184. The method 2000 also includes a step of (block 2012) determining the location of the fixture tool 102 (the fixture-tool location 118) relative to the operation cell 106, for example, relative to the reference frame 216 in the at least one dimension of the fixed coordinate system 112, from the location of the indexing feature 104 (the indexing-feature location 116).

In an example, the method 2000 includes a step of registering the digital model 120, representing the fixture tool 102 and the indexing feature 104, to the location of the indexing feature 104 (the indexing-feature location 116). The method 2000 also includes a step of converting the location of the digital model 120 (the model location 126), registered to the location of the indexing feature 104 (the indexing-feature location 116), to the location of the fixture tool 102 (the fixture-tool location 118). In other words, the location of the fixture tool 102 (the fixture-tool location 118) is assumed (within tolerance) to be the same as the location of the digital model 120 (the model location 126) when the digital model 120 is registered to the location of the indexing feature 104 (the indexing-feature location 116).

In an example, the method 2000 includes a step of detecting (e.g., visually detecting) at least one interfacing-structure 192 of the indexing feature 104, located on the surface 194 of the fixture tool 102, using the sensor 184. The method 2000 also includes a step of generating the sensor data 186, representing XYZ-coordinates of the interfacing-structure 192.

Figure 31:
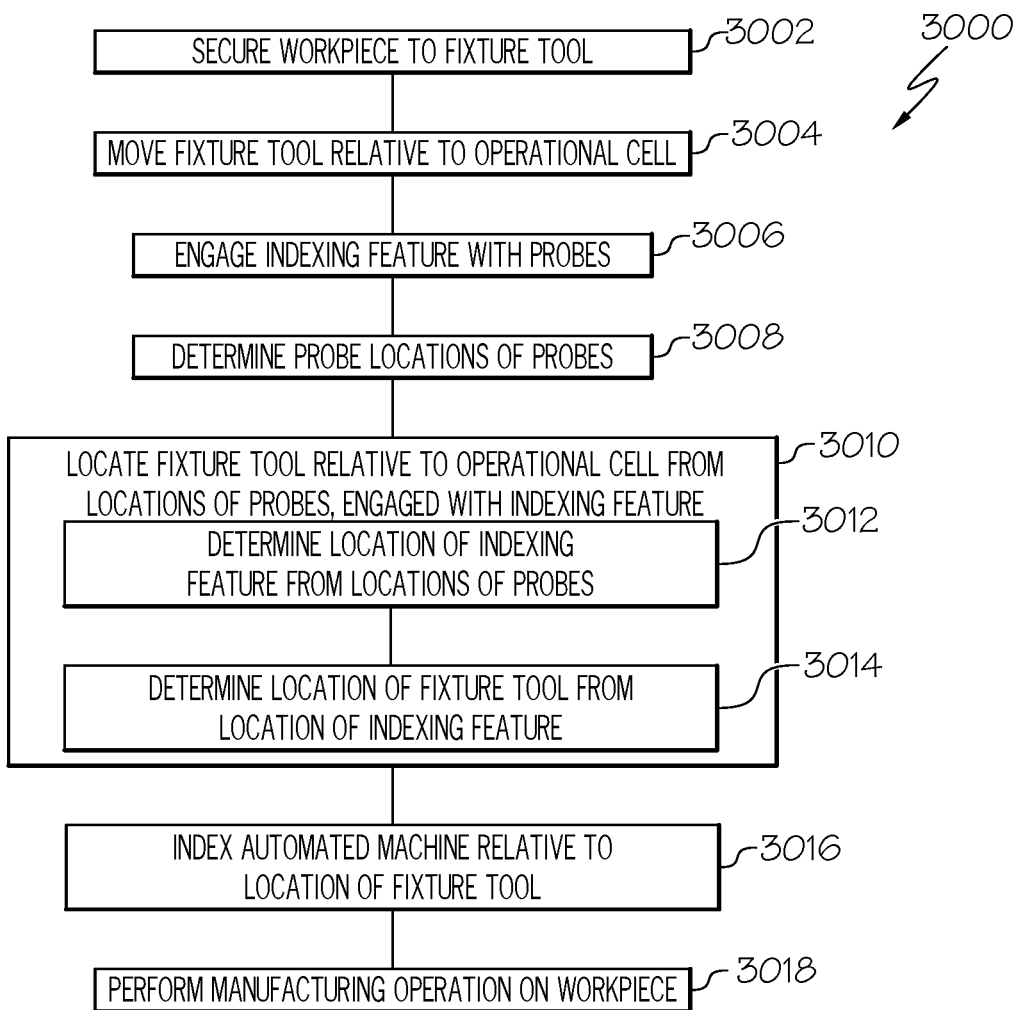
FIG. 31 is a flow diagram of an example of a method of manufacturing.

FIG. 31 is a flow diagram of an example of the method 3000 of manufacturing. Referring generally to FIGS. 1 and 21-28 and particularly to FIG. 30, the method 3000 includes a step of (block 3002) securing the workpiece 170 to the fixture tool 102. With the workpiece 170 secured to the fixture tool 102, the location of the workpiece 170 (the workpiece location 262) is fixed and is known relative to the fixture tool 102. Additionally, the geometry of the workpiece 170 (the workpiece geometry 268) is known. In accordance with the method 1000, locating the fixture tool 102 relative to the operation cell 106 (e.g., relative to the reference frame 216), in turn, locates the workpiece 170 relative to the operation cell 106 (e.g., relative to the reference frame 216).

The method 3000 includes a step of (block 3004) moving the fixture tool 102 relative to the operation cell 106. The method 3000 also includes a step of (block 3006) engaging the indexing feature 104 with the plurality of probes 202. The location of the indexing feature 104 (the indexing-feature location 116) is fixed and is known relative to the fixture tool 102. In an example, the indexing feature 104 is coupled to the fixture tool 102. The method 3000 further includes a step of (block 3010), with the plurality of probes 202 engaged to the indexing feature 104, locating the fixture tool 102 relative to the operation cell 106 from the locations of the plurality of probes 202 (the plurality of probe locations 204).

The method 3000 further includes a step of (block 3016) indexing the automated machine 128 relative to the location of the fixture tool 102 (the fixture-tool location 118). In accordance with the method 3000, indexing the automated machine 128 relative to the location of the fixture tool 102 (the fixture-tool location 118), in turn, indexes the automated machine 128 relative to the location of the workpiece 170 (the workpiece location 262). The method 3000 further includes a step of (block 3018) performing at least one manufacturing operation on the workpiece 170, using the automated machine 128. With the automated machine 128 indexed relative to the location of the fixture tool 102 (the fixture-tool location 118), the geometry of the workpiece 170 (the workpiece geometry 268) and the location of the workpiece 170 (the workpiece location 262) relative to the fixture tool 102 are incorporated in and are accounted for by the programmed tool path of the automated machine 128 during performance of the manufacturing operation.

In an example, the method 3000 includes a step of (block 3008) determining the locations of the plurality of probes 202 (the plurality of probe locations 204) relative to the operation cell 106, for example, relative to the reference frame 216 in at least one dimension of the fixed coordinate system 112. The method 3000 also includes at step of (block 3012) determining the location of the indexing feature 104 (the indexing-feature location 116) relative to the operation cell 106, for example, relative to the reference frame 216 in the at least one dimension of the fixed coordinate system 112, from the locations of the plurality of probes 202 (the plurality of probe locations 204). The method 3000 further includes a step of (block 3014) determining the location of the fixture tool 102 (the fixture-tool location 118) relative to the operation cell 106, for example, relative to the reference frame 216 in the at least one dimension of the fixed coordinate system 112, from the location of the indexing feature 104 (the indexing-feature location 116).

In an example, the method 3000 includes a step of registering the digital model 120, representing the fixture tool 102 and the indexing feature 104, to the location of the indexing feature 104 (the indexing-feature location 116). The method 3000 includes a step of converting the location of the digital model 120 (the model location 126), registered to the location of the indexing feature 104 (the indexing-feature location 116), to the location of the fixture tool 102 (the fixture-tool location 118). In other words, the location of the fixture tool 102 (the fixture-tool location 118) is assumed (within tolerance) to be the same as the location of the digital model 120 (the model location 126) when the digital model 120 is registered to the location of the indexing feature 104 (the indexing-feature location 116).

In an example, the method 3000 includes a step of moving the fixture tool 102 to the work location 258 (e.g., within the work envelope 140 of the operation cell 106). The method 3000 also includes a step of moving the plurality of probes 202 into contact with the indexing feature 104 along at least one dimension of the fixed coordinate system 112.

In an example, the method 3000 includes a step of engaging the interface-index 146 of the indexing feature 104 with the contact-index 148 of each one of the probes 202, for example, when performing the step of (block 3006) engaging the indexing feature 104 with the plurality of probes 202. The method 3000 also includes a step of generating the probe-location data 254, representing XYZ-coordinates of the points of contact between the contact-index 148 and the interface-index 146.

In an example, the method 3000 includes a step of engaging the interfacing-structure 206 of the indexing feature 104 with the probe head 208 of the probe 202. The method 1000 also includes a step of engaging the interface-index 146, formed by the interfacing-structure 206, with the contact-index 148, formed by the probe head 208.

Figure 32:
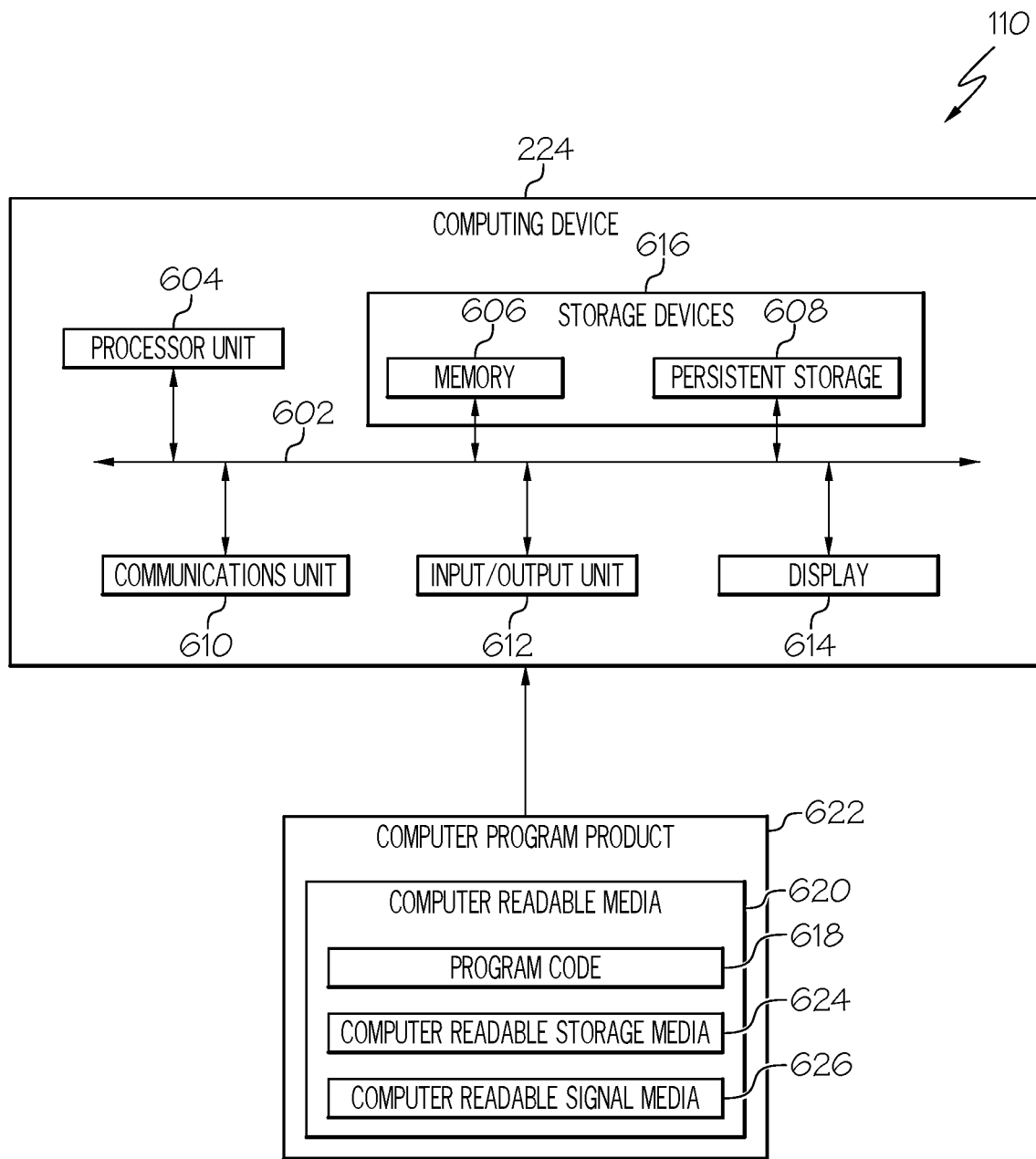
FIG. 32 is a schematic block diagram of an example of a controller of the indexing apparatus.

FIG. 32 schematically illustrates an example of the controller 110 and, more particularly, a computing device 224 of the controller 110. The controller 110 includes any suitable programmable controller that is configured to control of one or more manufacturing processes and to execute one or more computing or data processing operations. The operations performed by the various examples of the disclosed indexing apparatus 100, the manufacturing system 168 and the methods 1000, 2000, 3000 and/or portions thereof are implemented under computer control provided by the controller 110. The controller 110 may be any number of programmable controllers and/or include any number of computing devices 224.

The computing device 224 is an example of a data processing system used to perform one or more of the functions provided by the disclosed indexing apparatus 100 and manufacturing system 168 or to implement one or more of the operational steps of the disclosed methods 1000, 2000, 3000. The computing device 224 includes a communications bus 602, which provides communications between a processor unit 604, memory 606, persistent storage 608, a communications unit 610, an input/output ("I/O") unit 612, and a display 614.

The communications bus 602 includes one or more buses, such as a system bus or an input/output bus. The communications bus 602 is implemented using any suitable type of architecture that provides for a transfer of data between different components or devices attached to the bus system.

The processor unit 604 is any suitably programmed computer processor configured to execute instructions, such as software instructions loaded onto the memory 606. The processor unit 604 may be any number of processors, a multi-processor core, a microprocessor, or any other type of processor, depending upon implementation of the controller 110.

The memory 606 and the persistent storage 608 are examples of storage devices 616. The storage device 616 is any piece of hardware that is capable of storing information including, but not limited to, data, program code in functional form, and/or other suitable information either on a temporary basis and/or a permanent basis. For example, the memory 606 may be a random-access memory or any other suitable volatile or non-volatile storage device. The memory 606 may also be referred to as a non-transitory computer-readable storage medium.

The persistent storage 608 may take various forms, depending on implementation. The persistent storage 608 may contain one or more components or devices. For example, persistent storage 608 may be a hard drive, a flash memory, a rewritable optical disk, a rewritable magnetic tape, or some combination thereof.

The communications unit 610 provides for communication with other data processing systems or devices, such as by a wired and/or wireless communications links. The communications unit 610 may include one or more devices used to transmit and receive data, such as a network interface card, a modem, or a network adapter.

The input/output unit 612 enables input and output of data with other devices connected to controller 110. For example, the input/output unit 612 may provide a connection for input through a keyboard, a mouse, and/or some other suitable input device. Further, the input/output unit 612 may send output to the display 614 for display of information.

Instructions for the operating system, applications, and/or programs may be located in the storage devices 616, which are in communication with the processor unit 604 through the communications bus 602. In an example, computer-implemented instructions are in a functional form on the persistent storage 608. The instructions are loaded into the memory 606 for execution by processor unit 604. One or more of the processes and/or operations described herein are performed by the processor unit 604 using the computer implemented instructions.

The computer-implemented instructions may be referred to as program code, computer usable program code, or computer readable program code that is readable and executable by at least one processor of the processor unit 604. The program code may be embodied on different physical or computer readable storage media, such as the memory 606 or the persistent storage 608.

In an example, program code 618 is in a functional form on computer readable media 620, which is selectively removable and may be loaded onto or transferred to the computing device 224 for execution by the processor unit 604. In an example, the program code 618 and the computer readable media 620 form a computer program product 622. The computer readable media 620 may be computer readable storage media 624 or computer readable signal media 626.

Computer readable storage media 624 may include, but is not limited to, an optical or magnetic disk that is inserted or placed into a drive or other device that is part of persistent storage 608 for transfer onto a storage device, such as a hard drive, that is part of persistent storage 608. The computer readable storage media 624 may take the form of a persistent storage, such as a hard drive, a thumb drive, a network apparatus, the cloud, flash memory, optical disk, magnetic disk, and the like. The computer readable storage media 624 is connected or is otherwise transferred to the computing device 224.

In an example, the operations performed by the various examples of the disclosed indexing apparatus 100 and manufacturing system 168 and the operational steps implemented by the various examples of the disclosed methods 1000, 2000, 3000 and/or portions thereof may be implemented as or utilize a computer program product that includes a non-transitory computer readable memory medium and computer controlling instructions stored on the non-transitory computer readable memory medium that is executed by a computer processor.

Thus, various implementations of the apparatuses, systems, and methods described herein may be realized in digital electronic circuitry, integrated circuitry, specially designed ASICs (application specific integrated circuits), computer hardware, firmware, software, and/or combinations thereof. The various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The computer programs (also known as programs, software, software applications or code) include machine instructions for a programmable processor and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

While one or more of the examples described herein relate to fully automated manufacturing systems and operations, in one or more other examples, the indexing apparatus 100, the manufacturing system 168, and methods 1000, 2000, 3000 are used with partially automated manufacturing systems and operations or manual manufacturing systems and operations in which the fixture tool 102 is located relative to a work station and a manufacturing machine is indexed relative to the fixture tool 102 for performing one or more manufacturing operations on the workpiece 170. Such manufacturing operations include subtractive manufacturing operations, additive manufacturing operations, and assembly operations performed on the workpiece 170. In an example, the manufacturing operation is performed on a post-cure composite material or other material. In another example, the manufacturing operation is performed on a pre-cure composite material, such as composite layup operations and composite lamination operations.

Figure 33:
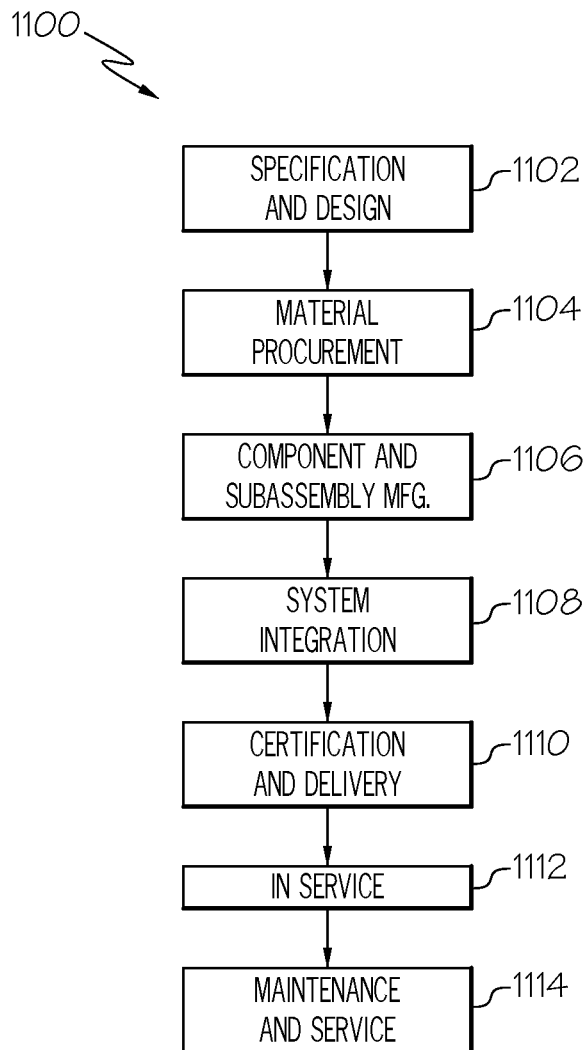
FIG. 33 is a flow diagram of an aircraft manufacturing and service methodology.
Figure 34:
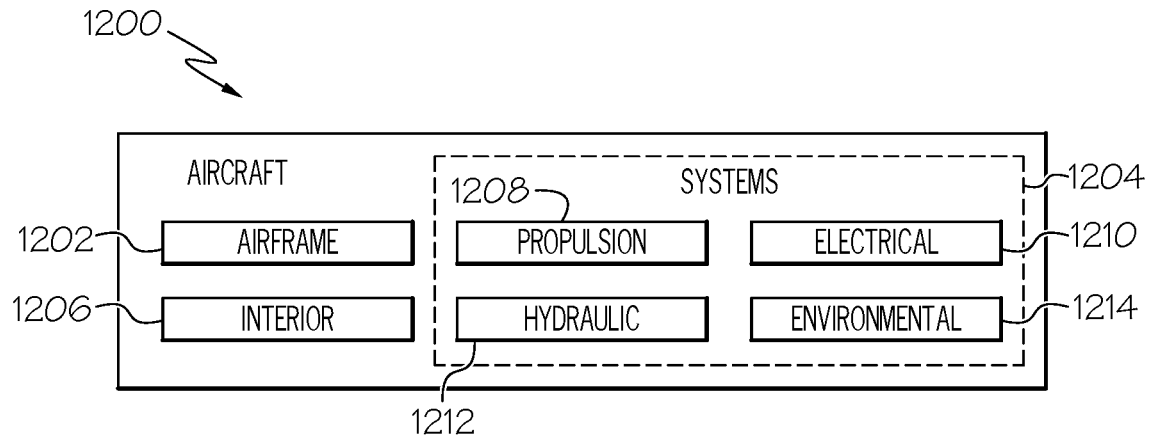
FIG. 34 is a block diagram of an aircraft.

Referring now to FIGS. 33 and 34, examples of the indexing apparatus 100, the manufacturing system 168, and the methods 1000, 2000, 3000 may be used in the context of an aircraft manufacturing and service method 1100, as shown in the flow diagram of FIG. 33 and an aircraft 1200, as schematically illustrated in FIG. 34.

FIG. 34 is an illustrative example of the aircraft 1200. The aircraft 1200 includes an airframe 1202 and a plurality of high-level systems 1204. Examples of the high-level systems 1204 include one or more of a propulsion system 1208, an electrical system 1210, a hydraulic system 1212, and an environmental system 1214. In other examples, the aircraft 1200 may include any number of other types of systems, such as a communications system, a guidance system, and the like. The workpiece 170 may be any one of a structure, an assembly, a sub-assembly, a component, and a part of the airframe 1202 or the interior 1206. For example, the workpiece 170 may be any one of an aircraft spar, a wing section, a fuselage section, an interior panel, an exterior skin panel, and the like.

As illustrated in FIG. 33, during pre-production, the method 1100 may include specification and design of the aircraft 1200 (block 1102) and material procurement (block 1104). During production of the aircraft 1200, component and subassembly manufacturing (block 1106) and system integration (block 1108) of the aircraft 1200 may take place. Thereafter, the aircraft 1200 may go through certification and delivery (block 1110) to be placed in service (block 1112). Routine maintenance and service (block 1114) may include modification, reconfiguration, refurbishment, etc. of one or more systems of the aircraft 1200.

Each of the processes of the method 1100 illustrated in FIG. 33 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the indexing apparatus 100, the manufacturing system 168, and the methods 1000, 2000, 3000 shown and described herein may be employed during any one or more of the stages of the manufacturing and service method 1100 shown in the flow diagram illustrated by FIG. 33. In an example, implementation of the disclosed indexing apparatus 100, manufacturing system 168, and methods 1000, 2000, 3000 may form a portion of component and subassembly manufacturing (block 1106) and/or system integration (block 1108). For example, assembly of the aircraft 1200, the airframe 1202, and/or components thereof using implementations of the disclosed indexing apparatus 100, manufacturing system 168, and methods 1000, 2000, 3000 may correspond to component and subassembly manufacturing (block 1106) and may be prepared in a manner similar to components or subassemblies prepared while the aircraft 1200 is in service (block 1112). Also, implementations of the disclosed indexing apparatus 100, manufacturing system 168, and methods 1000, 2000, 3000 may be utilized during system integration (block 1108) and certification and delivery (block 1110). Similarly, implementations of the disclosed indexing apparatus 100, manufacturing system 168, and methods 1000, 2000, 3000 may be utilized, for example and without limitation, while the aircraft 1200 is in service (block 1112) and during maintenance and service (block 1114).

Referring to FIGS. 1 and 34, also disclosed is a method of fabricating a portion of the aircraft 1200 (FIG. 34) using the indexing apparatus 100 (FIG. 1) and a method of fabricating a portion of the aircraft 1200 using the manufacturing system 168 (FIG. 1). Referring to FIGS. 29 and 34, also disclosed is a portion of the aircraft 1200 assembled according to the method 1000 (FIG. 29). Referring to FIGS. 30 and 34, also disclosed is a portion of the aircraft 1200 assembled according to the method 2000 (FIG. 30). Referring to FIGS. 31 and 34, also disclosed is a portion of the aircraft 1200 assembled according to the method 3000 (FIG. 31). The portion of the aircraft 1200 includes one or more of a structure, a component, a part, an assembly, and a sub-assembly of any one of the airframe 1202, the interior 1206, and the high-level systems 1204.

As used herein, a system, apparatus, device, structure, article, element, component, or hardware "configured to"

perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the terms "about" and "approximately" refer to or represent a condition that is close to, but not exactly, the stated condition that still performs the desired function or achieves the desired result. As an example, the terms "about" and "approximately" refer to a condition that is within an acceptable predetermined tolerance or accuracy. For example, the terms "about" and "approximately" refer to a condition that is within 10% of the stated condition. However, the terms "about" and "approximately" do not exclude a condition that is exactly the stated condition.

In FIGS. 1, 7, 16, 25, 32 and 34, referred to above, the blocks may represent functional elements, features, or components thereof and lines connecting the various blocks do not necessarily imply any particular structure. Accordingly, modifications, additions and/or omissions may be made to the illustrated structure. Additionally, those skilled in the art will appreciate that not all elements described and illustrated in FIGS. 1-29, 32 and 34, referred to above, need be included in every example and not all elements described herein are necessarily depicted in each illustrative example. Unless otherwise explicitly stated, the schematic illustrations of the examples depicted in FIGS. 1-29, 32 and 34 referred to above, are not meant to imply structural limitations with respect to the illustrative example. Rather, although one illustrative structure is indicated, it is to be understood that the structure may be modified when appropriate.

In FIGS. 29-31 and 33, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 29-31 and 33 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the indexing apparatus 100, the manufacturing system 168, and the methods 1000, 2000, 3000 have been shown and described, modifications may occur to those skilled in the art upon reading the specification. The present application includes such modifications and is limited only by the scope of the claims.

What is claimed is:

1. An indexing apparatus, comprising:
a fixture, movable relative to an operation cell, wherein the fixture comprises a surface that supports a workpiece and that comprises a first end and a second end opposite the first end;
an indexing feature that comprises an interfacing-structure that is disposed on the surface of the fixture and that extends continuously from proximate the first end to proximate the second end, such that the at least one interfacing-structure is not obscured by the workpiece positioned on the surface of the fixture;
a sensor, configured to visually detect the indexing feature; and
a controller, in communication with the sensor,
wherein:
the interfacing-structure comprises at least one of a groove, formed in the surface of the fixture, and a protrusion, projecting from the surface of the fixture, and has a geometry that is visually detectable by the sensor and that is computationally discernable from the surface of the fixture by the controller; and
the controller is configured to locate the fixture relative to the operation cell from an indexing-feature location of the indexing feature, identified by the sensor.

2. The indexing apparatus of claim 1, wherein the sensor is movable relative to the fixture.

3. The indexing apparatus of claim 1, wherein the sensor comprises at least one of a camera and a laser scanner.

4. A method of fabricating a portion of an aircraft using the indexing apparatus of claim 1.

5. The indexing apparatus of claim 1, wherein:
the interfacing-structure extends alongside the workpiece; and
the sensor is movable along the interfacing-structure.

6. The indexing apparatus of claim 1, wherein the controller is further configured to:
determine the indexing-feature location of the indexing feature in at least one dimension of a fixed coordinate system from sensor data, generated by the sensor; and
determine a fixture location of the fixture in the at least one dimension of the fixed coordinate system from the indexing-feature location of the indexing feature.

7. The indexing apparatus of claim 6, wherein the controller is further configured to:
register a digital model, representing the fixture and the indexing feature, to the indexing -feature location of the indexing feature; and
convert a model location of the digital model, registered to the indexing-feature location, to the fixture location of the fixture.

8. The indexing apparatus of claim 1, wherein:
the indexing feature further comprises a second interfacing-structure that is disposed on the surface of the fixture and that extends continuously from proximate the first end to proximate the second end.

9. The indexing apparatus of claim 8, wherein the second interfacing-structure is non-parallel to the interfacing structure.

10. The indexing apparatus of claim 1, wherein the controller is further configured to index an end effector relative to the fixture location of the fixture.

11. The indexing apparatus of claim 10, wherein:
the fixture comprises a mandrel, configured to support the workpiece;
the workpiece comprises a pre-cure composite laminate; and
the end effector is configured to perform a pre-cure manufacturing operation on the pre-cure composite laminate.

12. The indexing apparatus of claim 10, wherein:
the fixture is configured to secure the workpiece in a fixed position on the surface of the fixture;
the workpiece comprises a post-cure composite structure; and
the end effector is configured to perform a post-cure manufacturing operation on the post-cure composite structure.

13. An indexing apparatus, comprising:
a fixture, movable relative to an operational cell, wherein the fixture comprises a surface that is configured to support a workpiece and that comprises a first end and a second end opposite the first end;
an indexing feature that comprises a plurality of interfacing-structures that is disposed on the surface of the fixture and that is arranged between the first end and the second end in the form of a discontinuous, longitudinally extending grouping, such that the plurality of interfacing-structures is not obscured by the workpiece positioned on the surface of the fixture;
a sensor, configured to visually detect the indexing feature; and
a controller, in communication with the sensor;
wherein:
the plurality of interfacing-structures comprises a geometry that is visually detectable by the sensor and that is computationally discernable from the surface of the fixture by the controller; and
the controller is configured to locate the fixture relative to the operation cell from an indexing-feature location of the indexing feature, identified by the sensor.

14. A method of fabricating a portion of an aircraft using the indexing apparatus of claim 13.

15. The indexing apparatus of claim 13, wherein:
the fixture is configured to secure the workpiece in a fixed position on the surface of the fixture;
the workpiece comprises a post-cure composite structure; and
an end effector is configured to perform a post-cure manufacturing operation on the post-cure composite structure.

16. The indexing apparatus of claim 13, wherein:
the plurality of interfacing-structures extends alongside the workpiece; and
the sensor is movable along the plurality of interfacing-structures.

17. The indexing apparatus of claim 13, wherein the plurality of interfacing-structures comprises at least one of grooves, formed in the surface of the fixture, and protrusions, projecting from the surface of the fixture.

18. The indexing apparatus of claim 13, wherein the plurality of interfacing -structures is arranged non-linearly between the first end and the second end of the surface of the fixture tool.

19. The indexing apparatus of claim 13, wherein the controller is further configured to:
determine the indexing-feature location of the indexing feature in at least one dimension of a fixed coordinate system from sensor data, generated by the sensor; and
determine a fixture location of the fixture in the at least one dimension of the fixed coordinate system from the indexing-feature location of the indexing feature; and
index an end effector relative to the fixture location of the fixture.

20. The indexing apparatus of claim 19, wherein the controller is further configured to:
register a digital model, representing the fixture and the indexing feature, to the indexing-feature location of the indexing feature; and
convert a model location of the digital model, registered to the indexing-feature location, to the fixture location of the fixture.

21. The indexing apparatus of claim 19, wherein:
the fixture comprises a mandrel, configured to support the workpiece;
the workpiece comprises a composite laminate; and
the end effector comprises an automated fiber placement machine.

22. The indexing apparatus of claim 19, further comprising:
a second sensor, configured to visually detect the indexing feature; and
a vehicle, configured to support the fixture and move the fixture relative to the operation cell and a second operation cell,
wherein:
the vehicle comprises one of an automated guided vehicle and a cart, configured to travel along a track;
the controller is configured to locate the fixture relative to the second operation cell from a second indexing-feature location of the indexing feature, identified by the second sensor; and
the controller is further configured to index a second end effector relative to a second fixture location of the fixture.

23. A method of manufacturing, the method comprising steps of:
- moving a fixture relative to an operation cell, wherein the fixture comprises a surface that supports a workpiece and that comprises a first end and second end opposite the first end;
- scanning the surface of the fixture;
- visually detecting an indexing feature with a sensor, wherein:
  - the indexing feature comprises at least one of an interfacing-structure, which is disposed on the surface of the fixture and that extends continuously from proximate the first end to proximate the second end; and a plurality of interfacing-structures, which is disposed on the surface of the fixture and that is arranged between the first end and the second end in the form of a discontinuous, longitudinally extending grouping, such that the indexing feature is not obscured by the workpiece; and
  - the indexing feature comprises at least one of a groove, formed in the surface of the fixture and a protrusion, projecting from the surface of the fixture, and has a geometry that is visually detectable by the sensor and that is computationally discernable from the surface of the fixture by a controller;
- determining, by the controller, an indexing-feature location of the indexing feature in at least one dimension of a fixed coordinate system from sensor data, generated by the sensor;
- determining, by the controller, a fixture location of the fixture in the at least one dimension of the fixed coordinate system from the indexing-feature location of the indexing feature; and
- indexing an end effector relative to the fixture location of the fixture.

24. The method of claim 23, wherein:

the indexing feature extends alongside the workpiece; and the step of scanning the surface of the workpiece comprises moving the sensor along the indexing feature.

* * * * *